United States Patent
Zhang et al.

(10) Patent No.: US 8,646,907 B2
(45) Date of Patent: Feb. 11, 2014

(54) MATERIALS FOR USE IN OPHTHALMIC APPLICATIONS AND METHODS

(75) Inventors: Yun Zhang, San Ramon, CA (US); Charlie Chen, San Ramon, CA (US); Peter Zhu, Cupertino, CA (US); Ying Ye, Irvine, CA (US); Hongjin Qiu, Mountain House, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 13/395,134

(22) PCT Filed: Sep. 21, 2010

(86) PCT No.: PCT/US2010/049601
§ 371 (c)(1),
(2), (4) Date: Apr. 16, 2012

(87) PCT Pub. No.: WO2011/037897
PCT Pub. Date: Mar. 31, 2011

(65) Prior Publication Data
US 2012/0194779 A1 Aug. 2, 2012

Related U.S. Application Data

(60) Provisional application No. 61/244,496, filed on Sep. 22, 2009.

(51) Int. Cl.
*G02C 7/04* (2006.01)
(52) U.S. Cl.
USPC .................................. 351/159.33; 351/159.02
(58) Field of Classification Search
USPC ..................... 351/159.33, 159.62; 424/78.04; 523/106
See application file for complete search history.

(56) References Cited

U.S. PATENT DOCUMENTS

| | | | |
|---|---|---|---|
| 4,401,797 A | | 8/1983 | Gallop |
| 4,426,492 A | * | 1/1984 | Steckler ......................... 525/61 |
| 5,817,277 A | | 10/1998 | Mowrey-McKee et al. |
| 6,420,453 B1 | * | 7/2002 | Bowers et al. ................ 523/106 |
| 6,503,497 B2 | | 1/2003 | Chowhan et al. |
| 6,858,310 B2 | * | 2/2005 | McGee et al. ................ 428/447 |
| 6,943,203 B2 | * | 9/2005 | Vanderlaan et al. .......... 523/107 |
| 2005/0118058 A1 | | 6/2005 | Xia et al. |

(Continued)

FOREIGN PATENT DOCUMENTS

| | | |
|---|---|---|
| JP | 2007-314736 | 12/2007 |
| KR | 10-2006-0111652 | 10/2006 |
| WO | 2007124132 A2 | 11/2007 |

OTHER PUBLICATIONS

International Search Report and the Written Opinion of the International Searching Authority for corresponding International Patent Application No. PCT/US2010/049601 dated Jun. 29, 2011 (8 pages).

(Continued)

*Primary Examiner* — Ricky Mack
*Assistant Examiner* — William Alexander
(74) *Attorney, Agent, or Firm* — Kilyk & Bowersox, P.L.L.C.

(57) ABSTRACT

A lens body comprising at least one form of boronic acid, boronic ester or boronic anhydride is provided. The lens body is contacted with a solution comprising at least one form of TRIS. A contact lens package including the contact lens, and methods of producing and using the contact lens, are also provided.

20 Claims, 10 Drawing Sheets

(56) References Cited

U.S. PATENT DOCUMENTS

| | | |
|---|---|---|
| 2005/0267560 A1 | 12/2005 | Bates |
| 2007/0027228 A1* | 2/2007 | Tucker et al. .................... 522/84 |
| 2007/0030443 A1 | 2/2007 | Chapoy et al. |
| 2007/0116740 A1 | 5/2007 | Valint, Jr. et al. |
| 2007/0149428 A1* | 6/2007 | Ammon et al. ................ 510/112 |
| 2007/0149672 A1* | 6/2007 | Quinn et al. .................. 524/405 |
| 2008/0143958 A1* | 6/2008 | Medina et al. ............ 351/160 H |
| 2008/0148689 A1* | 6/2008 | Xia et al. ........................ 53/431 |
| 2008/0151180 A1 | 6/2008 | Vanderbilt et al. |
| 2008/0151181 A1* | 6/2008 | Vanderbilt et al. ......... 351/160 R |
| 2008/0314767 A1* | 12/2008 | Lai et al. ......................... 206/5.1 |
| 2010/0162661 A1 | 7/2010 | Vanderbilt et al. |
| 2010/0162663 A1 | 7/2010 | McGee et al. |
| 2010/0168356 A1 | 7/2010 | Lai et al. |
| 2010/0168850 A1 | 7/2010 | Vanderbilt et al. |
| 2010/0168851 A1 | 7/2010 | Vanderbilt et al. |
| 2010/0168852 A1 | 7/2010 | Vanderbilt et al. |
| 2010/0168855 A1 | 7/2010 | McGee et al. |

OTHER PUBLICATIONS

International Preliminary Report on Patentability for corresponding International Patent Application No. PCT/US2010/049601 dated Feb. 13, 2012 (11 pages).

Springsteen et al., "A detailed examination of boronic acid-diol complexation," Tetrahedron, vol. 58, 2002, pp. 5291-5300.

* cited by examiner

MATERIALS FOR USE IN OPHTHALMIC APPLICATIONS AND METHODS

This application is a National Stage Application of PCT/US2010/049601, filed Sep. 21, 2010, which claims priority to U.S. Provisional Patent Application No. 61/244,496, filed Sep. 22, 2009.

This application claims the benefit under 35 U.S.C. §119 (e) of prior U.S. Provisional Patent Application No. 61/244,496, filed Sep. 22, 2009, which is incorporated in its entirety by reference herein.

FIELD OF THE INVENTION

The present invention relates to medical devices, compositions for forming such devices, and their use in ophthalmic applications such as contact lens materials. In particular, the present invention relates to hydrogel contact lenses. The present invention also relates to packaging systems including these lenses and methods of producing the lenses.

BACKGROUND

Although conventional hydrophilic polymer or hydrogel lenses are useful and effective, some problems do present themselves, from time to time. For example, conventional hydrophilic contact lenses can be associated with lens wearer discomfort and/or eye irritation, which can result in the lens wearer perceiving that his/her eye is dry. "Dry eye" phenomenon has been treated by lens wearers with eye drops and/or lubricants.

Silicone hydrogel contact lenses are a commonly used type of contact lenses. Silicone hydrogels generally have higher oxygen permeabilities than conventional hydrogel contact lenses. In addition, silicone hydrogels typically have more hydrophobic materials than conventional hydrogel contact lenses, and therefore, additional processing steps or formulation ingredients are necessary to produce contact lenses with wettable surfaces compared to conventional hydrogel contact lenses.

Producing wettable silicone hydrogel contact lenses while addressing commercial realities, such as low costs of goods, good clinical performance, and high processability, remains a challenge.

SUMMARY

The present contact lenses comprise lens bodies that comprise a reaction product of a polymerizable composition. A lens body of a contact lens has a lens surface, such as an anterior lens surface or a posterior lens surface. A first polyhydric alcohol is present on at least the lens surface of the lens body. In one example, the first polyhydric alcohol comprises a polyhydric alcohol with a backbone comprising at least three carbon atoms, the at least three carbon atoms bonded in a chain as a right carbon atom bonded to a center carbon atom, the center carbon atom bonded to a left carbon atom, wherein one and only one hydroxyl group is bonded to the right carbon atom, a hydroxyl group is not bonded to the center carbon atom, and one and only one hydroxyl group is bonded to the left carbon atom. In another example, the first polyhydric alcohol comprises a 1,3 diol (i.e., a diol with one hydroxyl group bonded to each of the $1^{st}$ and $3^{rd}$ carbons in the chain). In another example, the first polyhydric alcohol comprises a 1,3 polyol (i.e., a polyhydric alcohol with more than two pendant hydroxyl groups, one and only one of which is bonded to $1^{st}$ carbon in the chain and another one and only one of which is bonded to the $3^{rd}$ carbon in the chain, where the $2^{nd}$ carbon in the chain does not have a hydroxyl group bonded to it). In another example, the polyhydric alcohol comprises a polyhydric alcohol with at least five pendant hydroxyl groups. In yet another example, the polyhydric alcohol comprises a polyhydric alcohol with at least five pendant hydroxyl groups, wherein two of the hydroxyl groups are in the 1 and 3 positions on the carbon chain (i.e, a 1,3 polyol with at least 5 pendant hydroxyl groups). The polymerizable composition comprises at least one hydrophilic monomer, at least one crosslinking agent that crosslinks the at least one hydrophilic monomer during polymerization to form a first polymer component, and at least one ophthalmically acceptable acid. The ophthalmically acceptable acid can be distributed as a portion of the first polymer component, as a second polymer component, or both, in the reaction product within the lens body and at a lens surface thereof. The lens surface can have an advancing contact angle of less than 100° and/or a water break up time (WBUT) of greater than five seconds, which are maintained following in vitro testing for a duration of at least six hours. The ophthalmically acceptable acid can be used in a silicone hydrogel lens formulation or a silicone-free hydrogel lens formulation.

It has been found that the inclusion of at least one ophthalmically acceptable acid in a polymerizable composition used to produce a contact lens body provides a lens structure having at least a surface to which a polyhydric alcohol (polyol), such as a 1,3 polyol with at least five hydroxyl (—OH) groups, can be attached. As the ophthalmically acceptable acid can be immobilized chemically, physically, or both chemically and physically, in the lens body, including at least at a wetting portion at a surface of the lens body, the acid (or at least a portion, or significant portion) is not extracted or washed out during typical manufacturing, storage, and/or wear conditions (e.g., at least 90% by weight of the acid present when the lens is formed remains afterwards, such as from 90 wt % to 100 wt %, 95 wt % to 99.99 wt %, 97 wt % to 99 wt %, 98 wt % to 99 wt %). It has been found that even a relatively small amount of ophthalmically acceptable acid provided in the lens body and on at least the lens surface is sufficient to interact (e.g., graft to, react, bond, or otherwise attach) with a polyol, e.g., a polyol with at least five hydroxyl groups, to achieve a wettable surface. As the immobilized ophthalmically acceptable acid remains present in the lens body and at lens surfaces thereof during use, the polyol also can remain present on at least the surface of the lens body for an extended period of time after removal of the lens from a wetting solution or aqueous solution and during use (wear) of the lens. The contact lens can show a high level of wettability based on in vitro tests over extended periods of time. These contact lenses also can be recharged after a period of use by soaking the lenses in a solution of a polyol, such as a polyol with at least five hydroxyl groups, such as by soaking overnight at room temperature. Further, the contact lenses made with the present lens formulations do not require extraction with organic solvents, aqueous solutions of organic solvents, or water, although they can be extracted in this manner or can be hydrated in an aqueous solution or water prior to sterilizing, such as autoclaving. For example, a contact lens, as described herein, can be separated from a lens mold (delensed) and placed in a contact lens package without requiring an intermediate washing step to remove extractable material from the lens body. Thus, the contact lens can be provided in an aqueous liquid in the lens package. The aqueous liquid may be a packaging solution. Optionally, however, a contact lens could be washed prior to providing the contact lens in the packaging solution. After providing the contact lens in a packaging solution, the package can be closed or sealed, and sterilized.

An example of a contact lens, as described herein, comprises a lens body that comprises a reaction product of a polymerizable composition comprising at least one hydrophilic monomer, at least one crosslinking agent, and at least one ophthalmically acceptable acid. A polyol present at least on a lens surface of the lens body can be polyvinyl alcohol, such as one with at least five hydroxyl groups. The present hydrogel lenses, formed or treated or recharged with a polyol, like a polyvinyl alcohol, can maintain good wettability for up to 48 hours or more. It further has been found that the use of higher molecular weight forms of polyvinyl alcohol such as, for example, those with weight average molecular weights of from about 100,000 Daltons and above, can maintain the lens in a wettable state for longer durations after the lens has been removed from a solution containing the higher molecular polyvinyl alcohol as compared to lenses of the same formulation placed in a polyvinyl alcohol solution at the same concentration for the same duration of time but containing a lower molecular weight polyvinyl alcohol.

Another example of a contact lens comprises a lens body that comprises a reaction product of a polymerizable composition comprising at least one hydrophilic monomer, at least one crosslinking agent, and at least one ophthalmically acceptable acid which can be in a polymerizable form or a polymerized form(s) of an ophthalmically acceptable inorganic acid or organic acid when added to the polymerizable composition. Ophthalmically acceptable inorganic acids can be, for example, a polymerizable or polymerized form(s) of boronic acid, phosphoric acid, or both.

The present contact lenses can also be provided in a contact lens package. A contact lens in accordance with the present disclosure, comprises a contact lens formed from a polymerizable composition comprising at least one hydrophilic monomer, at least one crosslinking agent, and at least one ophthalmically acceptable acid. The contact lens has a polyol, such as a polyol with at least five hydroxyl groups, present on at least a lens surface of the contact lens body.

Methods of producing a contact lens are also disclosed. An example of a method of producing a contact lens formed from a polymerizable composition comprises preparing a lens body that is the reaction product of a polymerizable composition comprising reactive ingredients. The reactive ingredients include: at least one hydrophilic monomer, at least one crosslinking agent, and at least one ophthalmically acceptable acid. The method further comprises the step of contacting the lens body with at least one polyol, such as a 1,3 polyol with at least five hydroxyl groups, from an aqueous solution to attach the polyhydric alcohol to at least the lens surface.

Methods of using the present contact lenses are also disclosed. As an example, a method of rewetting the lens surface of a contact lens comprises contacting the contact lens with at least a second polyol, such as a polyol with at least five hydroxyl groups. The contact lens so contacted has been preformed with a polymerizable composition comprising at least one hydrophilic monomer, at least one crosslinking agent, and at least one ophthalmically acceptable acid. The preformed lens can initially have at least one polyol, such as a first polyol with at least five hydroxyl groups, present on at least a lens surface of the contact lens body. The rewettable lenses include those formulated with at least one ophthalmically acceptable acid that can be an organic acid, an inorganic acid, or both. The rewetting treatment permits at least the lens surface of the contact lens to be rewetted or "recharged" after use by a lens wearer, such as by wearing the lens on an eye of the lens wearer, which can further extend the useful life of the lens product. The rewetting can replace lost polyols and/or further add polyols to at least the surface of the lens to improve wettability and/or other properties of the lens.

In another example of the present invention, the ophthalmically acceptable acid comprises at least one form of a boronic acid, boronic ester, boronic anhydride, or combination thereof. In this example, the at least one form of a boronic acid, boronic ester, boronic anhydride, or combination thereof can be distributed as a second polymer component in the polymerized reaction product (i.e., within the bulk of the lens body and at a lens surface thereof), can be present as a polymerizable component of the polymerizable composition, or can be both present as a polymerizable component of the polymerizable composition and distributed as a second polymer component in the reaction product. When the at least one form of a boronic acid, boronic ester, boronic anhydride, or combination thereof is a polymerizable form and is present in the polymerizable composition, after polymerization of the polymerizable composition to form the polymerized reaction product comprising a copolymer, the at least one polymerizable form of a boronic acid, boronic ester, boronic anhydride, or combination thereof is present as polymerized units of the copolymer. In the case where the polymerizable composition comprises at least one polymerizable form of a boronic acid, boronic ester, boronic anhydride, or combination thereof; at least one hydrophilic monomer; and at least one crosslinking agent; the polymerized reaction product comprises polymerized units of the at least one form of a boronic acid, boronic ester, boronic anhydride, or combination thereof; polymerized units of the hydrophilic monomer; and crosslinks formed by the at least one crosslinking agent.

In this example, the lens body that is the polymerized reaction product can comprise boronic acid moieties present on at least a surface of the lens body or within the bulk of the lens body. In one example, the boronic acid moieties can be present in the copolymer of the lens body.

The lens body comprising boronic acid moieties can have at least one polyhydric alcohol present on at least one lens surface, i.e., the boronic acid moieties of the lens body can be complexed with 1, 2 diol or 1,3 diol moieties of the polyhydric alcohol such that the polyhydric alcohol is present on at least one lens surface, forming a complexed lens body. The at least one polyhydric alcohol can have at least five pendant hydroxyl groups, as previously described, or can have fewer than five hydroxyl groups (i.e., the polyhydric alcohol can have at least two pendant hydroxyl groups). As previously described, the polyhydric alcohol of the present example can comprise a polyhydric alcohol having at least one 1,3 diol moiety (i.e., a polyhydric alcohol with a backbone comprising at least three carbon atoms, the at least three carbon atoms bonded in a chain as a right carbon atom bonded to a center carbon atom, the center carbon atom bonded to a left carbon atom, wherein one and only one hydroxyl group is bonded to the right carbon atom, a hydroxyl group is not bonded to the center carbon atom, and one and only one hydroxyl group is bonded to the left carbon atom). Additionally, the polyhydric alcohol of the present example can comprise a polyhydric alcohol having at least one 1, 2 diol moiety, or having both 1, 2 diol and 1,3 diol moieties. The at least one polyhydric alcohol can be present on at least one lens surface or can be present on both the anterior lens surface and the posterior lens surface. In some examples, the at least one polyhydric alcohol may be present in the bulk of the lens body as well as on a lens surface. In the example where the polyhydric alcohol is a polyhydric alcohol having at least one 1, 2 diol or 1,3 diol moiety, at least a portion of 1, 2 diol or 1,3 diol moieties present in a solution of the polyhydric alcohol can be complexed with at least a portion of boronic acid moieties present in the lens body (e.g., boronic acid moieties present on a lens surface, within the bulk of the lens body, or both). Alternatively, in this example, the boronic acid moieties present in the lens body may not be complexed with 1, 2 or 1,3 moieties of a polyhydric alcohol, i.e., the lens body that is the polymerized reaction product may be an uncomplexed lens body. In one particular example of a method, the uncomplexed lens body can be contacted with a solution of a polyhydric alcohol having 1, 2 diol or 1,3 diol moieties, and at least a portion of boronic acid moieties present in the lens body can complex with at least a portion of 1, 2 diol or 1,3 diol moieties of the polyhydric alcohol present in the solution, forming a complexed lens body.

The example can comprise a method of manufacturing a hydrogel contact lens body. The method of manufacturing a hydrogel contact lens body can comprise: (i) providing a lens body comprising at least one form of boronic acid, boronic ester, boronic anhydride or combination thereof; and (ii) contacting the lens body with a contacting solution comprising at least one form of tris(hydroxymethyl)aminomethane (TRIS). In one example, the at least one form of TRIS can comprise a TRIS buffer system.

The at least one form of the boronic acid, boronic ester, boronic anhydride or combination thereof can comprise a polymerizable form of the at least one form of the boronic acid, boronic ester, boronic anhydride or combination thereof. The at least one polymerizable form of the boronic acid, boronic ester, boronic anhydride or combination thereof can comprise a polymerizable form of boronic acid having the structure:

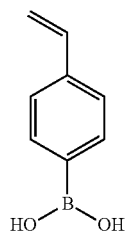

The at least one form of boronic acid, boronic ester, boronic anhydride or combination thereof can be present on at least a surface of the lens body.

The lens body can comprise a hydrogel lens body. The hydrogel lens body can comprise a polymerized reaction product of a polymerizable composition, the polymerizable composition comprising at least one hydrophilic monomer and at least one crosslinking agent; and the polymerized reaction product comprising a polymer formed of polymerized units of the at least one hydrophilic monomer, and crosslinks formed by the at least one crosslinking agent.

When the at least one form of a boronic acid, boronic ester, boronic anhydride, or combination thereof comprises a polymerizable form of a boronic acid, boronic ester, boronic anhydride, or combination thereof, the hydrogel lens body can be a polymerized reaction product of a polymerizable composition, the polymerizable composition comprising the at least one polymerizable form of a boronic acid, boronic ester, boronic anhydride, or combination thereof; at least one hydrophilic monomer; and at least one crosslinking agent; and the polymerized reaction product is a copolymer formed of polymerized units of the at least one polymerizable form of the boronic acid, boronic ester, boronic anhydride or combination thereof, polymerized units of the at least one hydrophilic monomer, and crosslinks formed by the at least one crosslinking agent.

The lens body (e.g., a complexed lens body or an uncomplexed lens body) can have an advancing contact angle less than about 120°, a modulus less than about 1.6 MPa, an ionoflux less than about $7 \times 10^{-3}$ mm$^2$/min., an oxygen permeability of less than about 120 Barrers, and an equilibrium water content of at least about 30%.

In another example, the lens body (e.g., an uncomplexed lens body or a complexed lens body) can have an advancing contact angle less than about 100°, a modulus from about 0.3 MPa to about 1.0 MPa, an ionoflux less than about $5 \times 10^{-3}$ mm$^2$/min., an oxygen permeability of less than about 110 Barrers, and an equilibrium water content from about 35% to 65%.

In yet another example, the lens body (e.g., a complexed lens body or an uncomplexed lens body) can have an advancing contact angle less than about 60°, a modulus from about 0.4 MPa to about 0.7 MPa, an ionoflux less than about $4 \times 10^{-3}$ mm$^2$/min., an oxygen permeability from about 55 Barrers to about 100 Barrers, and an equilibrium water content from about 40% to 65%.

The at least one form of TRIS comprises a form of tris(hydroxymethyl)aminomethane in combination with at least one form of ethylenediaminetetraacetic acid (EDTA). The at least one form of tris(hydroxymethyl)aminomethane in combination with at least one form of ethylenediaminetetraacetic acid (EDTA) can comprise a (TRIS-EDTA) buffer system. The form of EDTA can comprise ethylenediaminetetraacetic acid sodium salt dihydrate. The TRIS-EDTA buffer system can further comprise tris(hydroxymethyl)aminomethane hydrochloride (TRIS HCl). The form of EDTA can comprise ethylenediaminetetraacetic acid sodium salt dihydrate.

The contacting solution can further comprise a tonicity adjusting agent. The contacting solution can have an osmolarity from about 100 mOsm to about 300 mOsm.

The contacting solution further can further comprise at least one surfactant. The contacting solution can further comprise at least one wetting agent or comfort agent.

The contacting solution can further comprise at least one polyhydric alcohol having at least one 1,2 diol or 1,3 diol moiety, wherein at least a portion of the 1, 2 diol or 1,3 diol moieties present in the solution are capable of complexing with at least a portion of boronic acid moieties present in the lens body.

The step of contacting the lens body with the contacting solution can comprise soaking the lens body in the contacting solution, rinsing the lens body with the contacting solution, or both soaking and rinsing the lens body.

The step of contacting the lens body with the contacting solution can comprise placing the lens body in a contact lens package with the solution, sealing the package, and sterilizing the package. When the contacting solution comprises a form of poly(vinyl alcohol) (PVOH), the at least one form of TRIS can be present in the solution at a concentration effective to prevent gelation of the form of PVOH over a shelf life of the sterilized package.

The example can also comprise a method of treating a hydrogel contact lens. The method of treating a hydrogel contact lens can comprise: (i) providing a contact lens comprising at least one form of boronic acid, boronic ester, boronic anhydride or combination thereof; (ii) prior to the contact lens being worn by a user, contacting the lens body with a first contacting solution comprising at least one form of tris(hydroxymethyl)aminomethane (TRIS); and (iii) subsequently to the contact lens being worn by the user, contacting the lens body with a second contacting solution comprising at least one form of TRIS. The at least one form of TRIS of the first contacting solution can be the same as the at least one form of TRIS of the second contacting solution, or can be different.

The example can also be directed to a hydrogel contact lens product. The hydrogel contact lens product can comprise: (i) a lens body comprising at least one form of boronic acid, boronic ester, boronic anhydride or combination thereof; (ii) a packaging solution comprising at least one form of tris (hydroxymethyl)aminomethane (TRIS); (iii) a contact lens package base member with a cavity configured to hold the lens body and the packaging solution; and (iv) a seal attached to the base member configured to maintain the lens body and the packaging solution in a sterile condition for a duration of time equivalent to a shelf life of the contact lens package.

The at least one form of TRIS can be present in the packaging solution at a concentration effective to lower an effective pKa of boronic acid moieties present on at least a surface of the lens body. The packaging solution can further comprise at least one polyhydric alcohol having at least one 1,2 diol or 1,3 diol moiety, and at least a portion of boronic acid moieties present on at least a surface of the lens body can be complexed with at least a portion of 1,2 diol or 1,3 diol moieties present in the solution of at least one polyhydric alcohol. The at least one form of TRIS can be present in the packaging solution at a concentration effective to prevent gelation of the packaging solution over a shelf life of the sterilized package.

It is to be understood that both the foregoing general description and the following detailed description are exemplary and explanatory only and are intended to provide a further explanation of the present invention, as claimed.

The accompanying figures, which are incorporated in and constitute a part of this application, illustrate various embodiments of the present invention and, together with the description, serve to explain principles of the present invention.

DETAILED DESCRIPTION

Figure 1A:
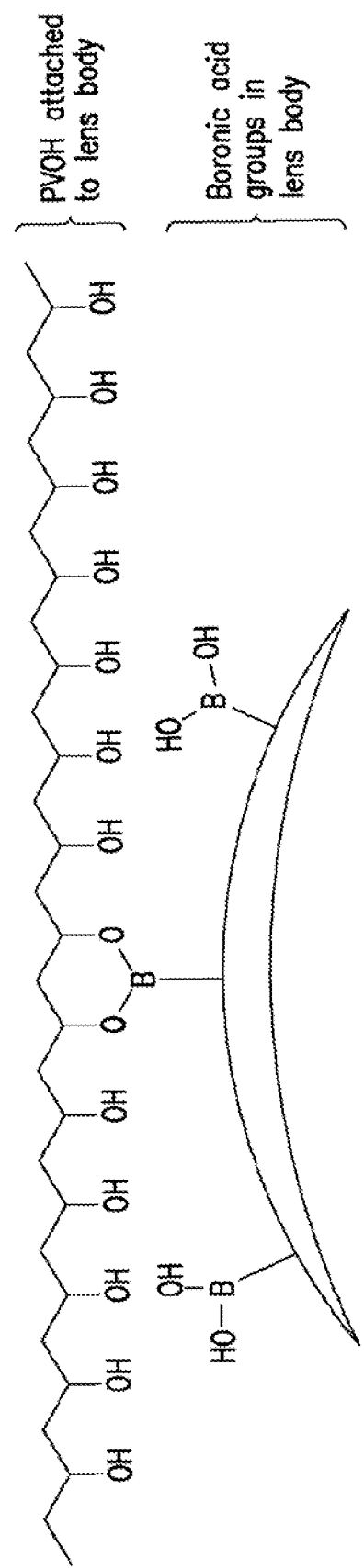
FIG. 1 is a series of 4 schematic drawings (FIG. 1A, FIG. 1B, FIG. 1C, and FIG. 1D) illustrating polymerization reactions that result in the formation of a polymer of an ophthalmically acceptable acid (i.e., 4-vinylphenyl boronic acid (VPB)), and the attachment of a polyol (i.e., a 1,3 polyvinyl alcohol having five or more hydroxyl groups attached) to the polymer of the acid.

New contact lenses are disclosed. The contact lenses can comprise at least one ophthalmically acceptable acid. The contact lenses optionally can have a wetting agent or component present on at least the surface of the contact lens or portion thereof. The wetting agent or wetting component can be present on at least the surface of the contact lens or portion thereof by associating with at least a portion of the lens body, such as by grafting, chemical bonding, covalent bonding, or other forms of chemical attachment or physical attachment or both. The wetting agent that attaches onto the surface of the contact lens retains wettability, for instance, based on in vitro tests or other tests, over an extended period of time, for instance, at least 6 hours, at least 12 hours, at least 24 hours, at least 48 hours (such as from about 12 hours to 72 hours or more). The wetting agent can, for instance, be a hydroxyl- or hydroxy-containing wetting agent. The wetting agent has the ability to attach, such as by chemical attachment, onto at least the surface of the contact lens, such as by way of or through one or more wetting agent linkers, such as an ophthalmically acceptable acid or radical thereof or moiety thereof. As shown, for instance, in FIGS. 1A, 1B, 1C and 1D, which are purely exemplary, a polymerizable form of acid can react to form a polymerized form of the acid present in a lens body. The lens body comprising the polymerized acid can then be contacted with a wetting agent, such as a polyol, such as a polyol with at least five hydroxyl groups, and including forms of polyvinyl alcohol. Without being bound by any particular theory or mechanism of action, it is believed that contacting the lens body with the wetting agent results in the wetting agent attaching to at least a surface of the lens body, making the lens body wettable. It is possible that the wetting agent attaches onto at least the lens surface through a chemical bond with at least a portion of the wetting agent linker, such as an ophthalmically acceptable acid or radical thereof or moiety thereof that is present within the lens including on the surface of the lens.

Further, the present contact lenses include at least one lens surface that can be re-wetted or re-charged by exposing the contact lens to a wetting agent, which can be the same or different from the original wetting agent to replace at least a portion of any previously attached wetting agent that may have been lost through use or other reasons and/or to add additional wetting agent onto the lens surface. One or more (such as two or more, three or more, four or more, and the like) ophthalmically acceptable acids can be present in the lens as part of the lens composition. Further, one or more wetting agents can be attached to the lens surface, such as two or more, three or more, four or more, and the like.

In accordance with the present disclosure, a contact lens comprises a polymerized composition, wherein the polymerized composition includes at least one ophthalmically acceptable acid or units of at least one ophthalmically acceptable acid. The contact lens optionally can further comprise at least one wetting agent (which includes the wetting agent or moiety thereof or radical thereof) attached to at least a portion of the polymerized composition. The wetting agent can be at least one polyol and the wetting agent can be attached to at least a portion of the available ophthalmically acceptable acid or radical thereof or moiety thereof. The ophthalmically acceptable acid, or at least a substantial part of it, remains present in the polymerized composition and is not substantially extracted or washed out during lens processing or wear.

The wetting agent linker, such as the ophthalmically acceptable acid, can be present throughout the entire lens composition and can be part of the lens composition. As an option, the concentration of the wetting agent linker can be different at the surface compared to non-surface portions of the lens body. Various gradients of concentrations of the wetting agent linker can be present throughout the lens composition, such that the concentration of the wetting agent linker is uniform throughout the lens or is non-uniform throughout the lens. The concentration of the wetting agent linker can be substantially uniform throughout the lens and this can be achieved by adding the wetting agent linker, such as the ophthalmically acceptable acid, in the composition forming the lens and distributing the wetting agent linker uniformly throughout the composition prior to formation of the lens. As an option, the wetting agent linker can be added after a certain time after the one or more of the other reactive components forming the lens composition are added or once polymerization begins in order to have the wetting agent linker more concentrated at one or more locations in the lens composition such as, for example, at a lens surface.

In some examples, as an option, the wetting agent linker is not present only as a coating or layer on the lens surface, but is an integral part of the overall lens composition and, thus, the lens that is formed from the lens composition. While it is optional to include an additional layer on the lens surface that can also contain a wetting agent linker, it is to be understood that this is not necessary and, in fact, by having a wetting agent linker incorporated as part of the overall lens composition and part of the overall lens, there is no need to have a separate coating or layer of acid or other wetting linker to enhance the ability to be wetted. Further, when using a coating or layer alone, this coating or layer is subjected to being worn and removed and, thus, will need to be replaced whereas, in the present contact lenses, by having a wetting agent linker incorporated within and part of the overall lens composition and, thus, the lens, there is no concern with having this linker removed or worn off.

Further, as an option, the wetting agent linker, such as the ophthalmically acceptable acid, is not present alone as a post-treatment after formation of the lens body. In other words, with the present contact lenses, the wetting agent linker is not present due to a post-treatment on the lens body already formed. As stated, the wetting agent linker, such as the ophthalmically acceptable acid, is part of the lens body and remains part of the lens body. For example, the wetting agent linker can be provided as an ingredient of the polymerizable composition that is polymerized to form a contact lens.

Further, as an option, the wetting agent linker, such as the ophthalmically acceptable acid, or at least a major portion thereof, is not extractable with alcohol or chloroform and this means that less than 10 wt %, or less than 5 wt %, or less than 1 wt %, or less than 0.5 wt %, or less than 0.1 wt % of the wetting agent linker, such as the ophthalmically acceptable acid, is capable of being removed by extraction. For example, in certain embodiments, only 0.001 wt % to 0.3 wt % of the wetting agent linker that is present in the lens at the time of formation is removed over time by extraction.

As stated, the wetting agent linker, such as the ophthalmically acceptable acid, is part of or within the unitary construction of the lens body. In one example, the acid is present as a polymerized product of the lens composition forming the lens body.

In certain embodiments of the present contact lenses, a contact lens is associated with a time release of an attached wetting agent from at least the lens surface. The time release can be for at least 6 hours, at least 12 hours, for at least 24 hours, for at least 48 hours, or more. The time release of the wetting agent can be constant over the time release period or it can be front-loaded where a larger percentage is released initially over time. For a constant rate of release, the release profile will appear to be substantially linear for the duration of the measurement period. In embodiments in which the wetting agent is released in greater amounts over a shorter period of time, the release profile may be characterized as having a relatively steep first profile portion and a relatively shallow second profile portion or a plateau portion. Some embodiments of the present lenses may have release profiles that are sigmoidal in shape, that is, characterized by a relatively slow rate of release, followed by a faster rate of release, and subsequently followed by a relatively slower rate of release. Thus, the release profiles may also be monophasic, biphasic, or triphasic.

Another aspect of the present contact lenses relates to a non-leaching acid containing contact lens where the ophthalmically acceptable acid is part of the lens composition forming the lens and the non-leaching property is with respect to not being able to leach a substantial amount of the acid from the lens with alcohol or an aqueous solution over a period of at least 6 hours in the alcohol or aqueous solution and having the low acid extractable content described herein. In one example, the ophthalmically acceptable acid can be a polymerizable form of the ophthalmically acceptable acid. When included as part of the composition forming the lens, the polymerizable form of the ophthalmic acid can polymerize as part of the lens body, and so can be essentially or entirely bound within the polymerized lens body and can be removed only by breaking the polymer bonds formed during the curing of the lens.

In one example, the wetting agent linker, such as the ophthalmically acceptable acid, is part of the composition forming the lens, such as the polymerized composition forming the lens, and can be present with one or more conventional components found in a contact lens, such as a hydrogel contact lens including, but not limited to, at least one polymer (such as at least one hydrophilic polymer, at least one hydrophobic polymer, or combinations thereof); optionally at least one crosslinking agent; optionally at least one initiator; optionally, at least one tinting agent; optionally at least one UV blocking agent, wherein the polymer present in the polymerized composition can be a homopolymer, copolymer, interpenetrating polymer network (IPN), block polymer, and/or other forms of polymer. It is to be understood that reference to the polymerized composition, which is formed from the at least one polymer, is a polymer which can be formed from one or more monomers, such as one or more hydrophilic monomers, one or more hydrophobic monomers, combinations thereof, and the like. It is also to be understood that reference to the contact lens formed from the compositions described herein is a lens body with an anterior surface and a posterior surface, the posterior surface being configured to be placed in contact with the cornea of an eye of a contact lens wearer. The lens body of the present invention can be entirely transparent. Alternatively, when the contact lens is a cosmetic lens configured to alter the appearance of an iris of a contact lens wearer, the lens body can comprise a transparent optic zone circumscribed by a cosmetic portion dimensioned to overlay the iris of the eye. Transparent lenses may also include a handling tint to provide a color to the lens.

As an example, contact lenses having extended and rechargeable wettability comprise a lens body that comprises a reaction product of a polymerizable composition including at least one ophthalmically acceptable acid, which is at least surface treated with a first 1,3 polyol with at least five pendant hydroxyl groups to attach the polyol to the lens, including at least the surface. The ophthalmically acceptable acid is distributed in the reaction product within the lens body including some exposure at a lens surface thereof. The ophthalmically acceptable acid of the lens body, having an anterior surface and a posterior surface, interacts with the polyol with at least five pendant hydroxyl groups to attach the polyol to at least the lens surface. The resulting lens body with the treated lens surface has good wettability, such as can be shown by an advancing contact angle of less than 100° and/or a water break up time (WBUT) of greater than five seconds, which are maintained following in vitro testing for a duration of at least 6 hours. The present contact lenses when worn can be in contact with epithelial tissue or other eye tissues. The present contact lenses can be soft contact lenses, hard contact lenses, or hybrid contact lenses comprising a rigid central portion circumscribed by a soft peripheral portion. As used herein, a soft contact lens is a contact lens that can conform to the shape of the cornea of an eye of a lens wearer or can otherwise be folded upon itself without breaking. A hard contact lens is a contact lens that cannot be folded upon itself without breaking. A soft contact lens can be a hydrogel contact lens, that is, a contact lens that is capable of retaining water in an equilibrium state. The hydrogel contact lens can be a silicone-free hydrogel contact lens or a silicone hydrogel contact lens. Other features and examples of the present contact lenses are described in the following sections.

In an example of the present contact lenses, the contact lens is a lens having at least one optic zone configured to provide vision correction, to improve visual acuity, or to both provide vision correction and improve visual acuity. For example, the optic zone can be configured to provide a spherical correction, a toric correction, or a third order or higher correction. The optic zone can be configured to improve visual acuity at near viewing distances, at far viewing distances, or at both near and far viewing distances. The present contact lenses can be spherical contact lenses, such as for correcting myopia or hyperopia; toric contact lenses, such as for correcting astigmatism; multifocal contact lenses, such as bifocal contact lenses, trifocal contact lenses, and the like for providing more than one refractive power.

The ophthalmically acceptable acid present in the composition or in the contact lens can be neutralized (e.g, partially or to various degrees), as an option. The pH of the overall composition containing the ophthalmically acceptable acid can be controlled or adjusted to achieve an optimal binding pH for the polyhydric alcohol, and this can be above or the same as or below a pKa of the acid species present.

As an option, the lens body which contains the ophthalmically acceptable acid can be first treated and/or recharged at elevated temperatures, such as 50 to 80 degrees C. or higher which can favorably reduce the amount of time to treat and/or recharge the lens body and thus place the wetting agent faster and/or more effectively on the lens surfaces.

Wetting drops containing a polyhydric alcohol or the same polyhydric alcohol can be used to recharge at least a portion of the lens. The wetting drops can be introduced to the lens when the lens is on the eye or when not in the eye. This is especially useful for the recharge of the anterior surface of the lens.

Definitions. In the context of the present description and claims, the following terminology will be used in accordance with the definitions described below.

As used herein, the term "hydrogel" refers to a polymeric material, typically a network or matrix of polymer chains, capable of swelling in water or becoming swollen with water. A hydrogel can also be understood to be a material that retains water in an equilibrium state. The network or matrix may or may not be cross-linked. Hydrogels refer to polymeric materials, including contact lenses that are water swellable or are water swelled. Thus, a hydrogel may be (i) unhydrated and water swellable, or (ii) partially hydrated and swollen with water, or (iii) fully hydrated and swollen with water. The hydrogel may be a silicone hydrogel, a silicone-free hydrogel, or an essentially silicone-free hydrogel.

The term "silicone hydrogel" or "silicone hydrogel material" refers to a particular hydrogel that includes a silicon (Si)-containing component or a silicone-containing component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material.

A "silicone-containing component" is a component that contains at least one [—Si—O—Si—] linkage, in a monomer, macromer or pre-polymer, wherein each silicon atom may optionally possess one or more organic radical substituents ($R_1$, $R_2$) or substituted organic radical substituents that may be the same or different, e.g., —$SiR_1R_2O$—.

An "essentially silicone-free hydrogel" refers to a hydrogel containing less than 0.1% (w/w) silicone-containing component.

The term "linker" is used herein to refer to an atom or a collection of atoms used to link interconnecting moieties, such as a polymer terminus and a block of repeat units. A linker moiety may be hydrolytically stable or may include a physiologically hydrolyzable or enzymatically degradable linkage. The linkers can be hydrolytically stable.

The term "length", e.g., in reference to a collection of atoms such as in a linker having a particular atom length, e.g., ranging from 2 to 50 atoms in length, is based upon the number of atoms in the longest chain of the collection of atoms, regardless of substituents. For example, —$CH_2CH_2$— is considered as having a length of two carbon atoms, even though each methylene group itself contains three atoms total, since the hydrogen atoms are substituents on the carbon and are not considered in approximating overall length of the chain. The linker, —O—C(O)—$CH_2CH_2$C(O)NH—, is similarly considered to possess a chain length of six atoms.

"Polyvinyl alcohols" or "poly(vinyl alcohols)" (abbreviated "PVOH") is the name for polymers comprising the general structure [—$CH_2$—CH(OH)—]$_m$, where m is a value of 1 or greater. The term "polyvinyl alcohol" also can refer to PVOH as a functional group attached to another molecular structure with one or more pendant hydroxyl groups of the PVOH intact.

"Attach" in the context of an interaction of PVOH and the ophthalmically acceptable acid can refer to any of graft, complex, bond (chemical bond or hydrogen), or adhere, unless specified otherwise. The PVOH attachment also can be "semi-permanent," such as optionally allowing for slow release of the attached PVOH from the acid during use, which may enhance comfort during lens wear.

"Molecular mass" in the context of a polymer described herein refers to the nominal average molecular mass of a polymer, typically determined by size exclusion chromatography, light scattering techniques, or intrinsic velocity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of macromer or polymers herein refer to the weight average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

A "network" or "matrix" of a hydrophilic polymer typically means that crosslinks are formed between the polymer chains by covalent bonds or by physical bonds, e.g. hydrogen bonds. A network can include two or more polymeric components, and can include an interpenetrating polymer network (IPN) in which one polymer is physically entangled with a second polymer such that there are few, if any, covalent bonds between them, but the polymers cannot be separated from each other without destroying the network.

A "hydrophilic" substance is one that is water-loving or has an affinity for water. Hydrophilic compounds have an affinity to water and are usually charged or have polar moieties or groups that attract water.

A "hydrophilic polymer" as used herein is defined as a polymer having an affinity for water and capable of absorbing water. A hydrophilic polymer is not necessarily soluble in water.

A "hydrophilic component" is a hydrophilic substance that may or may not be a polymer. Hydrophilic components include those that are capable of providing at least from about 20% (w/w), for example, at least from about 25% (w/w) water content to the resulting hydrated lens when combined with the remaining reactive components. A hydrophilic component can include hydrophilic monomers, hydrophilic macromers, hydrophilic pre-polymers, hydrophilic polymers, or combinations thereof. Hydrophilic macromers, hydrophilic pre-polymers, and hydrophilic polymers may also be understood to have hydrophilic portions and hydrophobic portions. Typically, the hydrophilic portion and the hydrophobic portion will be present in relative amounts such that the macromers, pre-polymers, or polymers are hydrophilic.

A "monomer" refers to a relatively low molecular weight compound, for example a compound with an average molecular weight less than about 700 Daltons, that is polymerizable. In one example, a monomer can comprise a single unit of a molecule containing one or more functional groups capable of polymerizing to combine with other molecules to form a polymer, the other molecules being of the same structure or different structures as the monomer.

A "macromer" refers to medium and high molecular weight compounds or polymers, which can contain one or more functional groups capable of further polymerization. For example, a macromer can be a compound with an average molecular weight of between about 700 Daltons and about 2,000 Daltons.

A "pre-polymer" refers to a polymerizable or crosslinkable higher molecular weight compound. In one example, a pre-polymer can be a series of monomers or macromers bonded together such that the overall molecule remains polymerizable or crosslinkable. For example, a pre-polymer can be a compound with an average molecular weight greater than about 2,000 Daltons.

A "polymer" refers to a material formed by polymerizing one or more monomers, macromers or pre-polymers. As used herein, a polymer is understood to refer to a molecule that is not capable of being polymerized, but is capable of being crosslinked to other polymers, for example, to other polymers present in a polymerizable composition or during the reaction of monomers, macromers or pre-polymers to form other polymers in a polymerizable composition.

An "interpenetrating polymer network" or "IPN" refers to a combination of two or more different polymers, in network form, of which at least one is synthesized and/or cross-linked in the presence of the other without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs.

A "pseudo IPN" refers to a polymeric reaction product where at least one of the different polymers is cross-linked while at least one other polymer is non-crosslinked (e.g. linear or branched), wherein the non-cross-linked polymer is distributed in and held by the cross-linked polymer on a molecular scale such that the non-cross-linked polymer is substantially inextractable from the network.

A "polymeric mixture" refers to a polymeric reaction product wherein different polymers are both linear or branched, substantially without cross-linking, wherein the resulting polymeric blend that is obtained is a polymer mixture on a molecular scale.

A "graft polymer" refers to a branched polymer having side chains comprising a homopolymer or copolymer different to that of the main chain.

"Attach" can refer to any of charge attachment, graft, complex, bond (chemical bond or hydrogen), or adhere, unless specified otherwise.

As used herein, an "ophthalmically acceptable lens forming component" refers to a lens forming component that can be incorporated into a hydrogel contact lens without the lens wearer experiencing or reporting substantial discomfort, including ocular irritation and the like. Ophthalmically acceptable hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort.

Additional definitions may also be found in the sections that follow.

Lens formulations. Hydrogels represent one class of materials used for the present contact lenses. Hydrogels comprise a hydrated, cross-linked polymeric system containing water in an equilibrium state. Accordingly, hydrogels are copolymers prepared from one or more hydrophilic monomers. The hydrophilic monomers are crosslinkable with a crosslinking agent.

The contact lenses can generally relate to hydrogel contact lens inclusive of silicone hydrogel and silicone-free (or essentially silicone-free) hydrogel lens materials. The hydrogel contact lenses have some features in common for purposes of the present invention. These features include, for example, a lens body of the contact lens that comprises a reaction product of a polymerizable composition comprising at least one hydrophilic monomer, at least one crosslinking agent that crosslinks the hydrophilic monomer during polymerization to form a first polymer component, and at least one ophthalmically acceptable acid. The ophthalmically acceptable acid can be distributed as a polymer component in polymeric or macromeric form in the reaction product within the lens body and at a lens surface thereof. Further, the lens body of the polymerized composition further is at least provided with at least one polyol, for example a 1, 3 polyol with at least five pendant hydroxyl groups. The polyol is attached to or present on at least a lens surface of the lens body via the ophthalmically acceptable acid.

Hydrophilic monomer. The hydrophilic monomer can be, for example, a silicone-containing monomer having a hydrophilic portion, a hydrophilic silicone-free monomer, or a combination thereof, which is compatible with the ophthalmically acceptable acid. The hydrophilic monomer can be used in combination with a hydrophobic monomer. The hydrophilic monomer can be a monomer having both hydrophilic and hydrophobic portions or moieties. The type and amount of hydrophilic monomer used in the polymerizable lens composition can vary depending on the types of other lens-forming monomers that are used. Non-limiting illustrations are provided herein with respect to hydrophilic monomers for use in silicone hydrogels and silicone-free hydrogels.

Crosslinking Agent. Crosslinking agents for the monomers, macromers or both, used in preparing the hydrogels can include those that are known in the art, and examples of the crosslinking agents are also provided herein. Suitable crosslinking agents include, for example, a diacrylate- (or divinyl ether-) functionalized ethylene oxide oligomer or monomer, such as, for example, tri(ethylene glycol) dimethacrylate (TEGDMA), tri(ethylene glycol)divinyl ether (TEGDVE), ethylene glycol dimethacrylate (EGDMA), and trimethylene glycol dimethacrylate (TMGDMA). Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

Ophthalmically acceptable acid. As previously stated, the ophthalmically acceptable acid is an acid capable of being immobilized chemically, physically, or both chemically and physically, in the lens body, including at least at a wetting portion at a surface of the lens body. The acid (or at least a portion, or significant portion) present in the polymerized lens body is not extracted or washed out during typical manufacturing, storage, and/or wear conditions (e.g., at least 90% by weight of the acid present when the lens is formed remains afterwards, such as from 90 wt % to 100 wt %, 95 wt % to 99.99 wt %, 97 wt % to 99 wt %, or 98 wt % to 99 wt %).

In one example, the ophathamically acceptable acid is a polymerizable acid, including a monomer, a macromer, or a pre-polymer comprising an ophthalmically acceptable acid moiety, as well as at least one functional group capable of polymerizing to combine with other molecules under the conditions used to prepare a polymerized contact lens body. In another example, the ophthalmically acceptable acid is a polymer capable of crosslinking with other components in the polymerizable composition during polymerization of the polymerizable composition to form the reaction product. The component of the polymerizable composition sourced from the ophthalmically acceptable acid can be a preformed polymer, a pre-polymer, a macromer or a monomer introduced to the polymerizable mixture forming the reaction product (e.g., the lens body), which can be distributed within the reaction product following polymerization. In another example, the ophthalmically acceptable acid can be distributed in the reaction product as a polymer, pre-polymer, macromer or monomer of an ophthalmically acceptable acid that is physically immobilized by another polymer component of the reaction product. The physical immobilization of the polymer, pre-polymer, macromer or monomer of the ophthalmically acceptable acid can be as an IPN, pseudo-IPN, or polymeric mixture, or any combination thereof. The component of the polymerizable composition sourced from the ophthalmically acceptable acid can be formed in situ in the formation of the reaction product of the lens body. The ophthalmically acceptable acid can, for example, co-polymerize with or graft onto another polymerizable component in the polymerizable composition.

The ophthalmically acceptable acid can be a polymerizable form of an ophthalmically acceptable inorganic acid or an ophthalmically acceptable organic acid. The ophthalmically acceptable inorganic acid can be, for example, a form of boronic acid or phosphoric acid, inclusive of polymerizable and polymerized forms thereof. Boronic acids can be, for example, vinylphenyl boronic acids and derivatives thereof. Vinylphenyl boronic acids can be, for example, 2-vinylphenyl boronic acid, 3-vinylphenyl boronic acid, 4-vinylphenyl boronic acid, 4-vinylphenyl boronic acid MIDA ester, (meth) acrylamido phenyl boronic acid, 2-(methacrylamido)phenyl boronic acid pinacol ester, 3-acrylamidophenylboronic acid, separately and in combinations thereof. The vinylphenyl boronic acid can, for example, have the following structure (1):

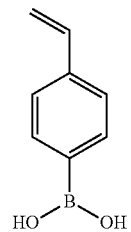

Other boronic acids that may be used include those described, for example, in U.S. Patent Application Publication Nos. 2007/0030443 A1, 2007/0116740 A1 and 2008/0151180 A1, which are incorporated herein by reference in their entireties.

The ophthalmically acceptable organic acid can be, for example, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, ascorbic acid (L), aspartic acid (L), benzenesulfonic acid, benzoic acid, camphoric acid (+), camphor-10-sulfonic acid (+), capric acid (decanoic acid), caproic acid (hexanoic acid), caprylic acid (octanoic acid), carbonic acid, cinnamic acid, citric acid, cyclamic acid, dodecylsulfiiric acid, ethane-1,2-disulfonic acid, ethanesulfonic acid, formic acid, fumaric acid, galactaric acid, gentisic acid, glucoheptonic acid (D), gluconic acid (D), glucuronic acid (D), glutamic acid, glutaric acid, glycerophosphoric acid, glycolic acid, hippuric acid, hydrobromic acid, hydrochloric acid, isobutyric acid, lactic acid (DL), lactobionic acid, lauric acid, maleic acid malic acid (-L), malonic acid, mandelic acid (DL), methanesulfonic acid, naphthalene-1,5-disulfonic acid, naphthalene-2-sulfonic acid, nicotinic acid, nitric acid, oleic acid, oxalic acid, palmitic acid, pamoic acid, proprionic acid, pyroglutamic acid (-L), salicylic acid, sebacic acid, stearic acid, succinic acid, sulfuric acid, tartaric acid (+L), thiocyanic acid, toluenesulfonic acid (p), undecylenic acid, a polymerizable form of one of the above acids, and any combinations thereof.

In an example where the ophthalmically acceptable acid is VPB and the polyhydric alcohol is PVOH, a relatively small amount of VPB, for example, can be used in the polymerizable lens composition in order to produce a lens surface to attach sufficient PVOH or other polyhydric alcohol to achieve a wettable surface. The ophthalmically acceptable acid can be used, for example, in the polymerizable lens composition, as well as on the lens surface, in amounts of from about 0.01% (w/w) to about 10% (w/w), or from about 0.05% to about 5% (w/w), or from about 0.1% (w/w) to about 0.5% (w/w), or from about 0.1% (w/w) to about 0.3% (w/w), or other amounts, based on the total lens formulation weight.

Polyhydric Alcohol. The polyhydric alcohol provided on at least the surface of the lens body can be, a polyhydric alcohol with a backbone comprising at least three carbon atoms, the at least three carbon atoms bonded in a chain as a right carbon atom bonded to a center carbon atom, the center carbon atom bonded to a left carbon atom, wherein one and only one hydroxyl group is bonded to the right carbon atom, a hydroxyl group is not bonded to the center carbon atom, and one and only one hydroxyl group is bonded to the left carbon atom. For example, when the polyhydric alcohol is a diol, it is not a diol wherein the two hydroxyl groups are on the same carbon atom (i.e., the diol is not a geminal diol, such as, for example, a 1,1 diol). In another example, the polyhydric alcohol is not a diol wherein the two hydroxyl groups are attached to adjacent carbon atoms (i.e., the diol is not a vicinal diol, such as, for example, a 1, 2 diol). In another example, the first polyhydric alcohol comprises a diol wherein the two hydroxyl groups are positioned on a backbone of at least 3 carbon atoms, three of the at least 3 carbon atoms being a chain of 3 carbon atoms comprising a right carbon atom bonded to a center carbon atom and the center carbon atom bonded to a left carbon atom, such that one hydroxyl group is bonded to the right carbon, the center carbon atom does not have a hydroxyl group bonded to it, and the second hydroxyl group is bonded to the left carbon in the chain (i.e., the diol is a 1,3 diol).

In another example, the first polyhydric alcohol can comprise a polyol with a backbone of more than 3 atoms with more than two pendant hydroxyl groups bonded to the backbone, wherein three carbon atoms of the backbone comprise a chain of 3 carbon atoms comprising a right carbon atom bonded to a center carbon atom and the center carbon atom bonded to a left carbon atom, wherein additional atoms can be present in the backbone before or after the chain of 3 carbon atoms, and wherein the chain of 3 carbon atoms only has 2 of the more than 2 pendant hydroxyl groups bonded to the 3 carbons such that one and only one of the hydroxyl groups is bonded to the right carbon atom, no hydroxyl groups are bonded to the center carbon atom, and the second one and only one of the hydroxyl groups is bonded to the left carbon atom. For example, the polyhydric alcohol can be a 1,3 polyol, a 2,4 polyol, a 3,5 polyol, etc. In another example, the first polyhydric alcohol comprises a polyol with at least 5 pendant hydroxyl groups, such as, for example, a 1,3 polyol with at least 5 pendant hydroxyl groups, a 2,4 polyol with at least 5 pendant hydroxyl groups, a 3,5 polyol with at least 5 pendant hydroxyl groups, etc. In another example, the first polyhydric alcohol comprises a 1,3 polyol with at least 5 pendant hydroxyl groups, wherein the polyol has a backbone of more than 3 carbon atoms, one and only one of the hydroxyl groups is bonded to the $1^{st}$ carbon in the chain, no hydroxyl groups are bonded to the second carbon atom in the chain, another one and only one of the hydroxyl groups is bonded to the $3^{rd}$ carbon atom in the chain, and the remaining at least two hydroxyl groups are bonded to atoms of the backbone after the $4^{th}$ carbon of the backbone (e.g., the $5^{th}$, $6^{th}$, $7^{th}$ atoms of the backbone, etc.) In yet another example, the first polyhydric alcohol comprises a polyol with a backbone of more than 3 carbon atoms bonded to at least five pendant hydroxyl groups, wherein at least two hydroxyl groups are positioned on the chain of more than 3 carbon atoms such that there is a repeating series of a right carbon atom without a hydroxyl group bonded to a left carbon atom with one and only one hydroxyl group. Examples of this type of polyhydric alcohol include 1,3,5 polyols, 2,4,6 polyols, etc.

The polyhydric alcohol provided on at least the surface of the lens body can be, for example, a polyhydric alcohol with at least five pendant hydroxyl groups. In one example, the polyhydric alcohol with at least five pendant hydroxyl groups is a polyhydric alcohol with at least five pendant hydroxyl groups wherein two of the pendant hydroxyl groups are attached to the first and the third carbon in a chain (i.e., the polyhydric alcohol is a 1,3 polyol with at least 3 additional hydroxyl groups attached to the chain after the 3 position, such as, for example, on a 9 or more carbon chain, in the 5 position, the 7 position and the 9 position, etc.).

The polyhydric alcohol provided on at least the surface of the lens body can be, in yet another example, a polyhydric alcohol with at least 5 pendant hydroxyl groups, wherein at least two of the hydroxyl groups are positioned on a chain of more than 3 carbon atoms such that there is one carbon atom without a hydroxyl group bonded to it between two carbons each having one hydroxyl group bonded to them. For example, the polyhydric alcohol with at least 5 pendant hydroxyl groups can have the first two hydroxyl groups bonded to the $2^{nd}$ and $4^{th}$ carbons of the carbon chain, with the remaining at least 3 hydroxyl groups bonded to the $5^{th}$ carbon, the $6^{th}$ carbon, the $7^{th}$ carbon, etc. The polyhydric alcohol can be a polyhydric alcohol with at least 5 pendant hydroxyl groups, wherein the at least five of the hydroxyl groups are bonded anywhere along the carbon chain such that one carbon without a hydroxyl group bonded to it is present between each carbon with one hydroxyl group bonded to it. The polyhydric alcohol can be a polyhydric alcohol with at least five pendant hydroxyl groups, wherein at least two of the hydroxyl groups are positioned on a chain of more than 3 carbon atoms such that there is one carbon atom without a hydroxyl group bonded to it, the carbon atom positioned between two carbon atoms, each of the two carbon atoms having one hydroxyl group bonded to them, and wherein none of the remaining 3 hydroxyl groups are in the geminal position or in the vicinal position with respect to each other and to the first two hydroxyl groups.

The polyhydric alcohol provided on at least the surface of the lens body can be, for example, a polyhydric alcohol having at least five pendant hydroxyl groups, such as a polyhydric alcohol having at least five, or six, or seven, or eight, or nine, or ten, or eleven or more, pendant hydroxyl groups. The indicated number of hydroxyl groups refers to the hydroxyl groups present in the polyhydric alcohol as attached to the ophthalmically acceptable acid in the lens body. The polyhydric alcohol with at least five pendant hydroxyl groups can have a weight average molecular weight of at least 10,000, at least 50,000, at least 100,000, or at least 125,000 (e.g., about 10,000 to about 500,000, about 50,000 to about 300,000, or about 50,000 to about 200,000).

The polyhydric alcohol having at least five pendant hydroxyl groups can be a form of polyvinyl alcohol. The polyvinyl alcohol can have a weight average molecular weight in the range of from about 4,000 to about 300,000 Daltons, or in the range of about 60,000 to about 210,000 Daltons, or in the range of about 80,000 to about 150,000 Daltons or higher, or in the range from about 120,000 to about 210,000 Daltons, or in the range from about 140,000 to about 190,000 Daltons. The polyvinyl alcohol can be hydrolyzed to an extent, for example, of at least 50% (mole %), at least 88% (mole %) or at least 98% hydrolyzed (mole %) (e.g., 50% to 99.9%, 70% to 99%, 75% to 99.5% (mole %)). At least one form of polyvinyl alcohol can be used having a viscosity of, for example, from about 50 centipoise to about 70 centipoise, such as determined using the falling ball method in a 4% solution in water at 20° C.

Polyvinyl alcohols typically are manufactured by polymerization of vinyl acetate, which unlike vinyl alcohol, is stable. The polyvinyl acetate produced then undergoes alcoholysis. As the technical properties of polyvinyl alcohol depend in the first place on the molar mass and residual acetyl group content, industrial manufacturing processes are designed to ensure exact adherence to these parameters. As polyvinyl alcohols are commonly prepared by partial or complete hydrolysis of polyvinyl acetate to remove acetate groups, polyvinyl alcohols are commonly divided into two types based on the level of hydrolysis achieved in the final PVOH product, i.e., partially hydrolyzed and fully hydrolyzed types, depending upon the mole percentage (mol %) of residual acetate groups that remain in the molecule after polyvinyl acetate has been hydrolyzed to polyvinyl alcohol.

The polyhydric alcohol component can comprise a mixture of two or more polyhydric alcohols. The mixture can be a mixture of two or more types of polyhydric alcohols, such as a polyvinyl alcohol and a different polyhydric alcohol. The mixture can be a mixture of two or more polyhydric alcohols of the same type having different average molecular weights such as, for example, a polyvinyl alcohol with an average molecular weight of about 100,000 Daltons and a polyvinyl alcohol with an average molecular weight of about 200,000 Daltons. The mixture can be a mixture of two or more polyhydric alcohols with different viscosities. The mixture can be a mixture of two or more polyhydric alcohols with different levels of hydrolysis, such as, for example, a polyvinyl alcohol with a hydrolysis level of 89% and a polyvinyl alcohol with a hydrolysis level of 98%. When the mixture of two or more polyhydric alcohols is a mixture of two polyhydric alcohols, the two polyhydric alcohols can be present at a ratio of about 95:5 (w:w), about 90:10 (w:w), about 80:20 (w:w), about 70:30 (w:w), about 60:40 (w:w), or about 50:50 (w:w).

Although in practice water is generally the solvent used for PVOH, a number of other suitable solvents or solvent mixtures do exist. While the solution can be free of solvents other than water, it is understood that other solvents may be used in place of, or in conjunction with water. For example, the solvent can be a buffer, such as, for example, phosphate buffered saline (PBS), including 30 mM PBS. PVOH solutions can be used in the present invention for wetting or soaking contact lenses and can have a PVOH concentration from about 0.01 (w/w) to about 15% (w/w), or from about 0.05% (w/w) to about 5% (w/w), or from about 0.1% (w/w) to about 3% (w/w). An example of a PVOH solution is an aqueous or saline solution with at least 0.05% (w/w) PVOH. Another example of a PVA solution is an aqueous solution of from about 0.25 (w/w) to about 1% (wt/wt) MOLWIOL 40-88 PVA, commercially available from Kuraray (Houston, Tex., USA). Other PVOH concentrations also may be suitable. However, it is recognized that the optimal concentration can depend on the grade of PVOH, the molecular weight of the PVOH, or both. Such concentrations will be apparent or easily determinable by those of skill in the art through routine experimentation.

In one example, the PVOH solution can include boric acid. The presence of the boric acid causes the PVOH to gel, thereby increasing the viscosity of the solution. While not being bound by any theory, it is believed that including boric acid in the solution may cause the PVOH to at least partially crosslink to itself, thus making it possible to increase the thickness of the "layer" of PVOH which can adhere to the lens. Additionally, it is believed that crosslinked PVOH migrates from the lens surface into the bulk of the lens to a lesser extent as compared to non-crosslinked PVOH. Depending upon the lens formulation and the form of PVOH used for surface treatment, migration of PVOH from the lens surface into the bulk of the lens can produce changes in some properties of the lens body such as, for example, modulus, and tensile strength, and also lens shape. Instead of adhering single "strands" of PVOH to the lens, multiple "strands" of at least partially crosslinked PVOH can be adhered to the lens, thus increasing the "depth" of the layer of PVOH on the lens, and making it more difficult for the bulkier crosslinked PVOH to migrate into the lens body. For example, boric acid can be included at a concentration of between 0.0005% (w/w) and 1%, (w/w) or between about 0.01% (w/w) and about 0.2% (w/w), in a solution of PVOH.

In another example, the PVOH solution can include a second polymer. The second polymer can include, for example, a form of polyvinyl pyrrolidone, a polymeric form of phosphoryl choline, such as, for example, 2-methacryloyloxy ethyl phosphorylcholine (MPC, HEMA-PC), or a polymeric form of hydroxyl propyl methyl cellulose (HPMC). Mixing PVOH and a second polymer can result in the two polymers becoming entangled. The PVOH and second polymer solution can be heated to increase the level of entanglement. As the second polymer is entangled with the PVOH, when the solution is used to treat at least the surface of a lens body containing an ophthalmically acceptable acid, when the PVOH attaches to the ophthalmic acid, the entangled second polymer will be attached as well.

FIGS. 1A, 1B, 1C and 1D are non-limiting schematics of formation of a layer of a polyol on a surface comprising a polymerized lens body containing an ophthamically acceptable acid, wherein a polyvinyl alcohol having five or more hydroxyl groups is attached to a polymer of 4-vinylphenyl boronic acid (VPB). As shown in FIG. 1A, a form of vinylphenyl boronic acid is reacted to form a polymerized reaction product, for example, a contact lens body. The lens body is shown with boronic acid groups present on the surface of the lens body. The boronic acid can be polymerically bonded and thus be part of the polymer matrix of the lens body. Alternatively, the boronic acid can be a non-polymerizable form that is dispersed in the monomer mix that is reacted to form the lens body, thereby trapping the dispersed acid in the polymerized lens body. The lens body is then contacted with a solution containing a polyol, for example a polyvinyl alcohol having at least five pendant hydroxyl groups. As shown in FIG. 1A, PVOH molecules are then attached to the boronic acid groups on at least the surface of the lens body.

Figure 1B:
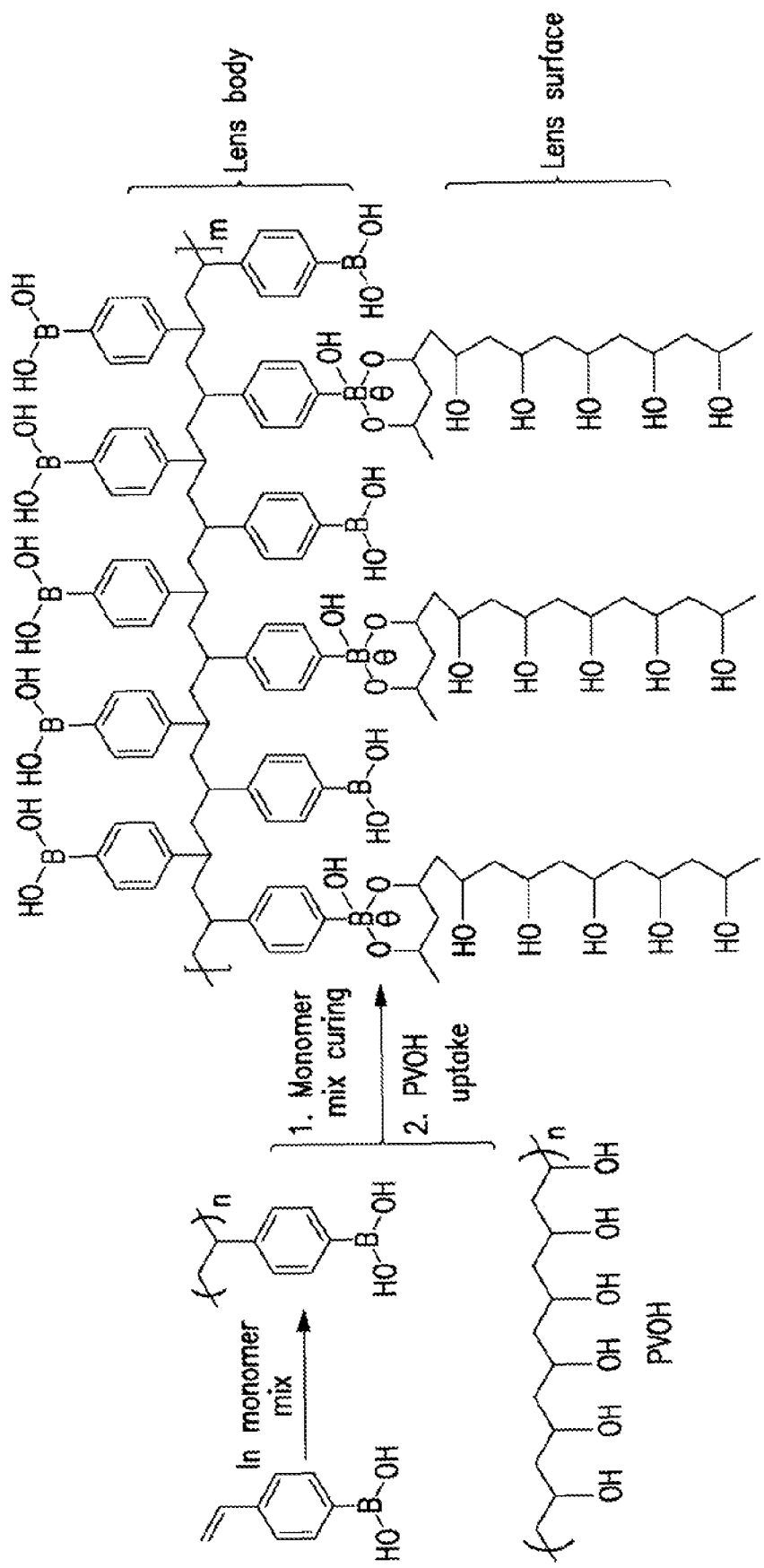

As shown in FIG. 1B, a polymerizable form of vinylphenyl boronic acid is reacted to form a lens body composed of a homopolymer of the acid in the reaction product. The lens body is then contacted with a solution containing a polyvinyl alcohol having at least five pendant hydroxyl groups. As shown in FIG. 1B, PVOH chains having at least five pendant hydroxyl groups are then attached to portions of the homopolymer on at least the surface of the lens body.

Figure 1C:
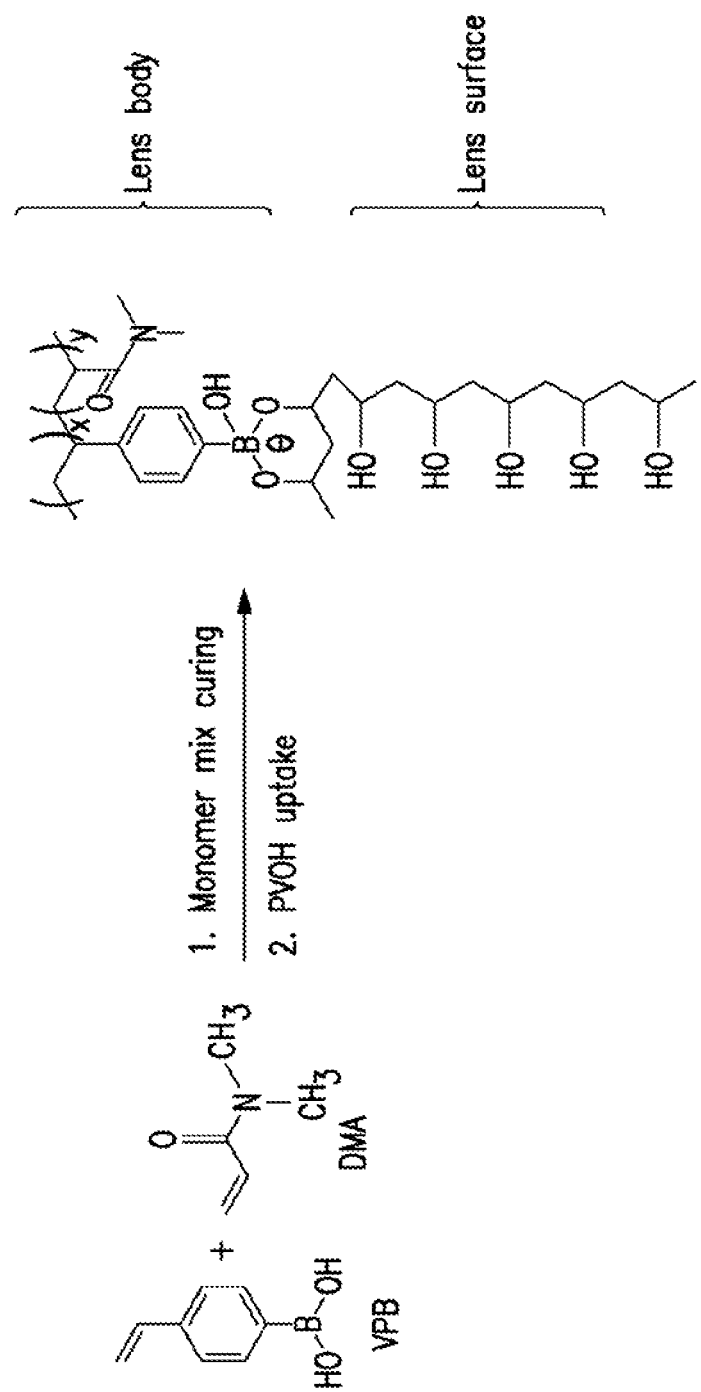

As shown in FIG. 1C, a polymerizable form of vinylphenyl boronic acid is reacted with N,N-dimethyl acrylamide (DMA) to form a lens body composed of a copolymer of the acid and DMA. The lens body is then contacted with a solution containing a polyvinyl alcohol having at least five pendant hydroxyl groups. As shown in FIG. 1C, PVOH chains having at least five pendant hydroxyl groups are then attached to portions of the copolymer on at least the surface of the lens body.

Figure 1D:
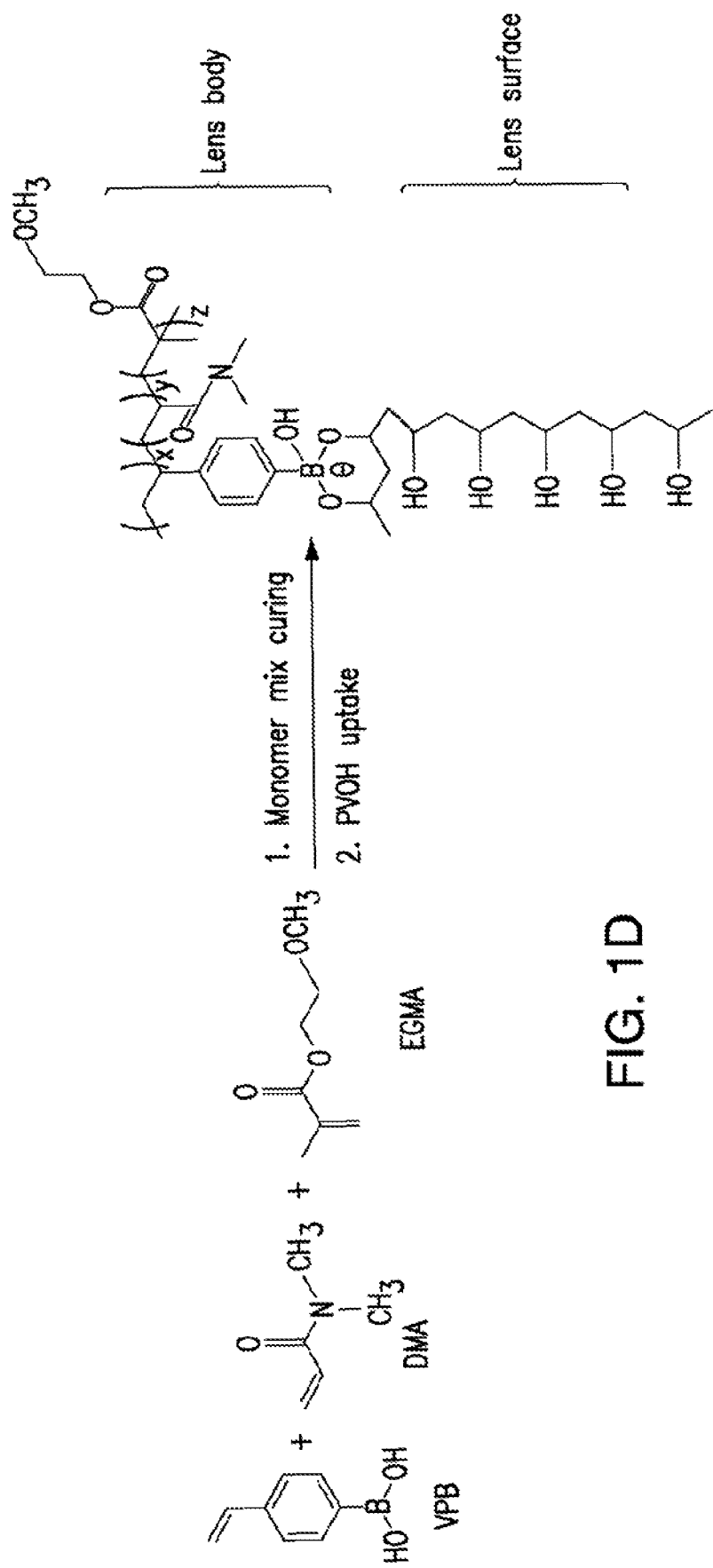
Figure 2:
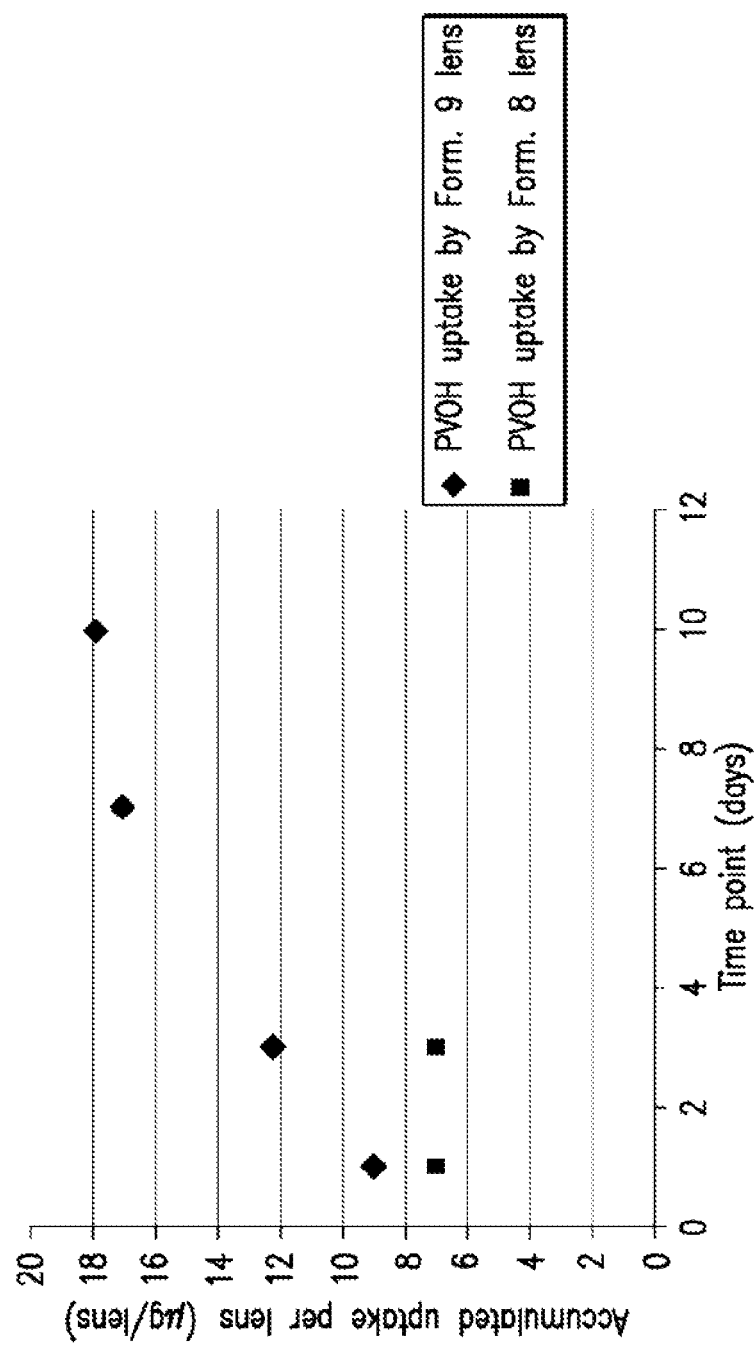
FIG. 2 is a graph demonstrating the accumulated uptake of polyvinyl alcohol over time of hydrogel contact lens products manufactured with an opthalmically acceptable acid and a control lens manufactured without the acid.

As shown in FIG. 1D, a polymerizable form of vinylphenyl boronic acid is reacted with DMA and ethylene glycol methyl ethyl methacrylate (EGMA) to form a lens body composed of a copolymer of the acid, DMA and EGMA. The lens body is then contacted with a solution containing a polyvinyl alcohol having at least five pendant hydroxyl groups. As shown in FIG. 1D, PVOH chains having at least five pendant hydroxyl groups are then attached to portions of the copolymer on at least the surface of the lens body.

In one example, the lens body can be autoclaved in the solution containing the polyol. The autoclave conditions may be, for example, from about 100° C. to about 150° C. for a time period of from about 20 minutes to about 40 minutes, or may be from about 110° C. to about 130° C. for a time period of from about 25 minutes to about 35 minutes.

Silicone Hydrogel Lens Formulations. A silicone hydrogel lens formulation comprises at least one silicone-containing component that is compatible with the ophthalmically acceptable acid, the at least one hydrophilic monomer, the at least one crosslinking agent, and the polyhydric alcohol at the lens surface. With respect to polymerizable lens formulations as discussed herein, "compatible" components refer to components which, when present in a polymerizable composition prior to polymerization, form a single phase that is stable for a duration of time adequate to allow manufacture of a polymerized lens body from the composition. For some components, a range of concentrations may be found to be compatible. Additionally, "compatible" components are components which, when polymerized to form a polymerized lens body, produce a lens that has adequate physical characteristics to be used as a contact lens (e.g., adequate transparency, modulus, tensile strength, etc.)

Silicone-containing component. The Si and attached O portion (Si—O portion) of the silicone-containing component can be present in the silicone-containing component in an amount greater than 20% (w/w), for example greater than 30% (w/w), of the total molecular weight of the silicone-containing component. Useful silicone-containing components comprise polymerizable functional groups such as acrylate, methacrylate, acrylamide, methacrylamide, N-vinyl lactam, N-vinylamide, and styryl functional groups. Silicone hydrogel contact lenses produced as described herein can be based on a silicone-containing monomer and a hydrophilic monomer or co-monomer. In addition to the silicone-containing compounds represented by formula (I) described herein, examples of other silicone-containing components that may be useful in the present lenses can be found in U.S. Pat. Nos. 3,808,178, 4,120,570, 4,136,250, 4,139,513, 4,153,641, 4,740,533, 5,034,461, 5,496,871, 5,959,117, 5,998,498, and 5,981,675, and U.S. Pat. Application Publication Nos. 2007/0066706 A1, 2007/0296914 A1, and 2008/0048350 A1, all of which are incorporated in their entireties herein by reference. The silicone-containing component can be a silicone-containing monomer or macromer.

A silicone-containing monomer, macromer or prepolymer can have, for example, the following general structure (II):

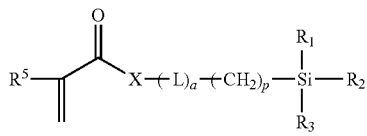

where $R^5$ is H or $CH_3$, X is O or $NR^{55}$ where $R^{55}$ is H or a monovalent alkyl group with 1 to 4 carbon atoms, a is 0 or 1, L is a divalent linking group which comprises from 1 to 20 carbon atoms, or from 2 to 10 carbon atoms, which can also optionally comprise ether and/or hydroxyl groups, for example, a polyethylene glycol chain, p can be from 1 to 10, or from 2 to 5, $R_1$, $R_2$, and $R_3$ can be the same or different and are groups independently selected from hydrocarbon groups having 1 to about 12 carbon atoms (e.g., methyl groups), hydrocarbon groups substituted with one or more fluorine atoms, a siloxanyl group, and siloxane chain-containing moieties, wherein at least one of $R^1$, $R^2$, and $R_3$ comprises at least one siloxane unit (—OSi). For example, at least of one of $R_1$, $R_2$, and $R_3$ can comprise —$OSi(CH_3)_3$ and/or —OSi($R^{52}R^{53}R^{54}$) where $R^{52}$, $R^{53}$ $R^{54}$ are independently ethyl, methyl, benzyl, phenyl or a monovalent siloxane chain comprising from 1 to about 100, or from 1 to about 50, or from about 1 to about 20, repeating Si—O units.

One, two, or all three of $R_1$, $R_2$, and $R_3$ can also comprise other siloxanyl groups or siloxane chain-containing moieties. The combined linkage of —X-L-, where present in a silicone-containing monomer, macromer or prepolymer of structure (II), can contain one or more heteroatoms that are either O or N. The combined linkage can be straight chain or branched, where carbon chain segments thereof can be straight chain. The combined linkage of —X-L- can optionally contain one or more functional groups selected from, e.g., carboxyl, amide, carbamate, and carbonate. Examples of such combined linkages are provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference. The silicone-containing monomer, macromer or prepolymer of the present invention can comprise a single acryloyl group, such as shown in structure (II), or optionally can possess two acryloyl groups, such as one at each terminus of the monomer. Combinations of both types of the silicone-containing components optionally can be used in polymerizable compositions of the present invention.

The molecular weight of the silicone-containing monomer of structure (II) generally can range from about 200 to about 2000 Daltons, or from about 300 to about 1500 Daltons, or from about 500 to about 1200 Daltons.

Examples of silicone-containing components of the present invention include, for example, polysiloxanylalkyl (meth)acrylic monomers including, without limitation, methacryloxypropyl tris(trimethylsiloxy)silane, pentamethyldisiloxanyl methylmethacrylate, and methyldi(trimethylsiloxy)methacryloxymethyl silane.

Specific examples of the silicone-containing components can be, for example, 3-[tris(trimethylsilyloxy)silyl]propyl methacrylate ("Tris" available from available from Gelest, Morrisville, Pa., USA), and monomethacryloxypropyl terminated polydimethylsiloxane (available from Gelest, Morrisville, Pa., USA). These silicone-containing components can have an alkylene group as a divalent linkage group (e.g., —$(CH_2)_p$—) and "a" can be 0 with reference to structure (II), and at least two siloxanyl groups. These silicone-containing components are designated herein as Structure (A) class silicone-containing components. Exemplary non-limiting structures of these silicone-containing components are shown as follows:

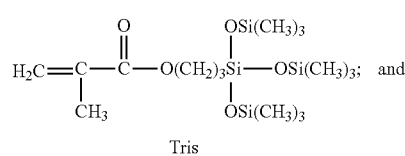

Tris

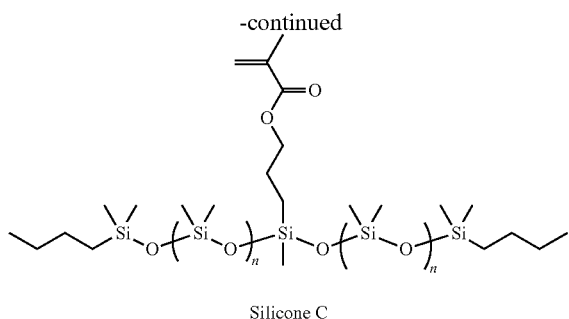

Silicone C

Other specific examples of silicone-containing components can be, for example, 3-methacryloxy-2-hydroxypropyloxy)propylbis(trimethylsiloxy) methylsilane ("SiGMA", available from Gelest, Morrisville, Pa., USA) and methyldi(trimethylsiloxy)sylylpropylglycerolethyl methacrylate ("SiGEMA"). These silicone-containing components include at least one hydroxyl group and at least one ether group in the divalent linking group L shown in structure (II) and at least two siloxanyl groups. These silicone-containing components are designated herein as Structure (B) class silicone-containing components. Additional details on this class of silicone-containing components are provided, for example, in U.S. Pat. No. 4,139,513, which is incorporated in its entirety herein by reference. SiGMA, for example, can be represented by the following exemplary non-limiting structure:

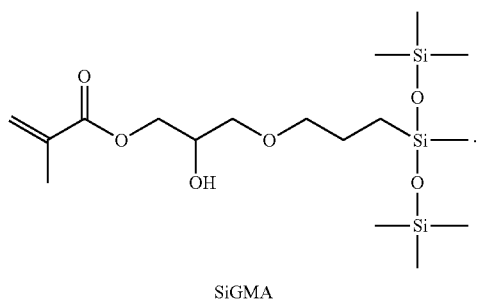 [SMILES: C=C(C)C(=O)OCC(O)COCCC[Si](C)(O[Si](C)(C)C)O[Si](C)(C)C]

SiGMA

Silicone-containing components of Structures (A) and (B) can be used individually or in any combinations thereof in polymerizable compositions of the present invention. Silicone-containing components of structures (A) and/or (B) are further used in combination with at least one silicone-free hydrophilic monomer, such as described herein. If used in combination, for example, the amount of silicone-containing monomers of Structure (A) can be, for example, from about 10% (w/w) to about 40% (w/w), or from about 15% (w/w) to about 35% (w/w), or from about 18% (w/w) to about 30% (w/w). The amount of silicone-containing components of Structure (B) can be, for example, from about 10% (w/w) to about 45% (w/w), or from about 15% (w/w) to about 40% (w/w), or from about 20% (w/w) to about 35% (w/w).

Other silicone-containing components also can be used. For example, other suitable types can include, for example, poly(organosiloxane) pre-polymer such as α,ω-bismethacryloxy-propyl polydimethylsiloxane. Another example is mPDMS (monomethacryloxypropyl terminated mono-n-butyl terminated polydimethylsiloxane). Other useful silicone-containing components include silicone-containing vinyl carbonate or vinyl carbamate monomers including, without limitation, 1,3-bis[4-(vinyloxycarb-onyloxy)but-1-yl]tetramethylsiloxane 3-(vinyloxycarbonylthio)propyl-[tris(trimethylsiloxysilane], 3-[tris(trimethylsiloxy)silyl]propyl allyl carbamate, 3-[tris(trimethylsiloxy)silyl]propyl vinyl carbamate; trimethylsilylethyl vinyl carbonate, and trimethylsilylmethyl vinyl carbonate. Examples of one or more of these silicone-containing components can be provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference.

Silicone-Free Monomers. Hydrophilic silicone-free monomers are included in the polymerizable compositions used to make the present contact lenses. The silicone-free monomers exclude hydrophilic compounds that contain one or more silicon atoms. Hydrophilic silicone-free monomers can be used in combination with silicone-containing monomers in the polymerizable compositions to form silicone hydrogels. Hydrophilic silicone-free monomers can be used in combination with other silicone-free monomers, including silicone-free hydrophilic monomers and silicone-free hydrophobic monomers, in the polymerizable compositions to form silicon-free hydrogels. In silicone hydrogels, hydrophilic silicone-free monomer components include those that are capable of providing at least about 10% (w/w), or even at least about 25% (w/w) water content to the resulting hydrated lens when combined with the other polymerizable composition components. For silicone hydrogels, the total silicone-free monomers can be from about 25% (w/w) to about 75% (w/w), or from about 35% (w/w) to about 65% (w/w), or from about 40% (w/w) to about 60% (w/w), of the polymerizable composition.

Monomers that may be included as the silicone-free monomers typically possess at least one polymerizable double bond and at least one hydrophilic functional group. Examples of polymerizable double bonds include, for example, vinyl, acrylic, methacrylic, acrylamido, methacrylamido, fumaric, maleic, styryl, isopropenylphenyl, O-vinylcarbonate, O-vinylcarbamate, allylic, O-vinylacetyl and N-vinyl lactam and N-vinylamido double bonds. In one example, the hydrophilic monomers are vinyl-containing (e.g., an acrylic containing monomer or a non-acrylic vinyl containing monomer). Such hydrophilic monomers may themselves be used as crosslinking agents.

Such hydrophilic silicone-free monomers may be but are not necessarily crosslinking agents. Considered as a subset of acryloyl moieties as described above, an "acrylic-type" or "acrylic-containing" or acrylate-containing monomer is a monomer containing the acrylic group (CR'H=CRCOX) wherein R is H or $CH_3$, R' is H, alkyl, or carbonyl, and X is O or N, which are also known to polymerize readily.

For silicone hydrogels, the hydrophilic silicone-free component can comprise non-silicon containing monomer components comprising an acrylic monomer (e.g., a monomer with a vinyl group at the α-carbon position and a carboxylic acid terminus, a monomer with a vinyl group at the α-carbon position and an amide terminus, etc.) and hydrophilic vinyl-containing ($CH_2$=CH—) monomer (i.e., a monomer containing a vinyl group that is not part of an acrylic group).

Illustrative acrylic monomers include N,N-dimethylacrylamide (DMA), 2-hydroxyethyl acrylate, glycerol methacrylate, 2-hydroxyethyl methacrylate (HEMA), methacrylic acid, acrylic acid, methylmethacrylate (MMA), ethylene glycol methyl ether methacrylate (EGMA) and any mixtures thereof. In one example, the total acrylic monomer content is in an amount ranging from about 5% (w/w) to about 50% (w/w) of the polymerizable composition used to prepare a silicone hydrogel lens product, and can be present in an amount ranging from about 10% (w/w) to about 40% (w/w), or from about 15% (w/w) to about 30% (w/w), of the polymerizable composition.

As described above, the silicone-free monomers also can comprise a hydrophilic vinyl-containing monomer. Hydrophilic vinyl-containing monomers that may be incorporated into the materials of the present lenses include the following: N-vinyl lactams (e.g. N-vinyl pyrrolidone (NVP)), N-vinyl-N-methyl acetamide (VMA), N-vinyl-N-ethyl acetamide, N-vinyl-N-ethyl formamide, N-vinyl formamide, N-2-hydroxyethyl vinyl carbamate, N-carboxy-β-alanine N-vinyl ester. One example of a vinyl-containing monomer is N-vinyl-N-methyl acetamide (VMA). The structure of VMA corresponds to $CH_3C(O)N(CH_3)$—$CH$=$CH_2$. In one example, the total vinyl-containing monomer content of the polymerizable composition is in an amount ranging from about 0% to about 50% (w/w) of the polymerizable composition used to prepare the silicone hydrogel lens product, and can be present in an amount ranging from about 20% (w/w) to about 45% (w/w), or from about 28% (w/w) to about 40% (w/w), of the polymerizable composition. Other silicone-free lens-forming hydrophilic monomers known in the art also may be suitable.

Crosslinking agents for the silicone hydrogels include the above-indicated crosslinking agents. Examples of acrylate-functionalized ethylene oxide oligomers for use in crosslinking agents can include oligo-ethylene oxide dimethacrylate. The crosslinking agent can be TEGDMA, TEGDVE, EGDMA, TMGDMA, or any combinations thereof. Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

Silicone-Free Hydrogel Lens Formulations. Hydrophilic silicone-free monomers can be used without, or essentially without, the co-presence of silicone-containing monomers in polymerizable compositions used to prepare contact lenses of the present invention. A silicone-free hydrogel comprises a silicone-free monomer or monomers that are compatible with the ophthalmically acceptable acid, any other hydrophilic monomers and the crosslinking agent, and the polyhydric alcohol on at least the lens surface.

The silicone-free polymerizable composition can comprise, for example, one or more silicone-free monomers, for example hydroxyalkyl(alkyl)acrylate, and units of a methacrylate phosphorylcholine-monomer, and a crosslinking agent. HEMA-based formulations can be used. In an example formulation, hydroxyethyl methacrylate (HEMA), 2-methacryloyloxyethyl phosphorylcholine (MPC), and ethylene glycol dimethacrylate (EGDMA), can be used in combination. HEMA or other hydroxyalkyl(alkyl)acrylate can be used in amounts from about 50% (w/w) to about 90% (w/w), or about 65% (w/w) to about 80% (w/w), or about 70% (w/w) to about 80% (w/w), of the polymerizable composition. MPC or other methacrylate phosphorylcholine-monomers, HEMA, as well as other silicone-free monomers, can be used in amounts from about 3% (w/w) to about 20% (w/w), or about 6% (w/w) to about 18% (w/w), or about 9% (w/w) to about 15% (w/w) of the composition. A crosslinking agent, such as those indicated herein, can be present in an amount ranging from about 0.1% (w/w) to about 5% (w/w), or from about 0.3% (w/w) to about 2.5% (w/w), or from about 0.5% (w/w) to about 1% (w/w), of the polymerizable composition.

Additional Hydrogel Components. The silicone hydrogel and silicone-free hydrogel lens polymerizable compositions described herein can also include additional components, e.g., one or more initiators, such as one or more thermal initiators, one or more ultraviolet (UV) initiators, visible light initiators, combinations thereof, and the like, one or more UV absorber agents or compounds, or UV radiation or energy absorber, tinting agent, pigments, release agents, antimicrobial compounds, and/or other additives. The term "additive" in the context of the present application refers to a compound or any chemical agent provided in the present polymerizable hydrogel contact lens polymerizable compositions or pre-extracted polymerized hydrogel contact lens products, but which is not necessary for the manufacture of a hydrogel contact lens.

The polymerizable compositions may comprise one or more initiator compounds, i.e., a compound capable of initiating polymerization of a polymerizable composition. Thermal initiators, i.e., initiators having a "kick-off" temperature, can be used. For instance, one exemplary thermal initiator employed in the present polymerizable compositions of the invention is 2,2'-azobiz(isobutyronitrile) (VAZO®-64). VAZO®-64 possesses a kick-off temperature of about 62° C., which is the temperature at which the reactive components in the polymerizable composition will begin to polymerize. Another thermal initiator is 2,2'-azobis(2,4-dimethylpentanenitrile) (VAZO®-52), that possesses a kick-off temperature of about 50° C. Yet another thermal initiator for use in the compositions of the invention is azo-bis-isobutyronitrile (VAZO®-88), which has a kick-off temperature of about 90° C. All of the VAZO thermal initiators described herein are available from DuPont (Wilmington, Del., USA). Additional thermal initiators include nitrites such as 1,1'-azobis(cyclohexanecarbonitrile) and 2,2'-azobis(2-methylpropionitrile), as well as other types of initiators such as those available from Sigma Aldrich. Ophthalmically compatible silicone or silicone-free hydrogel contact lenses can be obtained from polymerizable compositions that comprise from about 0.05% (w/w) to about 0.8% (w/w), or from about 0.1% (w/w) to about 0.6% (w/w), of VAZO®-64 or other thermal initiator.

A UV absorber may be, e.g., a strong UV absorber that exhibits relatively high absorption values in the UV-A range of about 320-380 nanometers, but is relatively transparent above about 380 nm. Examples include photopolymerizable hydroxybenzophenones and photopolymerizable benzotriazoles, such as 2-hydroxy-4-acryloyloxyethoxy benzophenone, commercially available as CYASORB UV416 from Cytec Industries, West Paterson, N.J., USA, 2-hydroxy-4-(2 hydroxy-3-methacrylyloxy)propoxybenzophenone, and photopolymerizable benzotriazoles, commercially available as NORBLOC® 7966 from Noramco, Athens, Ga., USA. Other photopolymerizable UV absorbers suitable for use in the invention include polymerizable, ethylenically unsaturated triazines, salicylates, aryl-substituted acrylates, and mixtures thereof. Generally speaking, a UV absorber, if present, is provided in an amount corresponding to about 0.5 weight percent of the polymerizable composition to about 1.5 weight percent of the composition. For example, compositions can include from about 0.6% (w/w) to about 1.0% (w/w) of one or more UV absorbers.

The polymerizable compositions of the invention may also include a tinting agent, although both tinted and clear lens products are contemplated. In one example, the tinting agent is a reactive dye or pigment effective to provide color to the resulting lens product. Tinting agents can include, for example, VAT Blue 6 (7,16-Dichloro-6,15-dihydroanthrazine-5,9,14,18-tetrone), 1-Amino-4-[3-(beta-sulfatoethylsulfonyl)anilio]-2-anthraquinonesulfonic acid (C. I. Reactive Blue 19, RB-19), a copolymer of Reactive Blue 19 and hydroxyethylmethacrylate (RB-19 HEMA) 1,4-bis[4[(2-methacryl-oxyethyl)phenylamino]anthraquinone (Reactive Blue 246, RB-246, available from Arran Chemical Company, Athlone, Ireland), 1,4-Bis[(2-hydroxyethyl)amino]-9,10-anthracenedione bis(2-propenoic)ester (RB-247). Other exemplary tinting agents are disclosed for example, in U.S. Patent Application Publication No. 2008/0048350, the disclosure of which is incorporated herein by reference. Other suitable tinting agents for use in the present invention are phthalocyanine pigments such as phthalocyanine blue and phthalocyanine green, chromic-alumina-cobaltous oxide, chromium oxides, and various iron oxides for red, yellow, brown and black colors. Opaquing agents such as titanium dioxide may also be incorporated. For certain applications, a mixture of colors may be employed. If employed, tinting agents can be present in an amount ranging from about 0.1% (w/w) to about 15% (w/w), or about 1% (w/w) to about 10% (w/w), or about 4% (w/w) to about 8% (w/w).

The polymerizable compositions of the invention may also comprise a demolding aid, that is to say, one or more compounds effective in making more facile removal of the cured contact lenses from their molds. Exemplary demolding aids include hydrophilic silicones, polyalkylene oxides, and combinations thereof. The polymerizable compositions may additionally comprise a diluent selected from the group consisting of hexanol, ethoxyethanol, isopropanol (IPA), propanol, decanol and combinations thereof. Diluents, if employed, are typically present in amounts ranging from about 10% (w/w) to about 30% (w/w). Compositions having relatively higher concentrations of diluents tend to, but do not necessarily, have lower ionoflux values, reduced modulus, and increased elongation, as well as WBUTs greater than 20 seconds. Additional materials suitable for use in making hydrogel contact lenses are described in U.S. Pat. No. 6,867,245, which are incorporated herein by reference. In certain embodiments however, the polymerizable composition is diluent-free.

Preparation Methods for Lenses. Various processes are known for curing a polymerizable composition in the production of contact lenses, including spincasting and static casting. Spincasting methods involve charging the monomer mixture to a mold, and spinning the mold in a controlled manner while exposing the monomer mixture to UV light. Static casting methods involve charging the monomer mixture between two mold sections, one mold section shaped to form the anterior lens surface and the other mold section shaped to form the posterior lens surface, and curing the monomer mixture by exposure to UV light, heat, visible light, or other radiation. Additional details and methods for forming contact lenses can be found, for example, in U.S. Patent Application Publication Nos. 2007/0296914 and 2008/0048350, the disclosure of each of which is incorporated herein by reference.

After curing the reaction mixture, the resulting polymer is separated from the mold. In some situations, such in static cast molding, the two mold members are first separated before separating the polymer from the mold.

The resulting polymer can also be treated with a solvent to remove diluent (if used), unreacted components, byproducts, and the like, and hydrate the polymer to form the hydrogel. Lenses made using the present polymerizable formulations do not require extraction with organic solvents, aqueous solutions containing organic solvents, or water prior to hydration and packaging, although they can be extracted in this manner. The solvent may be water (or an aqueous solution such as physiological saline or an aqueous solution of a surfactant), or, depending on the solubility characteristics of the diluent and residual unpolymerized monomers, the solvent initially used can be an organic liquid such as ethanol, methanol, isopropanol, mixtures thereof, or the like, or a mixture of one or more organic liquids with water, followed by extraction with pure water (or physiological saline or a surfactant solution) to produce the silicone hydrogel comprising a polymer swollen with water. The extraction process, the hydration process, or both the extraction and hydration processes can be carried out using a heated liquid, a pressurized liquid, or a liquid under a vacuum. The silicone hydrogels after hydration can comprise 20% (w/w) to 80% (w/w) water, for example, 30% (w/w) to 70% (w/w) water, or 40% (w/w) to 60% (w/w) water of the total weight of the hydrogel. The silicone-free hydrogels after hydration can comprise 20% (w/w) to 80% (w/w) water, for example, 30% (w/w) to 70% (w/w) water, or 40% (w/w) to 60% (w/w) water of the total weight of the hydrogel.

Exemplary Polymerizable Compositions. The monomers of the present polymerizable compositions may be polymerized alone or copolymerized with other monomers to give a contact lens material.

A general formulation for contact lens materials described herein and based on a silicone hydrogel formulation is given in Table I.

TABLE I

Silicone Hydrogel Contact Lens Material Formulation

| Component | Examples | Wt/wt % |
|---|---|---|
| (a) First Monomer, Macromer or Prepolymer (i.e., silicone-containing) (used alone or in combination with (b)) | (Structure (B)) | 10%-45% |
| (b) Second Monomer, Macromer or Prepolymer (i.e., silicone containing) (used alone or in combination with (a)) | (Structure (A)) | 10%-40% |
| (c) Silicone-free Monomer (i.e., hydrophilic) | (See Table II) | 30%-90% |
| (d) Cross-linking Agent | (See Table III) | 0%-10% |
| (e) Polymerization Initiator | (See Table IV) | 0%-5% |
| (f) Ophthamically acceptable acid | (See Table V) | 0.1%-10% |

TABLE II

Silicone-free Co-monomers

| | |
|---|---|
| N,N-dimethylacrylamide | "DMA" |
| Methyl methacrylate | "MMA" |
| N-vinyl-N-methylacetamide | "VMA" |
| ethylene glycol methyl ether methacrylate | "EGMA" |
| methoxy polyethyleneglycol methacrylate | "MPEGMA" |

TABLE III

Crosslinkers

| | |
|---|---|
| triethyleneglycol dimethacrylate | "TEGDMA" |
| ethyleneglycol dimethacrylate | "EGDMA" |
| triallyl isocyanurate | "TAIC" |
| trimethylene glycol dimethacrylate | "TMGDMA" |
| triethylene glycol divinyl ether | "TEGDVE" |
| vinyl methacrylate | "VM" |
| pentaerythritol triacrylate | "PTA" |
| trimethylolpropane trimethacrylate | "TPTMA" |

TABLE IV

| Polymerization Initiators | |
|---|---|
| 2,2'-azobis(2,4-dimethylpentanenitrile) | "VAZO-52" |
| 2,2'-azobis(2-methylpropanenitrile) | "VAZO-64" |

TABLE V

| Ophthamically Acceptable Acid | |
|---|---|
| 4-vinylphenyl boronic acid | "VPB" |

Copolymers can be prepared by combining one or more silicone containing monomers, macromers or prepolymers, for example first and second silicone-containing monomers, such as combining Structure (A) and (B) monomers, with one or more silicone-free co-monomers, such as those described in Table II and a cross-linking agent, such as those described in Table III. The ophthamically acceptable acid of Table V and a polymerization initiator, such as those described in Table IV, is added to the mixture.

The copolymers are prepared in the form of contact lenses using suitable lens molds, or in the form of films made between Teflon-lined glass slides, by first combining the components listed in Table I. The monomer mixtures are dispensed into molds or the slide cavities and then the initiator is "kicked-off", for example, by heating to the appropriate kick-off temperature. After completion of molding, the molds are opened, and the lenses are separated from the molds. The lenses are then contacted with a polyhydric alcohol solution. The lenses can be hydrated in an aqueous solution prior to treatment with the polyhydric alcohol solution. Optionally, the lenses can be extracted in an organic solvent, such as, for example, a volatile alcohol, an aqueous solution of an organic solvent, or in an aqueous solution or water prior to hydration. In one method, the lenses can be autoclaved in an aqueous solution of the polyhydric alcohol, and then can be packaged in blisters or blister packs, such as blisters using a PBS solution.

A general formulation for the contact lens materials based on a silicone-free hydrogel formulation is given in Table VI.

TABLE VI

Silicone-free Hydrogel Contact Lens Material Formulation

| Component | | wt/wt % |
|---|---|---|
| (a) First Silicone-free Co-monomer (i.e., hydrophilic) | HEMA | 50%-90% |
| (b) Optional Second Silicone-free Co-monomer (i.e., hydrophilic) | (See Table II) | 3%-20% |
| (c) Cross-linking Agent | (See Table III) | 0%-10% |
| (d) Polymerization Initiator | (See Table IV) | 0%-5% |
| (e) Ophthamically acceptable acid | (See Table V) | 0.1%-10% |
| (f) Tinting agent | VAT Blue 6 | 0%-15% |

Contact lenses made with the present formulations can have enhanced wettability as shown, for example, by various properties thereof such as, for example, contact angle, water break up time (WBUT), take up of wetting solution, and others.

Properties of the Lenses. The lens surface of contact lenses can have an advancing contact angle of less than 100°, or less than 80°, or less than 70°, or less than 60°, or less than 50°. The advancing contact angle of the lens surface remains less than about 100° after about six hours, or after about 24 hours, or after about 48 hours, of storage in a packaging solution free of a form of polyhydric alcohol which is a polyol with at least 5 pendant hydroxyl groups, including a 1,3 polyol with at least 5 pendant hydroxyl groups.

The lens surface has a water break up time (WBUT) of greater than five seconds, or at least 10 seconds, or at least 15 seconds, or at least 20 seconds.

The lens surface can maintain an advancing contact angle of less than 100° and the water break up time of greater than five seconds following in vitro testing for duration of at least 6 hours, or at least 12 hours, or at least 24 hours, or at least 48 hours.

At least 30%, or at least 45%, or at least 60%, of the at least one form of polyhydric alcohol that is initially present onto the lens surface remains in place after at least 6 hours, or at least 12 hours, or least 24 hours, or at least 48 hours, of in vitro testing, and after at least 6 hours, or at least 12 hours, of in vivo testing.

At least 50%, or least 60%, or at least 70%, or at least 80% (e.g., 50% to 99.9%, 60% to 95%, 70% to 90%, 75% to 95%, 80% to 99%, 85% to 99%) by weight of the ophthalmically acceptable acid originally present in the polymerizable composition remains present in the lens body and/or on the lens surface after about six hours, or after 12 hours, or after 24 hours, or after 48 hours, based on in vitro testing.

Contact lens package. A contact lens package is provided comprising the contact lens body, such as described above, and a packaging solution comprising another polyhydric alcohol, such as a polyhydric alcohol with at least five pendant hydroxyl groups. When a polyhydric alcohol is present on the lens surface, is present in the packaging solution, or both, the lenses have been found not to stick to packaging components. The polyhydric alcohol provided on the surface of the lens body and the polyhydric alcohol of the packaging solution can be the same or different. The different polyhydric alcohols can have the same or different average molecular weights. One or both of the different polyhydric alcohols can be, for example, forms of polyvinyl alcohol. The polyhydric alcohol, such as the polyhydric alcohol with at least five pendant hydroxyl groups, can be present in the packaging solution at a concentration, for example, of at least about 0.001% (w/w), or at least about 0.01%, or at least about 0.1%, or at least about 0.25% (w/w), or at least about 0.5% (w/w), or at least about 1% (w/w), or at least about 2% (w/w), by weight (e.g., from about 0.001% to about 5%, the upper limit being dictated by the viscosity of the solution).

With respect to the contact lens package, the package can further comprise a base member with a cavity configured to hold the contact lens body and the packaging solution, and a seal attached to the base member configured to maintain the contact lens and the packaging solution in a sterile condition for a duration of time equivalent to a shelf life of the contact lens. The contact lens body does not adhere to the base member or the seal, or the contact lens body adheres less frequently to the base member or the seal as compared with a substantially identical contact lens body without the polyhydric alcohol, for example a polyhydric alcohol with at least five pendant hydroxyl groups present on the lens surface. The contact lens body does not adhere to the base member or the seal, or the contact lens body adheres less frequently to the base member or the seal as compared with a substantially identical contact lens body without the polyhydric alcohol with at least five pendant hydroxyl groups present in the packaging solution.

Rewetting (recharging) the lenses. After a contact lens as described herein is worn by a user or is otherwise used in a manner wherein the polyhydric alcohol is lost at the modified lens surface, the lens can be recharged with a polyhydric alcohol wetting aid at least the lens surface by soaking or immersing (submerging) the lens body in an aqueous solution comprising a polyhydric alcohol, such as a polyhydric alcohol with at least five pendant hydroxyl groups. Soaking the lens body overnight (approx. 9-12 hours) at room temperature can be sufficient to recharge the surfaces of the lens adequately so that the lens again has an ophthalmically acceptable wettable surface.

As previously discussed, in another example of the present invention, the ophthalmically acceptable acid comprises at least one form of a boronic acid, boronic ester, boronic anhydride, or combination thereof. The at least one form of a boronic acid, boronic ester, boronic anhydride or combinations thereof is present in a lens body. The at least one form of a boronic acid, boronic ester or boronic anhydride can comprise a polymerizable form of the boronic acid, boronic ester, boronic anhydride, or combination thereof. The polymerizable form of the boronic acid, boronic ester, boronic anhydride, or combination thereof, instead of or in addition to being distributed as a second polymer component in the reaction product, can be present as a polymerizable component of the polymerizable composition, and, after polymerization, can be present as polymerized units of the copolymer that forms the lens body.

In this example, the lens body that is the polymerized reaction product can have at least one polyhydric alcohol present on at least one lens surface, i.e., the lens body may comprise a complexed lens body. The at least one polyhydric alcohol present on at least one lens surface may be present on both the anterior lens surface and the posterior lens surface. The at least one polyhydric alcohol may be present in the bulk of the lens body as well as on a lens surface. The polyhydric alcohol can comprise a polyhydric alcohol having at least one 1,3 diol moiety (i.e., a polyhydric alcohol with a backbone comprising at least three carbon atoms, the at least three carbon atoms bonded in a chain as a right carbon atom bonded to a center carbon atom, the center carbon atom bonded to a left carbon atom, wherein one and only one hydroxyl group is bonded to the right carbon atom, a hydroxyl group is not bonded to the center carbon atom, and one and only one hydroxyl group is bonded to the left carbon atom). Additionally, the polyhydric alcohol can comprise a polyhydric alcohol having at least one 1, 2 diol moiety, or having both a 1, 2 diol and a 1,3 diol moiety. In the example where the polyhydric alcohol is a polyhydric alcohol having at least one 1, 2 diol or 1,3 diol moiety, at least a portion of 1, 2 diol or 1,3 diol moieties present in the polyhydric alcohol can be complexed with at least a portion of boronic acid moieties present in the copolymer of the lens body (e.g., boronic acid moieties present on a lens surface, within the bulk of the lens body, or both). Alternatively, boronic acid moieties present in the copolymer of the lens body may not be complexed with 1, 2 or 1,3 moieties of a polyhydric alcohol, i.e., the lens body that is the polymerized reaction product may be an uncomplexed lens body. In one particular example, the uncomplexed lens body can be contacted with a solution of a polyhydric alcohol having 1, 2 diol or 1,3 diol moieties, and at least a portion of boronic acid moieties present in the copolymer of the lens body can complex with at least a portion of 1, 2 diol or 1,3 diol moieties present in the polyhydric alcohol solution, forming a complexed lens body.

The example can comprise a method of manufacturing a hydrogel contact lens body. The method of manufacturing a hydrogel contact lens body can comprise: (i) providing a lens body comprising at least one form of boronic acid, boronic ester, boronic anhydride or combination thereof; and (ii) contacting the lens body with a contacting solution comprising at least one form of tris(hydroxymethyl)aminomethane (TRIS).

The at least one form of the boronic acid, boronic ester, boronic anhydride or combination thereof can comprise a polymerizable form of the at least one form of the boronic acid, boronic ester, boronic anhydride or combination thereof. The at least one polymerizable form of the boronic acid, boronic ester, boronic anhydride or combination thereof can comprise a polymerizable form of boronic acid, a polymerizable form of boronic anhydride, or a combination of a polymerizable form of boronic acid and a polymerizable form of boronic anhydride. The at least one polymerizable form of the boronic acid, boronic ester, boronic anhydride or combination thereof can comprise a boronic acid. The at least one polymerizable form of the boronic acid, boronic ester, boronic anhydride or combination thereof can comprise a polymerizable form of a boronic acid. The at least one polymerizable form of the boronic acid, boronic ester, boronic anhydride or combination thereof can comprise a vinylphenyl boronic acid, for example, 2-vinylphenyl boronic acid, 3-vinylphenyl boronic acid, 4-vinylphenyl boronic acid, or a combination thereof. The at least one polymerizable form of the boronic acid, boronic ester, boronic anhydride or combination thereof can comprise a polymerizable form of boronic acid having the structure:

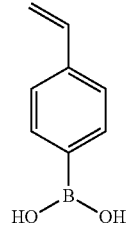

The at least one form of boronic acid, boronic ester, boronic anhydride or combination thereof can be present on at least a surface of the lens body, can be present on both the anterior and posterior surfaces of the lens body, can be present within the bulk of the lens body, and combinations thereof.

The lens body can comprise a hydrogel lens body. The hydrogel lens body can comprise a polymerized reaction product of a polymerizable composition, the polymerizable composition comprising at least one hydrophilic monomer, and at least one crosslinking agent; and the polymerized reaction product comprising a polymer formed of polymerized units of the at least one hydrophilic monomer, and crosslinks formed by the at least one crosslinking agent.

When the at least one form of a boronic acid, boronic ester, boronic anhydride, or combination thereof comprises a polymerizable form of the boronic acid, boronic ester, boronic anhydride, or combination thereof, the hydrogel lens body can be a polymerized reaction product of a polymerizable composition, the polymerizable composition comprising the at least one polymerizable form of the boronic acid, boronic ester, boronic anhydride, or combination thereof; at least one hydrophilic monomer; and at least one crosslinking agent; and the polymerized reaction product comprising a copolymer formed of polymerized units of the at least one polymerizable form of the boronic acid, boronic ester, boronic anhydride or combination thereof, polymerized units of the at least one hydrophilic monomer, and crosslinks formed by the at least one crosslinking agent.

The lens body (e.g., a complexed lens body or an uncomplexed lens body) can have an advancing contact angle less than about 120°, a modulus less than about 1.6 MPa, an ionoflux less than about $7 \times 10^{-3}$ mm$^2$/min., an oxygen permeability of less than about 120 Barrers, and an equilibrium water content of at least about 30%.

In another example, the lens body (e.g., an uncomplexed lens body or a complexed lens body) can have an advancing contact angle less than about 100°, a modulus from about 0.3 MPa to about 1.0 MPa, an ionoflux less than about $5 \times 10^{-3}$ mm²/min., an oxygen permeability of less than about 110 Barrers, and an equilibrium water content from about 35% to 65%.

In yet another example, the lens body (e.g., a complexed lens body or an uncomplexed lens body) can have an advancing contact angle less than about 60°, a modulus from about 0.4 MPa to about 0.7 MPa, an ionoflux less than about $4 \times 10^{-3}$ mm²/min., an oxygen permeability from about 55 Barrers to about 100 Barrers, and an equilibrium water content from about 40% to 65%.

The at least one form of the boronic acid, boronic ester, boronic anhydride or combination thereof can be present in the polymerizable composition at a concentration from about 0.1% to about 10.0%, from about 0.5% to about 5.0%, for from about 1.0 to about 2.0%.

The at least one hydrophilic monomer of the polymerizable composition can comprise a hydrophilic monomer having at least one vinyl moiety. The at least one hydrophilic monomer of the polymerizable composition can comprise a plurality of hydrophilic monomers. In one example, the plurality of hydrophilic monomers can comprise a first hydrophilic monomer having at least one vinyl moiety, and a second hydrophilic monomer having at least one methacrylate moiety.

The at least one crosslinking agent of the polymerizable can comprise a crosslinking agent having at least one vinyl moiety. The at least one crosslinking agent of the polymerizable composition can comprise a plurality of crosslinking agents. In one example, the plurality of crosslinking agents can comprise a first crosslinking agent having at least one vinyl moiety, and a second crosslinking agent having at least one methacrylate moiety.

The polymerizable composition can further comprise water. The water can be present in the polymerizable composition in a molar ratio of one boronic acid moiety to 3 water molecules. The water can be present in the polymerizable composition in an amount effective to convert an anhydrous cyclic trimer of boronic acid moieties into three separate boronic acid moieties. As trace amounts of water may already be present in components of the polymerizable composition, the amount of additional water required in the polymerizable composition in order for the a molar ratio of 1:3 to be present can be determined, for example, using a Karl Fischer technique. In one example, the anhydrous cyclic trimer of structure III present in the polymerizable composition can be converted into three separate boronic acid moieties of structure IV:

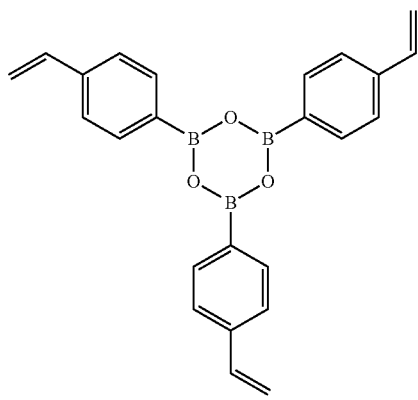

Structure III

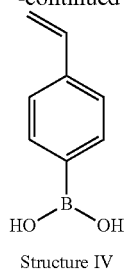

Structure IV

The polymerizable composition can further comprise at least one silicone-containing monomer, macromer or prepolymer. In this example, the presence of a polymerizable silicone-containing compound in the polymerizable composition results in the presence of polymerized units of the silicone-containing compound in the copolymer of the lens body, i.e., the copolymer further comprises polymerized units of the at least one silicone-containing monomer, macromer or prepolymer, and the uncomplexed hydrogel contact lens body comprises an uncomplexed silicone hydrogel contact lens body. The silicone-containing monomer, macromer or prepolymer can comprise a silicone-containing macromer or prepolymer.

The silicone-containing monomer, macromer or prepolymer can have an average molecular weight greater than about 1,000 Daltons, greater than about 2,500 Daltons, greater than about 5,000 Daltons, greater than about 7,000 Daltons, greater than about 9,000 Daltons, greater than about 10,000 Daltons, or greater than about 12,000 Daltons. The average molecular weight can be a weight average molecular weight determined by nuclear magnetic resonance (NMR).

The silicone-containing monomer, macromer or prepolymer can comprise a silicone-containing monomer, macromer or prepolymer having ethylene oxide (EO) units present in the backbone, the side chains, or both the backbone and the side chains of the monomer, macromer or prepolymer. The silicone-containing monomer, macromer or prepolymer can comprise at least about 10, at least about 15, at least about 20, at least about 25, at least about 30, at least about 35, or at least about 40 ethylene oxide (EO) units.

The silicone-containing monomer, macromer or prepolymer can comprise a silicone-containing monomer, macromer or prepolymer having at least about 10, at least about 50, at least about 80, at least about 90, or at least about 100 dimethyl siloxane (DMS) units present in the backbone, the side chains, or both the backbone and the side chains of the monomer, macromer or prepolymer.

When the silicone-containing compound comprises a silicone-containing monomer, macromer or prepolymer having ethylene oxide (EO) units present in the backbone, the side chains, or both the backbone and the side chains of the monomer, macromer or prepolymer, the silicone-containing compound will have a ratio of the number of ethylene oxide (EO) units present to the number of dimethyl siloxane (DMS) units present. In such an example, the ratio of the number of ethylene oxide units present to the number of dimethyl siloxane units present (EO/DMS ratio) can be from about 0.20 to about 0.55, from about 0.25 to about 0.50, or from about 0.35 to about 0.45.

The silicone-containing compound can comprise Silicone A, a silicone-containing component the same as, or similar in structure to, hydrophilic polysiloxane macromonomer A described in Example 2 of U.S. Patent Application Publication No. 2009/0234089 (Asahi Kasei Aime Co., Ltd., Kanagawa, Japan).

The silicone-containing compound can comprise Silicone B, a silicone-containing component as illustrated below, and having a molecular weight of approximately 1,500 Daltons (Shin-Etsu Silicones of America, Akron, Ohio, USA).

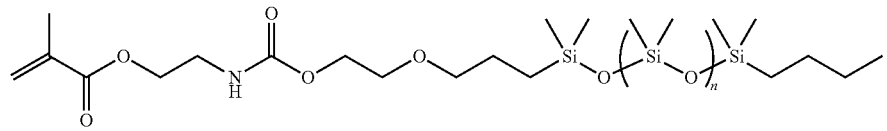

Silicone B

The silicone-containing compound can comprise Silicone C, A monomethacryloxypropyl terminated polydimethylsiloxane (Gelest, Morrisville, Pa., USA). A structure thereof is:

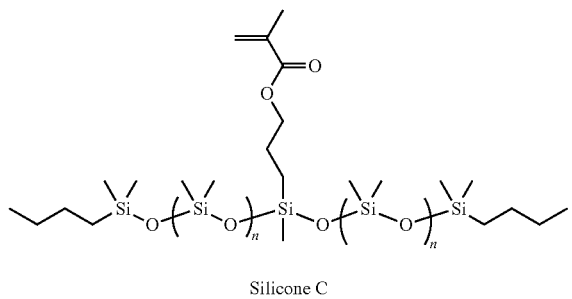

Silicone C

The silicone-containing compound can comprise a single silicone-containing compound or a combination of a plurality of silicone-containing compounds. The silicone-containing compound can be present in the polymerizable composition at a concentration from about 1% to about 65%, from about 10% to about 60%, or from about 20% to about 55%.

The polymerizable composition can further comprise at least one polymer having a 1, 2 diol or 1,3 diol moiety. The polymer having the 1, 2 diol or 1,3 diol moiety can comprise a polymeric wetting agent. The polymeric wetting agent can form an interpenetrating polymeric network (IPN) or pseudo-IPN within the lens body.

The polymerizable composition can further comprise at least one monomer having a 1, 2 diol or 1,3 diol moiety. The monomer having the 1, 2 diol or 1,3 diol moiety can comprise a hydrophilic monomer. The monomer can polymerize either as a copolymer with other components of the polymerizable composition, or as a homopolymer. The homopolymer can form an interpenetrating polymeric network (IPN) or pseudo-IPN within the lens body.

The polymerizable composition can further comprise a non-reactive diluent. The non-reactive diluent can comprise a water-soluble non-reactive diluent, i.e., a diluent which can be extracted from the lens body using aqueous extraction media essentially free of a volatile lower alcohol. In a particular example, the water-soluble non-reactive diluent can have a 1, 2 diol or 1,3 diol moiety. The water-soluble non-reactive diluent having a 1, 2 diol or a 1,3 diol moiety can be a glycol, such as, for example, glycerin.

The polymerizable composition can further comprise a phosphorylcholine component, such as, for example, 2-methacryloyloxyethyl phosphorylcholine. The form of phosphorylcholine can be a polymerizable form of phosphorylcholine, or can be a polymerized form of phosphorylcholine. The polymerizable form of phosphorylcholine or the polymerized form of phosphorylcholine can be a crosslinkable form of phosphorylcholine. When the phosphorylcholine component is present in the polymerizable composition, the polymerizable composition can lack haze or can be less hazy as compared to a comparative polymerizable composition of the same formulation except without the at least one polymerizable form of a boronic acid, boronic ester, boronic anhydride, or combination thereof. The polymerizable composition comprising the phosphorylcholine component and can produce a polymerized reaction product that is ophthalmically acceptable transparent (i.e., is clear enough to use as a contact lens). When the phosphorylcholine component is present in the polymerizable composition, the polymerizable composition can contain less than a total of 5% (w/w) of a single $C_1$-$C_{10}$ monohydric alcohol diluent, or of a combination of $C_1$-$C_{10}$ monohydric alcohol diluents.

The polymerizable composition can further comprise an initiator. The initiator can comprise a thermal initiator, a UV initiator, or a combination of a thermal initiator and a UV initiator.

The polymerizable composition can further comprise a tinting agent, a UV blocker, or a combination thereof. The tinting agent, the UV blocker, or the combination thereof can comprise a polymerizable tinting agent, a polymerizable UV blocker, or a combination of a polymerizable tinting agent and a polymerizable UV blocker. In the example where the tinting agent, the UV blocker, or the combination thereof comprises the polymerizable tinting agent, the polymerizable UV blocker, or the combination of the polymerizable tinting agent and the polymerizable UV blocker, the copolymer of the lens body further comprises polymerized units of the tinting agent, polymerized units of the UV blocker, or polymerized units of the tinting agent and of the UV blocker. The tinting agent, the UV blocker, or the combination thereof can comprise a crosslinkable tinting agent, a crosslinkable UV blocker, or a combination of a crosslinkable tinting agent and a crosslinkable UV blocker. In the example where the tinting agent, the UV blocker, or the combination thereof comprises the crosslinkable tinting agent, the crosslinkable UV blocker, or the combination of the crosslinkable tinting agent and the crosslinkable UV blocker, the copolymer of the lens body further comprises crosslinked units of the tinting agent, crosslinked units of the UV blocker, or crosslinked units of the tinting agent and of the UV blocker.

In the present example, the contact lens mold assembly used to cast mold the lens body can comprise molding surfaces, including an anterior molding surface and a posterior molding surface. At least one molding surface of the mold assembly can comprise a thermoplastic resin. The thermoplastic resin can comprise a polar thermoplastic resin, a non-polar thermoplastic resin, or a combination of both a polar thermoplastic resin and a non-polar thermoplastic resin.

Examples of polar thermoplastic resins include ethylene vinyl alcohol (EVOH) and polybutylene terephthalate (PBT). An example of a non-polar thermoplastic resin includes polypropylene (PP). The thermoplastic resin can comprise a thermoplastic resin having at least one 1, 2 diol or 1,3 diol moiety, such as, for example, PVOH. The at least one 1, 2 diol or 1,3 diol moiety can be capable of complexing with at least a portion of boronic acid moieties present in the polymerizable composition, in the polymerized reaction product, or in both the polymerizable composition and the polymerized reaction product.

The at least one form of tris(hydroxymethyl)aminomethane (TRIS) of the contacting solution can comprise a TRIS buffer system. Optionally, contacting solution can further comprise at least one form of ethylenediaminetetraacetic acid (EDTA). Optionally, when the contacting solution comprises a TRIS buffer system, the TRIS buffer system of the contacting solution can further comprise a form of ethylenediaminetetraacetic acid (EDTA), and be a TRIS-EDTA buffer system. The at least one form of IRIS can comprise tris (hydroxymethyl)aminomethane hydrochloride (TRIS HCl), alone or in combination with another form of TRIS. The at least one form of EDTA can comprise ethylenediaminetetraacetic acid sodium salt dehydrate, alone or in combination with another form of EDTA.

The contacting solution can further comprise a tonicity adjusting agent, such as, for example, sodium chloride, sorbitol, mannitol, combinations thereof, and the like. The contacting solution can have an osmolarity from about 100 mOsm to about 400 mOsm, from about 180 to about 350 mOsm, or from about 220 mOsm to about 320 mOsm.

The contacting solution can further comprise at least one surfactant, such as, for example, a form of polysorbate, a form of poloxomer, combinations thereof, and the like. The surfactant can comprise polysorbate 80 (TWEEN 80).

The contacting solution can further comprise at least one wetting agent or comfort agent, such as, for example, a form of poly(vinyl pyrrolidone), a form of poly(vinyl alcohol), a form of methyl ethyl cellulose, a form of phosphorylcholine, combinations thereof, and the like.

The contacting solution can further comprise at least one polyhydric alcohol having at least one 1,2 diol or 1,3 diol moiety, wherein at least a portion of the 1, 2 diol or 1,3 diol moieties present in the solution are capable of complexing with at least a portion of boronic acid moieties present in the lens body.

The method of this example can further comprise the step of contacting the uncomplexed lens body with the complexing solution comprising at least one polyhydric alcohol having at least one 1,2 diol or 1,3 diol moiety, and complexing at least a portion of 1, 2 diol or 1,3 diol moieties present in the complexing solution with at least a portion of boronic acid moieties present in the copolymer of the lens body to produce a complexed hydrogel lens body.

The complexing of the boronic acid moiety with the 1, 2 diol or 1,3 diol moiety is equivalent to "attaching" an ophthalmically acceptable acid to PVOH, as previously discussed. The complex can be permanent or semi-permanent, such as optionally allowing for slow release of the complexed polyhydric alcohol from the lens body during use, which may enhance comfort during lens wear.

The complexed lens body of the present example can have an advancing contact angle at least 5% less, at least 10% less, at least 15%, at least 20%, or at least 25% less than an advancing contact angle of the uncomplexed lens when both the complexed lens body and the uncomplexed lens body are tested after being hydrated and after soaking in phosphate buffered saline for at least 6 hours.

The complexed lens body of the present example can have an advancing contact angle at least 5% less, at least 10% less, at least 15%, at least 20%, or at least 25% less than an advancing contact angle of a comparative lens body made using the same polymerizable composition but without the at least one boronic acid, boronic ester, boronic anhydride or combination thereof in the polymerizable composition, when both the complexed lens body and the comparative lens body are tested after being hydrated and after soaking in phosphate buffered saline for at least 6 hours.

As previously discussed, the polyhydric alcohol having at least one 1, 2 diol or 1,3 diol moiety can comprise a form of poly(vinyl alcohol) (PVOH). The PVOH can be a crosslinked form of PVOH, such as a form of PVOH crosslinked with boric acid, a form of PVOH crosslinked with a dialdehyde or polyaldehyde, or a combination thereof.

The form of PVOH can be a form of PVOH with a low molecular weight, such as a form of PVOH with a molecular weight below about 75,000 Daltons. The low molecular weight form of PVOH can comprise MOWIOL® 4-88 (MW=31,000 Daltons) or MOWIOL® 8-88 (67,000 Daltons) (Kuraray, Houston, Tex., USA).

The form of PVOH can be a form of PVOH with a low level of hydrolysis, such as a form of PVOH with a hydrolysis level below about 90%. The form of PVOH with a low level of hydrolysis can comprise MOWIOL® 4-88 (88% hydrolyzed) or MOWIOL® 8-88 (88% hydrolyzed) (Kuraray, Houston, Tex., USA).

The polyhydric alcohol having at least one 1, 2 diol or 1,3 diol moiety of the complexing solution can comprise catechol or a form of catechol. The form of catechol can comprise a polymerized form of catechol. The polyhydric alcohol can comprise glyceryl monomethacrylate (GMA), or a form of glyceryl monomethacrylate. The form of glyceryl monomethacrylate can comprise a polymerized form of glyceryl monomethacrylate.

The polyhydric alcohol of the complexing solution can comprise a first polymer having at least one 1, 2 diol or 1,3 diol moiety. The first polymer can comprise a vinyl alcohol copolymer, a glyceryl monomethacrylate copolymer, or combinations thereof. The copolymer polyhydric alcohol can comprise a copolymer formed of units of vinyl alcohol and/or glyceryl monomethacrylate with a hydrophilic or hydrophobic monomer. The copolymer of the polyhydric alcohol can be formed of units of vinyl alcohol and/or glyceryl monomethacrylate with a monomer with a bulky side chain. The copolymer of the polyhydric alcohol with a bulky side chain can be effective to reduce the penetration of the copolymer into the bulk of the lens body as compared to a vinyl alcohol homopolymer of approximately the same molecular weight. The copolymer of the polyhydric alcohol can comprise a vinyl alcohol-vinyl pyrrolidone copolymer, a vinyl alcohol-glyceryl monomethacrylate copolymer, a vinyl alcohol-phosphorylcholine copolymer, a glyceryl monomethacrylate-vinyl pyrrolidone copolymer, a glyceryl monomethacrylate-phosphorylcholine copolymer, combinations thereof, and the like.

The complexing solution can comprise the first polymer having the 1, 2 diol or 1,3 diol moiety, and a second polymer physically entangled with (i.e., not crosslinked or chemically bonded to) the first polymer. The first polymer, the second polymer, or both the first polymer and the second polymer can comprise a wetting agent effective to increase the wettablilty of the lens body, a comfort agent effective to increase comfort of the lens during wear, or both.

The at least one form of TRIS can be present in the contacting solution at a concentration effective to prevent gelation of the solution. For example, the at least one form of TRIS can be present in the contacting solution at a concentration effective to prevent gelation of a polyhydric alcohol present in the solution, such as, for example, a form of PVOH.

The at least one form of TRIS can be present in the contacting solution at a concentration effective to lower an effective pKa of boronic acid moieties present on at least a surface of the lens body. In one example, the at least one form of TRIS present in the contacting solution can be effective to increase the concentration of boronic acid moieties capable of complexing with 1, 2 diol or 1,3 diol moieties present in the contacting solution by at least about 5%, at least about 15%, at least about 25%, or at least about 35%, at an ophthalmically acceptable pH.

In one example, the step of contacting the lens body with the contacting solution can further comprise complexing at least a portion of boronic acid moieties present in the lens body with at least a portion of 1,2 diol or 1,3 diol moieties present in solution.

The contacting and complexing step can be conducted as part of a washing or soaking process conducted prior to placing the lens body in a blister package with a packaging solution. Alternatively or additionally, the contacting and complexing step can be conducted by contacting the lens body with a packaging solution, the packaging solution comprising a contacting solution having at least one form of TRIS and at least one polyhydric alcohol with at least one 1, 2 diol or 1,3 diol moiety, the contacting and complexing step being part of a step of placing the lens body in a blister package with a packaging solution, and sealing and sterilizing the blister package.

The method can further comprise the step of washing the lens body (i.e., the complexed lens body or the uncomplexed lens body) with a washing solution. The step of washing the lens body can comprise contacting the lens body with water, an aqueous solution of a volatile lower alcohol, or an aqueous solution essentially free of a volatile lower alcohol. The washing step can comprise cleaning dust or debris from the lens body, extracting materials from the lens body, hydrating the lens body, or combinations thereof. The washing solution can comprise a TRIS buffer system. The washing solution can comprise the at least one polyhydric alcohol having at least one 1, 2 diol or 1,3 diol moiety. The washing solution can be effective to clean the lens body, to extract materials from the lens body, to swell the lens body, to hydrate the lens body, and combinations thereof. The step of washing can be the same step as contacting and complexing the lens body. The step of washing can be conducted in the blister package or in a lens tray configured to hold a plurality of lenses during one or more processing steps.

The method can further comprise the step of hydrating the lens body (e.g., the complexed lens body or the uncomplexed lens body) with a hydrating solution. The hydrating solution can comprise at least one form of TRIS. The hydrating step can comprise a separate step from the washing step, the contacting and complexing step, or the placing step. Alternatively, the hydrating step can be incorporated into another step of the process which involves contacting the lens body with water or an aqueous solution. The step of hydrating the lens body can comprise contacting the lens body with water or an aqueous solution effective to swell the lens body. The aqueous solution can comprise at least one polyhydric alcohol, the at least one polyhydric alcohol having at least one 1, 2 diol or 1,3 diol moiety. The step of hydrating can be the same step as complexing the lens body, the same step as placing the lens body in a blister package with packaging solution, or both. In other words, the lens body can be hydrated in a separate processing step, the contacting solution can be used to hydrate the lens body, the washing solution can be used to hydrate the lens body, the packaging solution can be used to hydrate the lens body, or the packaging solution can be used to hydrate the lens body, or to both complex and hydrate the lens body.

In the method of manufacturing a hydrogel lens body of the present example, the method can further comprise the step of placing a lens body (i.e., a complexed lens body or an uncomplexed lens body) in a contact lens blister package with a blister solution, and sealing and sterilizing the blister package, thereby sterilizing the lens body and the packaging solution. The blister solution can comprise at least one form of TRIS. The at least one form of TRIS of the packaging solution can be the same as the at least one form of TRIS of the contacting solution, or can be a different at least one form of TRIS. The packaging solution can be used as the contacting solution, or can comprise a different solution used in a different processing step. In one example, the lens body present in the sealed, sterilized package is an uncomplexed lens body following the sealing and sterilizing (i.e., boronic acid moieties of the copolymer of the lens body are not complexed with 1, 2 diol or 1,3 diol moieties of a polyhydric alcohol in the final packaged product). In another example, the lens body present in the sealed, sterilized package is a complexed lens body (i.e., at least a portion of the boronic acid moieties present in the copolymer of the lens body are complexed with 1, 2 diol or 1,3 diol moieties of a polyhydric alcohol).

The method of this example can also comprise a method of treating a lens body. The method of treating a lens body can comprise (i) providing a lens body comprising at least one form of boronic acid, boronic ester, boronic anhydride or combination thereof; (ii) contacting the lens body with a contacting solution comprising at least one form of tris(hydroxymethyl)aminomethane; and (iii) contacting the uncomplexed lens body with a first complexing solution comprising at least one polyhydric alcohol having at least one 1,2 diol or 1,3 diol moiety and complexing at least a portion of the at least one 1, 2 or 1,3 diol moiety present in the first complexing solution with at least a portion of boronic acid moieties present in the copolymer of the lens body to produce a complexed hydrogel lens body. In one example, the contacting solution and the complexing solution can be the same solution, i.e., the method can comprise contacting the lens body with a solution comprising both the at least one form of TRIS and the polyhydric alcohol having at least one 1, 2 diol or 1,3 diol moiety.

In a particular example wherein the lens body comprises a hydrogel contact lens, the method of treating the lens body can further comprise (iv) after the contact lens has been contacted by the first complexing solution and subsequently worn by a user, contacting the contact lens with a second complexing solution comprising at least one polyhydric alcohol with at least one 1,2 diol or 1,3 diol moiety, and complexing at least a portion of 1,2 diol or 1,3 diol moieties present in the second complexing solution with at least a portion of the boronic acid moieties present in the lens body. The second complexing solution can further comprise at least one form of TRIS, such as, for example, a TRIS buffer system. The at least one form of TRIS of the second complexing solution can be the same as or different from the at least one form of TRIS of the contacting solution. The polyhydric alcohol of the first complexing solution can be the same as the polyhydric alcohol of the second complexing solution, or the polyhydric alcohol of the first complexing solution can be different from the polyhydric alcohol of the second complexing solution.

This example is also directed to a hydrogel contact lens product comprising: a hydrogel contact lens body comprising at least one form of boronic acid, boronic ester, boronic anhydride or combination thereof; a packaging solution comprising at least one form of tris(hydroxymethyl)aminomethane TRIS, for example, a TRIS buffer system; a contact lens package base member with a cavity configured to hold the lens body and the packaging solution; and a seal attached to the base member configured to maintain the lens body and the packaging solution in a sterile condition for a duration of time equivalent to a shelf life of the contact lens package. The lens body can comprise an anterior surface, a posterior surface, and at least one transparent optic zone.

The at least one form of TRIS can be present in the packaging solution at a concentration effective to lower an effective pKa of boronic acid moieties present on at least a surface of the lens body.

The packaging solution can further comprise at least one polyhydric alcohol having at least one 1,2 diol or 1,3 diol moiety, and at least a portion of boronic acid moieties present on at least a surface of the lens body can be complexed with at least a portion of 1,2 diol or 1,3 diol moieties present on the at least one polyhydric alcohol.

The packaging solution can comprise at least one polyhydric alcohol having at least one 1, 2 diol or 1,3 diol moiety, and the at least one form of TRIS can be present in the packaging solution at a concentration effective to prevent gelation of the packaging solution over a shelf life of the sterilized package.

The hydrogel lens body can be an uncomplexed lens body. The hydrogel lens body can be a lens body wherein at least a portion of boronic acid moieties present in the copolymer of the lens body are complexed with 1, 2 or 1,3 diol moieties present on at least one polyhydric alcohol, i.e., a complexed lens body.

The at least one polyhydric alcohol having at least one 1, 2 diol or 1,3 diol moiety can be present in the contacting solution, complexing solution, the washing solution, the hydration solution the packaging solution, and combinations thereof, at a concentration of from about 0.01% to about 10%, from about 0.05 to about 5.0%, or from about 0.1% to about 1.0%.

The at least one form of TRIS can be present in the contacting solution, complexing solution, the washing solution, the hydration solution the packaging solution, and combinations thereof, at a concentration of from about 0.01% to about 10%, from about 0.05 to about 7.0%, from about 0.5% to about 5.0%, or from about 0.3% to about 3.5%.

EXAMPLES

The following Examples illustrate certain aspects and advantages of the present invention, which should be understood not to be limited thereby. All parts, percentages and ratios are by weight unless indicated otherwise.

Materials and Methods

The following abbreviations and corresponding compounds and structures are used in the examples.

SiGMA=(3-Methacryloxy-2-hydroxypropyloxy)propyl-bis(trimethylsiloxy) methylsilane. A structure thereof is:

Silicone C=Monomethacryloxypropyl terminated polydimethylsiloxane. A structure thereof is:

Tris=3-[Tris(trimethylsilyloxy)silyl]propyl methacrylate. A structure thereof is:

DMA=N,N-Dimethylacrylamide.
VMA=N-Vinyl-N-methylacetamide.
MMA=Methyl methacrylate.
HEMA=hydroxyethyl methacrylate.
EGMA=Ethylene glycol methyl ether methacrylate.
EGDMA=Ethylene glycol dimethacrylate.
TEGDMA=Tri(ethylene glycol)dimethacrylate.
TEGDVE=Tri(ethylene glycol)divinyl ether.
VAZO® 64=2,2'-Azobiz(isobutyronitrile).
UV 416=Cyasorb UV-416 from Cytec, 2-(4-benzoyl-3-hydroxyphenoxy)ethylacrylate.
VPB=4-vinylphenyl boronic acid.
PBS=phosphate buffered saline (20 mM, pH=7.3).
NaCMC=Sodium Carboxymethyl Cellulose.
PEI 25K=Poly(ethyleneimine) solution Mw ~2500.
PVOH=polyvinyl alcohol (such as, for example, MOWIOL® series polyvinyl alcohol, Kuraray, Houston, Tex., USA, including MOWIOL® 4-88 (MW=31K), MOWIOL® 8-88 (67K), MOWIOL® 18-88 (130K), MOWIOL® 40-88 (127K), MOWIOL® 40-88 (205K); PVOH 98-99% (MW=146-186K), PVOH 96% (85-124K), PVOH 87-89% (13-23K), PVOH 87-89% (31-50K), PVOH 87-89% (85-124K), 87-89% (146-186K)).
JEFFAMINE® ED-600 polyetheramine=an aliphatic polyether diamine derived from a propylene oxide-capped polyethylene glycol (Huntsman Corporation, The Woodlands, Tex., USA).

PVP 1300K=Polyvinylpyrrolidone Mw ~1300K

MPC=2-methacryloyloxyethyl phosphorylcholine (Lipidure®, NOF Corporation, Tokyo, Japan).

VB6=VAT Blue 6 (7,16-Dichloro-6,15-dihydroanthrazine-5,9,14,18-tetrone).

Preparation of Contact Lenses

Polymerizable lens compositions were prepared by mixing various combinations of the ingredients and components as indicated by some of the tables below. The lens formulations were formed into lenses in the following general manner.

Contact lens molds were injection molded from non-polar polypropylene resin using conventional injection molding techniques and equipment. Each contact lens mold included a female mold member that includes a concave optical quality surface for forming the front surface of the contact lens, and a male mold member that includes a convex optical quality surface for forming the back surface of the contact lens. The female mold member can be understood to be a front surface mold, and the male mold member can be understood to be a back surface mold.

An amount (about 60 μl) of the polymerizable lens composition was placed on the concave surface of the female mold member. The male mold member was placed in contact with the female mold member such that the polymerizable lens composition was located in a contact lens shaped cavity formed between the concave surface of the female mold member and the convex surface of the male mold member. The male mold member was held in position by an interference fit between a peripheral region of the female and male mold members.

The contact lens mold containing the polymerizable lens composition was then placed in an oven where the polymerizable lens composition was cured at a temperature of about 100° C. for about 30 minutes. After curing, the contact lens mold contained a polymerized contact lens product within the contact lens shaped cavity.

The contact lens mold was removed from the oven and allowed to cool to room temperature (about 20° C.). The contact lens mold was mechanically demolded to separate the male and female mold members from each other. The polymerized contact lens product remained attached to the male mold member.

The polymerized contact lens product was then mechanically delensed from the male mold member to separate the contact lens product from the male mold member.

The separated contact lens product was then sealed in borate buffer saline solution in a blister package to form a packaged hydrated contact lens. The lenses in the blister were sterilized by autoclaving in aqueous solutions. The aqueous solutions used in autoclaving can include wetting agents under evaluation.

Methods for Characterizing Lens Products

Water Break Up Time (WBUT). Prior to testing, a lens is soaked in 3 ml of fresh PBS for at least 24 hours. Immediately before testing, the lens is shaken to remove excess PBS, and the length of time in seconds that it takes for the water film to recede from the lens surface is determined (e.g., water break up time (water BUT, or WBUT)).

Advancing Contact Angle/Receding Contact Angle. The advancing contact angle can be determined using routine methods known to persons of ordinary skill in the art. For example, the advancing contact angles and receding contact angles of the contact lenses provided herein can be measured using a captive bubble method. Advancing and receding water contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all incorporated in their entireties herein by reference.

As an example, the advancing contact angle and receding contact angle can be determined using a captive bubble method using phosphate buffered saline (PBS; pH=7.2). Prior to testing, the lens is soaked in pH 7.2 PBS solution for at least 30 minutes or overnight. The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

Static Contact Angle. Static Contact Angle can be determined using routine methods known to persons of ordinary skill in the art. For example, the Static Contact Angle can be determined using a captive bubble method, or using a DSA 100 drop shape analysis system (Kruss, Hamburg, Germany). Prior to testing, the lens is soaked in pH 7.2 PBS solution for at least 30 minutes or overnight.

Modulus. The modulus of a lens body can be determined using routine methods known to persons of ordinary skill in the art. For example, pieces of a contact lens having about 4 mm width can be cut out from a central part of a lens, and modulus (unit; MPa) can be determined from an initial slope of a stress-strain curve obtained by the tensile test at the rate of 10 mm/min in air at a humidity of at least 75% at 25° C., using an Instron 3342 (Instron Corporation, Norwood, Mass., USA).

PVOH Uptake. PVOH uptake from blister solutions can be determined, for example, by gel permeation chromatography (GPC) after the lenses are placed in a blister solution containing a PVOH solution at room temperature (RT) for a prescribed period of time, for example, 48 hours.

Ionoflux. The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

Tensile Strength. The tensile strength of a lens body can be determined using routine methods known to persons of ordinary skill in the art. For example, pieces of a contact lens having about 4 mm width can be cut out from a central part of a lens, and tensile strength (unit; MPa) can be determined from testing using an Instron 3342 (Instron Corporation, Norwood, Mass., USA).

Elongation. The elongation of a lens body can be determined using routine methods known to persons of ordinary skill in the art. For example, the elongation (%) can be determined using an Instron 3342 (Instron Corporation, Norwood, Mass., USA).

Oxygen Permeability (Dk). The Dk of the present lenses can be determined using routine methods known to persons of ordinary skill in the art. For example, the Dk value can be determined using a modified polargraphic method, as described in *A single-lens polarographic measurement of oxygen permeability (Dk) for hypertransmissible soft contact lenses*, M. Chhabra et al., Biomaterials 28 (2007) 4331-4342.

Equilibrium Water Content (EWC). The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80° C. under a vacuum, and the dried lens can then be weighed. The weight difference is determined by subtracting the weight of the dry lens from the weight of the hydrated lens. The water content (%) is the (weight difference/hydrated weight)×100.

Center Thickness of Lens (CT). The CT can be determined using routine methods known to persons of ordinary skill in the art. For example, the CT can be determined using a Rehder ET gauge (Rehder Development Company, Castro Valley, Calif., USA).

Example 1

A series of contact lenses were prepared with the polymerizable lens compositions as shown in Tables 1 and 2 below. Formulations were prepared by combining the ingredients in the indicated unit parts based on the weight of the ingredients in the formulation.

An evaluation was conducted of possible agents to use to attach to the boronic acid moiety present in the lens. Lenses containing a polymerizable agent with at least one boronic acid moiety, specifically VPB in the formulation used, were prepared using the ingredients and amounts shown in Tables 1 and 2 below, and then autoclaved in aqueous solutions of various compounds shown in Table 3, to determine which of the compounds would attach to the surface of the lenses. Sodium carboxymethyl cellulose (Na CMC), agar, glycerol, and polyvinyl alcohol (PVOH) were evaluated. Samples lenses 1-12 used Formulation 1, wherein the lenses were autoclaved in 1.2 ml of the indicated solution. Samples 13-16 used formulation Formulation 2, wherein the lenses were autoclaved in 2.4 ml of the indicated solution. In Table 3, data is reported for two consecutive tests performed on the same lens.

TABLE 1

| Formulation: 1 | unit parts (wt) |
| --- | --- |
| SIGMA | 20 |
| Silicone C | 25 |
| DMA | 20 |
| VMA | 30 |
| EGMA | 5 |
| TEGDMA | 0.5 |
| TEGDVE | 0.6 |

TABLE 1-continued

| Formulation: 1 | unit parts (wt) |
| --- | --- |
| Vazo 64 | 0.3 |
| Linker (VPB) | 3 |

TABLE 2

| Formulation: 2 | unit parts (wt) |
| --- | --- |
| SIGMA | 15 |
| Silicone C | 25 |
| DMA | 25 |
| VMA | 30 |
| EGMA | 5 |
| TEGDMA | 0.5 |
| TEGDVE | 0.6 |
| Vazo 64 | 0.3 |
| Linker (VPB) | 3 |

WBUT results for the prepared lenses autoclaved in the indicated test solutions are set forth in Table 3 below.

TABLE 3

| Sample | Wt % Compound (w/w) in Test Solution | Initial WBUT (seconds) | WBUT after brief PBS rinsing (seconds) | WBUT after 1 week in original solution (seconds) |
| --- | --- | --- | --- | --- |
| 1 | 1% Na CMC | 2, 2 | 0, 0 | 0, 0 |
| 2 | 0.1% Na CMC | 1, 1 | 0, 0 | 0, 0 |
| 3 | 1% Agar | 2, 2 | 0, 0 | 0, 0 |
| 4 | 0.1% Agar | 1, 1 | 0, 0 | 0, 0 |
| 5 | 1% Glycerol | 0, 0 | 0, 0 | 0, 0 |
| 6 | 0.1% Glycerol | 0, 0 | 0, 0 | 0, 0 |
| 7 | 1% Sucrose | 0, 0 | 0, 0 | 0, 0 |
| 8 | 0.1% Sucrose | 0, 0 | 0, 0 | 0, 0 |
| 9 | 0.5% PVOH | 20, 20 | 20, 20 | 20, 20 |
| 10 | 1% Glycerol/PVOH (1:100) | 20, 20 | 20, 20 | 20, 20 |
| 11 | 0.1% Glycerol/PVOH (1:100) | 15, 17 | 12, 15 | 20, 20 |
| 12 | 1% Glycerol/Na CMC (1:100) | 2, 2 | 0, 0 | 0, 0 |
| 13 | 1% PEI 25K | 1, 2 | 0, 0 | 0, 1 |
| 14 | 1% Jeffamine ED-600 polyetheramine | 1, 1 | 0, 0 | 0, 0 |
| 15 | 0.5% PVP 1300K | 1, 1 | 0, 0 | 1, 0 |
| 16 | 1% Lipidure ®-HM | 0, 1 | 0, 0 | 0, 0 |

Starches and other compounds with a structure where adjacent atoms have a hydroxyl group bonded to each of the atoms, such as vicinal diols and compounds with a 1, 2 polyol structure, were expected to bind similarly to the boronic acid moiety, but this was not found to be the case. Other known comfort and/or wettability enhancing agents, including polyetheramine, poly(vinyl pyrrolidone), and 2-methacryloyloxyethyl phosphorylcholine (MPC) were evaluated as well and were found not to attach to the surface of the lenses. It was found that only the solutions containing a polyhydric alcohol with a backbone comprising at least three carbon atoms, the three carbon atoms bonded in a row as a carbon atom on the right, a carbon atom in the middle, and a carbon atom on the left, wherein one and only one hydroxyl group is bonded to the carbon atom on the right and to the carbon atom on the left, and a hydroxyl group is not bonded to the carbon atom in the middle, produced wettable lenses. Without being bound by theory, it is believed that this particular structure of polyhydric alcohol, when placed in contact with surfaces comprising forms of opthalmically acceptable acids, including polymerizable forms of boronic acid, binds unexpectedly well to these surfaces, resulting in these surfaces exhibiting and retaining good wettability over extended time periods. In this study, a form of PVOH, which has such a structure, was found to produce wettable lens surfaces when used to treat lenses containing a polymerized boronic acid moiety. In these studies, the presence of a wettable lens surface was considered to be an indication that the test compound (for this study, a polyhydric alcohol with a 1,3 polyol structure and which comprised at least 5 pendant hydroxyl groups, specifically a form of PVOH) was present on the lens surfaces.

Example 2

A series of contact lenses were prepared with the polymerizable lens compositions as shown in Table 6. A series of contact lenses were prepared with the polymerizable lens compositions as shown in Table 4. Formulations were prepared by combining the ingredients in the indicated unit parts. The amount of VPB is varied for purposes of this evaluation.

This study was conducted to evaluate the effect on water break-up time (WBUT) of concentration of a polymerizable agent with at least one boronic acid moiety in lenses of similar formulations. The PBS (phosphate buffered saline) used was 20 mM, pH=7.3. One lens of each type was tested repeatedly at subsequent time points; data reported (e.g.: 5, 6) is for the first and second tests performed on the same lens. For the measurements of WBUT, after briefly washing the lens with 5 ml PBS, the data for this time point were collected on the different lenses and then the other time points. As to the test conditions of the lens tested in 1.2 mL PBS, lenses were placed in 1.2 ml PBS and shaken at 37° C. at a speed of 100 rpm. WBUT of the lenses was determined after autoclaving and after shaking for 6, 12 and 24 hours. Lenses of all formulations were autoclaved in 2.4 ml of a 0.50% PVOH (MW 146K to 186K, 87-89% hydrolyzed) solution in PBS.

TABLE 4

| Ingredient | 3 (control) unit parts (wt) | 4 unit parts (wt) | 5 unit parts (wt) | 6 unit parts (wt) | 7 unit parts (wt) | 1 unit parts (wt) | 2 unit parts (wt) |
|---|---|---|---|---|---|---|---|
| SIGMA | 25 | 25 | 25 | 25 | 25 | 20 | 15 |
| Silicone C | 20 | 20 | 20 | 20 | 20 | 25 | 25 |
| Tris | 0 | 0 | 0 | 0 | 0 | 0 | 0 |
| DMA | 5 | 5 | 5 | 5 | 5 | 20 | 25 |
| VMA | 38 | 38 | 38 | 38 | 38 | 30 | 30 |
| MMA | 12 | 12 | 12 | 12 | 0 | 0 | 0 |
| EGMA | 0 | 0 | 0 | 0 | 12 | 5 | 5 |
| TEGDMA | 0 | 0 | 0 | 0 | 0 | 0.5 | 0.5 |
| TEGDVE | 0.8 | 0.8 | 0.8 | 0.8 | 0.8 | 0.6 | 0.6 |
| Vazo 64 | 0.3 | 0.3 | 0.3 | 0.3 | 0.3 | 0.3 | 0.3 |
| UV 416 | 0 | 0 | 0 | 0 | 0 | 0 | 0 |
| VPB | 0 | 1 | 2 | 3 | 3 | 3 | 3 |

TABLE 5

| Properties | 3 (control) | 6 | 7 | 1 | 2 |
|---|---|---|---|---|---|
| Tensile Strength (MPa) | 0.683 | 1.315 | 1.315 | 0.673 ± 0.086 | 0.836 ± 0.157 |
| Modulus (MPa) | 0.641 | 2.625 | 0.612 | 0.675 ± 0.008 | 0.716 ± 0.010 |
| Dry Extractables (wt %) | — | — | 9.20 | 9.46 ± 0.22 | 11.0 ± 0.41 |
| Ionoflux (mm$^2$/min) | 3.52 | — | 5.85 | 2.55 ± 0.30 | 7.19 ± 0.49 |
| EWC (wt %) | 56.42 | — | 52.31 | 51.07 ± 0.70 | 56.13 ± 1.27 |
| Lens Diameter (mm) | — | — | — | 15.7, 15.9, 15.9 | 13.7, 13.9, 13.8 |
| Elongation (%) | — | — | — | 223 ± 10 | 213 ± 15 |
| CT (mm) | — | — | — | 0.134 ± 0.006 | 0.097 ± 0.002 |
| Dk (barrers) | — | — | — | 54 | — |
| Initial Advancing Contact Angle (degrees) | — | — | 56.4 | — | — |
| Advancing Contact Angle | — | — | 62.2 | — | — |
| Lens Appearance | — | — | — | — | clear, colorless |
| Delensing Observations | — | — | — | — | easy to delens |

TABLE 6

| Formulation | WBUT after autoclaving (seconds) | WBUT after briefly washing lens with 5 ml PBS* (seconds) | WBUT after shaking in 1.2 ml fresh PBS for 6 hrs. (seconds) | WBUT after shaking in second sample of 1.2 ml fresh PBS for another 6 hrs. (12 hrs. total) (seconds) | WBUT after shaking in third sample of 1.2 ml fresh PBS for another 12 hrs. (24 hrs. total) (seconds) |
|---|---|---|---|---|---|
| 3 (control) | 4, 6 | 1, 1 | 2, 1 | 0, 0 | 0, 0 |
| 4 | >20, >20 | — | >20, >20 | 10, 15 | 10, 8 |
| 5 | >20, >20 | — | >20, >20 | >20, >20 | 18, 15 |
| 6 | >20, >20 | >20, >20 | >20, >20 | >20, >20 | 18, 15 |
| 1 | >20, >20 | — | >20, >20 | >20, >20 | >20, >20 |

The lenses made from formulations containing a form of an ophthalmically acceptable acid (VPB, a polymerizable form of boronic acid) displayed good initial surface wettability following autoclaving in 0.5% PVOH solution, while the lenses made from formulations that did not contain the ophthalmically acceptable acid, VPB, did not show good initial surface wettability following autoclaving in 0.5% PVOH solution. After shaking in fresh samples of PVOH-free PBS for 6 hours, the lenses made from formulations containing 1%, 2% and 3% VPB showed good wettability. While shaking for an additional 6 or 12 hours in fresh PVOH-free PBS decreased the surface wettability of the lenses containing VPB, the lenses made from formulations containing 3% VPB still retained good wettability at the end of the study.

Example 3

An in vitro kinetic study on the wettability of the formulation 1 was conducted. Contact lenses were prepared with the lens formulation 1, which was described in Example 2. As a control, commercially available BIOFINITY® contact lenses were used (CooperVision Inc., Pleasanton, Calif., USA). Formulation 1 lenses were packaged singly in 1.2 ml PBS (20 mM) with a 0.5% PVOH solution (made using MW=146K-186K PVOH 87-89% hydrolyzed, 99.9% purity), autoclaved (30 minutes, 121° C.), and kept at room temperature for 2 days, then packaged singly in blisters using 3.6 ml PBS (20 mM) per package. One lens was tested for the 24 hour tests. Two lenses were tested for the 48 hour test. All lenses were shaken at 35° C. at a speed of 100 rpm in 3.6 ml PBS for the indicated time point. The test results are set forth in Table 7.

TABLE 7

| | Formulation ID and Time Point | | |
|---|---|---|---|
| Property | Formulation 1 lenses shaken 24 hrs. | Formulation 1 lenses shaken another 24 hrs. in 3.6 ml fresh PBS (48 hrs. total) | Control shaken 24 hrs. |
| WBUT (seconds) | 15 to 20 | 12 to 15 | Not tested |
| Static Contact Angle (degrees) | 35.6 | 35.3 | 35.7 |
| Advancing Contact Angle (degrees) | 47.4 | 50.1 | 46.5 |

As shown by the results in Table 7, the static and advancing contact angles of lenses made from a formulation containing an ophthalmically acceptable acid, and which were contacted with a solution of a 1,3 polyol with at least 5 pendant hydroxyl groups, were determined and found to be approximately equivalent to the control, i.e., the commercially available BIOFINITY® lenses.

Example 4

Contact lenses were prepared with the polymerizable lens compositions as shown in Table 8. The indicated base formulations were previously described in Example 2. This study was conducted to evaluate the effect of contacting solution concentration, the contacting solution comprising a solution of a 1,3 polyol with at least 5 pendant hydroxyl groups, on the wettability of lens formulations containing an ophthalmically acceptable acid when the lenses are autoclaved in the contacting solution. For this study, the 1,3 polyol with at least 5 pendant hydroxyl groups used was PVOH with a weight average molecular weight of 146K to 186K, 87-89% hydrolyzed. The lenses were placed in 3.6 ml PBS and shaken at 37° C. at a speed of 100 rpm. WBUT of the lenses was determined after autoclaving and after shaking for 24 hours.

TABLE 8

| | Formulation | |
|---|---|---|
| | 7 | 7 |
| Test Conditions Lens autoclaved in 2.4 ml of PVOH solution of indicated concentration in PBS | WBUT after autoclaving (seconds) | WBUT after shaking for 24 hours in 3.6 ml PBS (seconds) |
| 0.5% PVOH | >20, >20 | 16, 17 |
| 0.25% PVOH | >20, >20 | 15, 16 |
| 0.1% PVOH | >20, >20 | 10, 10 |
| 0.05% PVOH | >20, >20 | 15, 14 |
| 0.01% PVOH | >20, >20 | 5, 5 |

The lenses of formulation 7 autoclaved in all the concentrations of PVOH solution showed good wettability initially after autoclaving. After shaking in PVOH-free PBS for 24 hours, the lenses that had been autoclaved in 0.5% and 0.25% PVOH still showed acceptable wettability.

Example 5

Contact lenses were prepared with the polymerizable lens compositions as shown in Table 9. Lenses were prepared using polymerizable composition formulations designated as Formulation 8 (control) and Formulation 9. Formulations were prepared by combining the ingredients in the indicated unit part amounts.

The uptake and release of a 1,3 polyol with at least 5 pendant hydroxyl groups, specifically a form of PVOH, from a lens made from a formulation comprising an ophthalmically acceptable acid, specifically a polymerizable form of an ophthalmically acceptable acid (VPB) were evaluated.

TABLE 9

| | Formulation | |
|---|---|---|
| Ingredient | 8 (control) unit parts (wt) | 9 unit parts (wt) |
| SIGMA | 25 | 25 |
| Silicone C | 20 | 20 |
| DMA | 5 | 13 |
| VMA | 38 | 30 |
| MMA | 0 | 12 |
| EGMA | 12 | 0 |
| TEGDVE | 0.8 | 0.8 |
| Vazo 64 | 0.3 | 0.3 |
| VPB | 0 | 3 |

The resulting reaction products (lenses) were hydrated and autoclaved in 20 ml of PBS. For the purposes of this experiment, the lenses were subsequently soaked in PBS (20 ml) for 3 autoclave cycles (20 min. per cycle) in order to remove any leachable materials from the lenses which could interfere with the analysis of PVOH by GPC chromatography. For manufacturing purposes, the three additional autoclave cycles could be omitted, as could extraction with an organic solvent or a solution of an organic solvent. Initially, three lenses processed as described above were soaked in 3 ml of 100 ppm PVOH solution in PBS (the form of PVOH used was MOWIOL® PVOH, 40-88 205K, 88% hydrolyzed). At each time point of the study, the lenses were transferred into fresh 100 ppm PVOH solution, and the concentration of the PVOH solution that the lenses were transferred out of was quantified by GPC using a standard method. Based on the concentration of PVOH remaining present in the solutions at the time points, the accumulated uptake of PVOH per lens was calculated for each time point.

Figure 3:
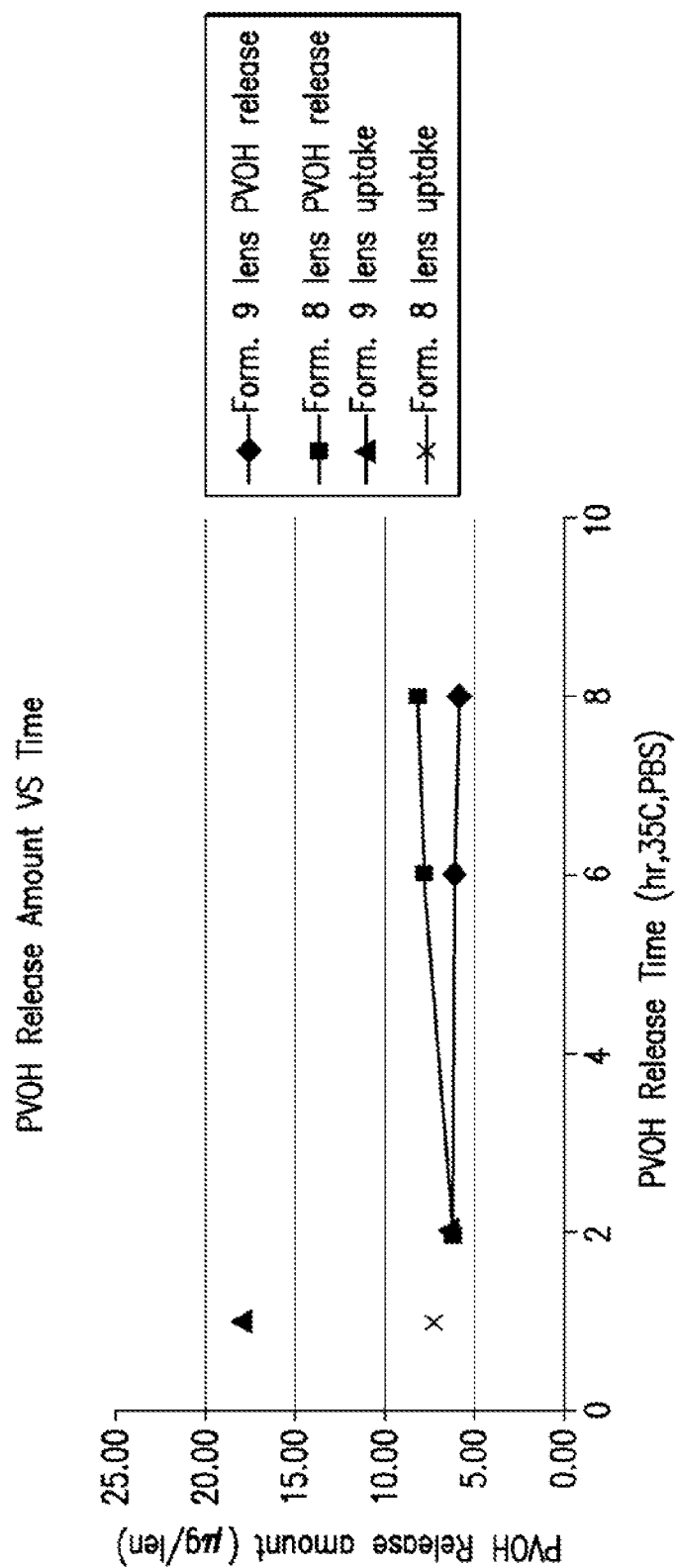
FIG. 3 is a graph demonstrating the lens uptake and release of polyvinyl alcohol over time of hydrogel contact lens products manufactured with an ophthalmically acceptable acid and a control lens manufactured without the acid.
Figure 4:
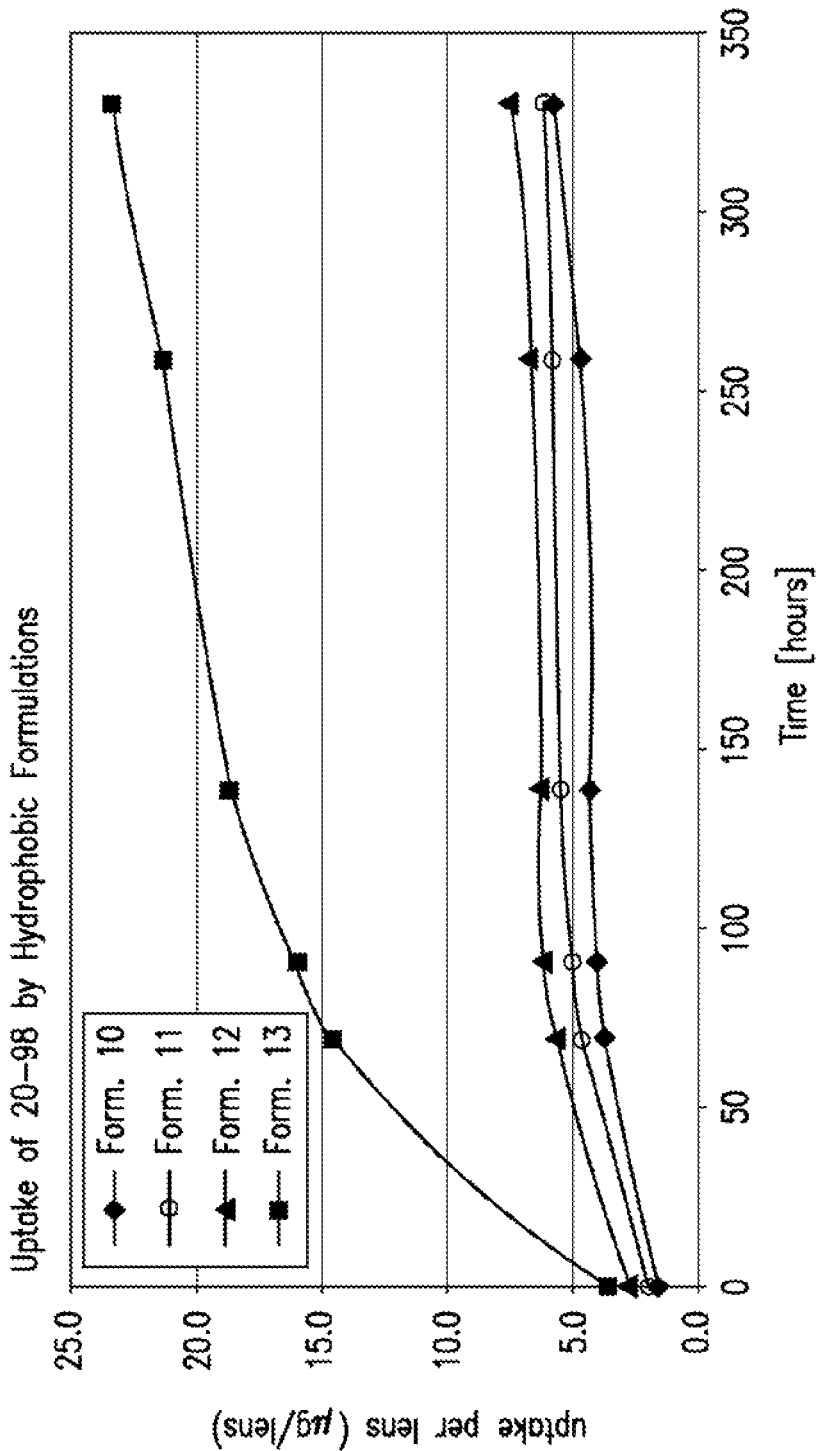
FIG. 4 is a graph demonstrating the rate of uptake of a first form of polyvinyl alcohol by lenses made from a series of hydrophobic formulations containing 0 unit parts to 3 unit parts of the ophthalmically acceptable acid.
Figure 5:
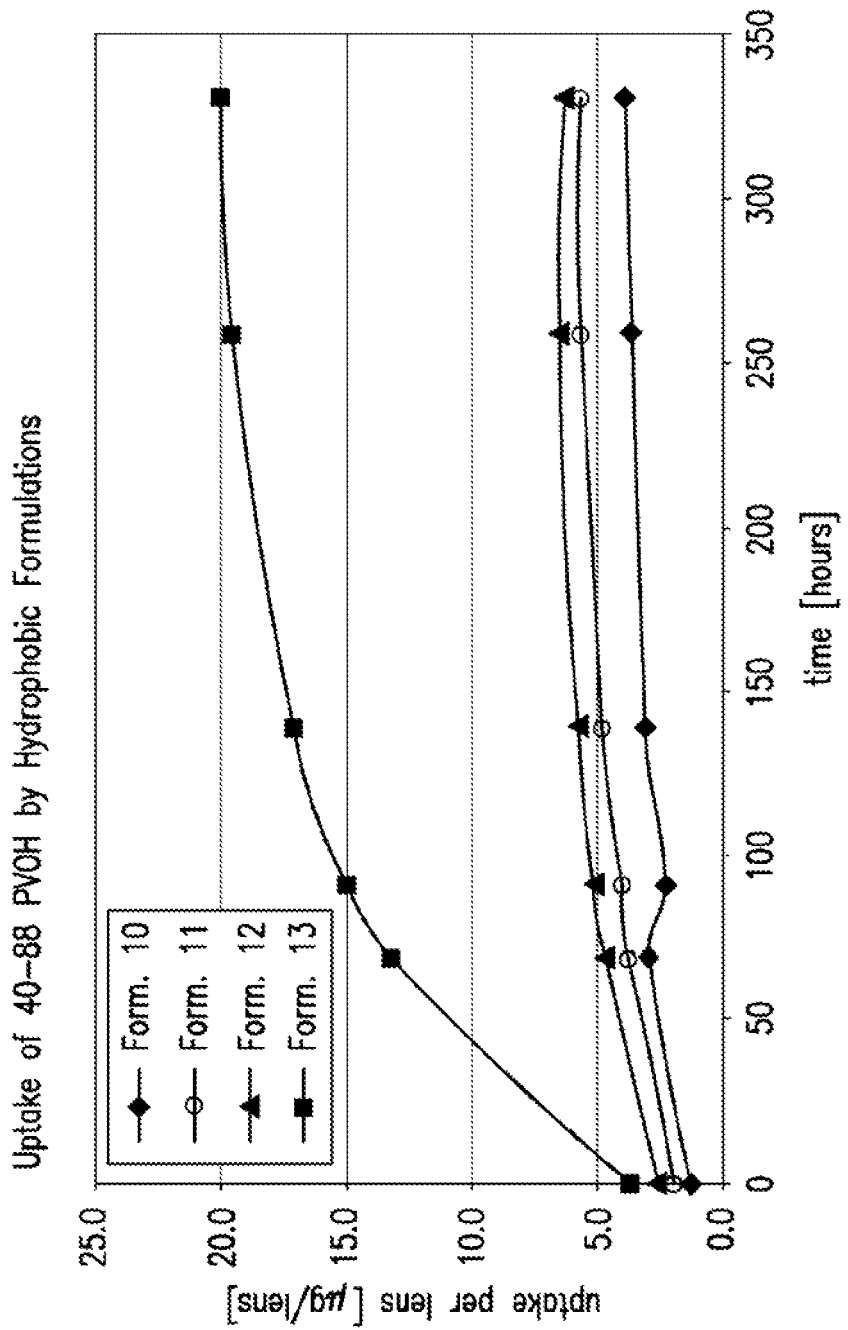
FIG. 5 is a graph demonstrating the rate of uptake of a second form of polyvinyl alcohol by lenses made from a series of hydrophobic formulations containing 0 unit parts to 3 unit parts of the ophthalmically acceptable acid.
Figure 6:
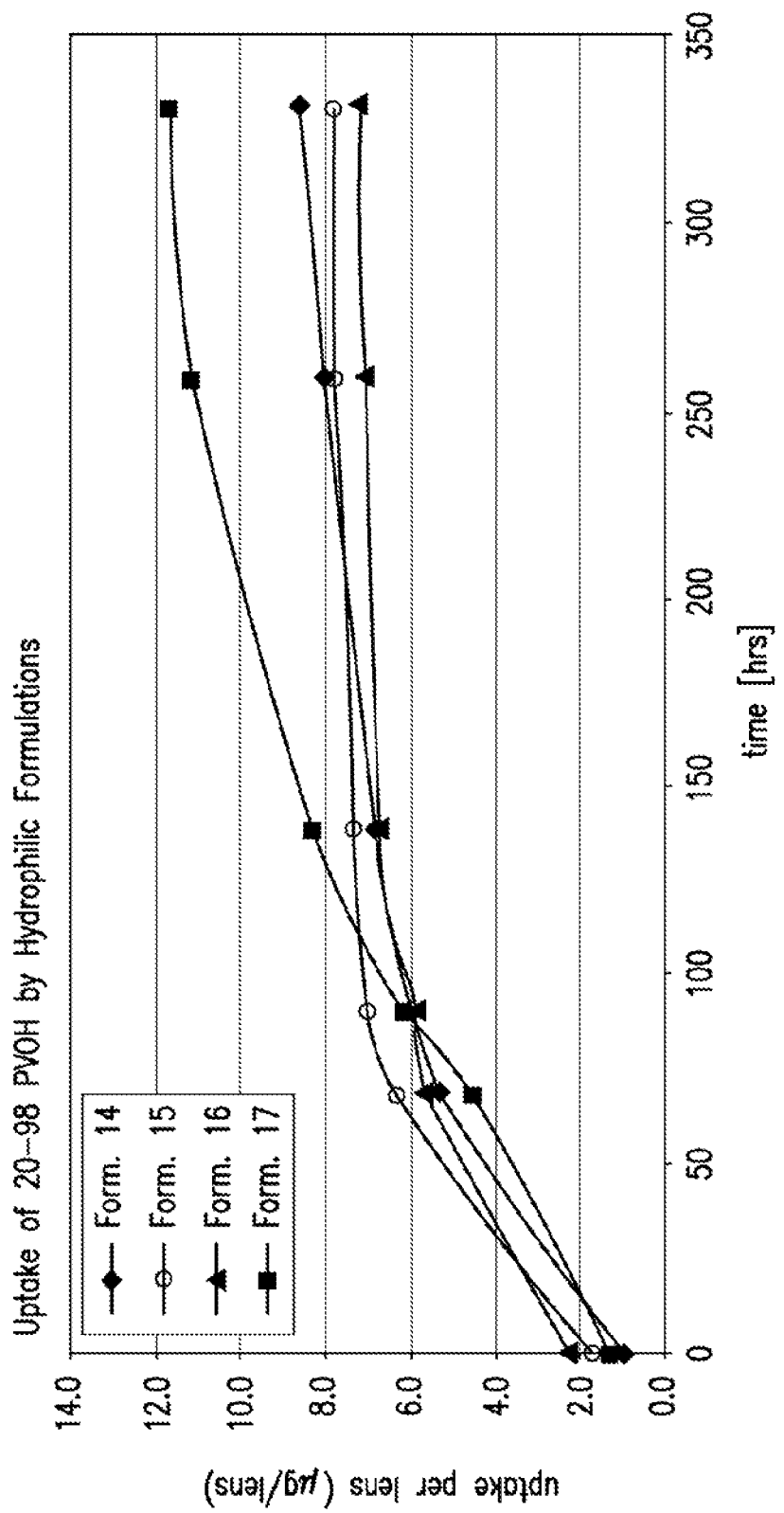
FIG. 6 is a graph demonstrating the rate of uptake of the first form of polyvinyl alcohol by lenses made from a series of hydrophilic formulations containing 0 unit parts to 3 unit parts of the ophthalmically acceptable acid.
Figure 7:
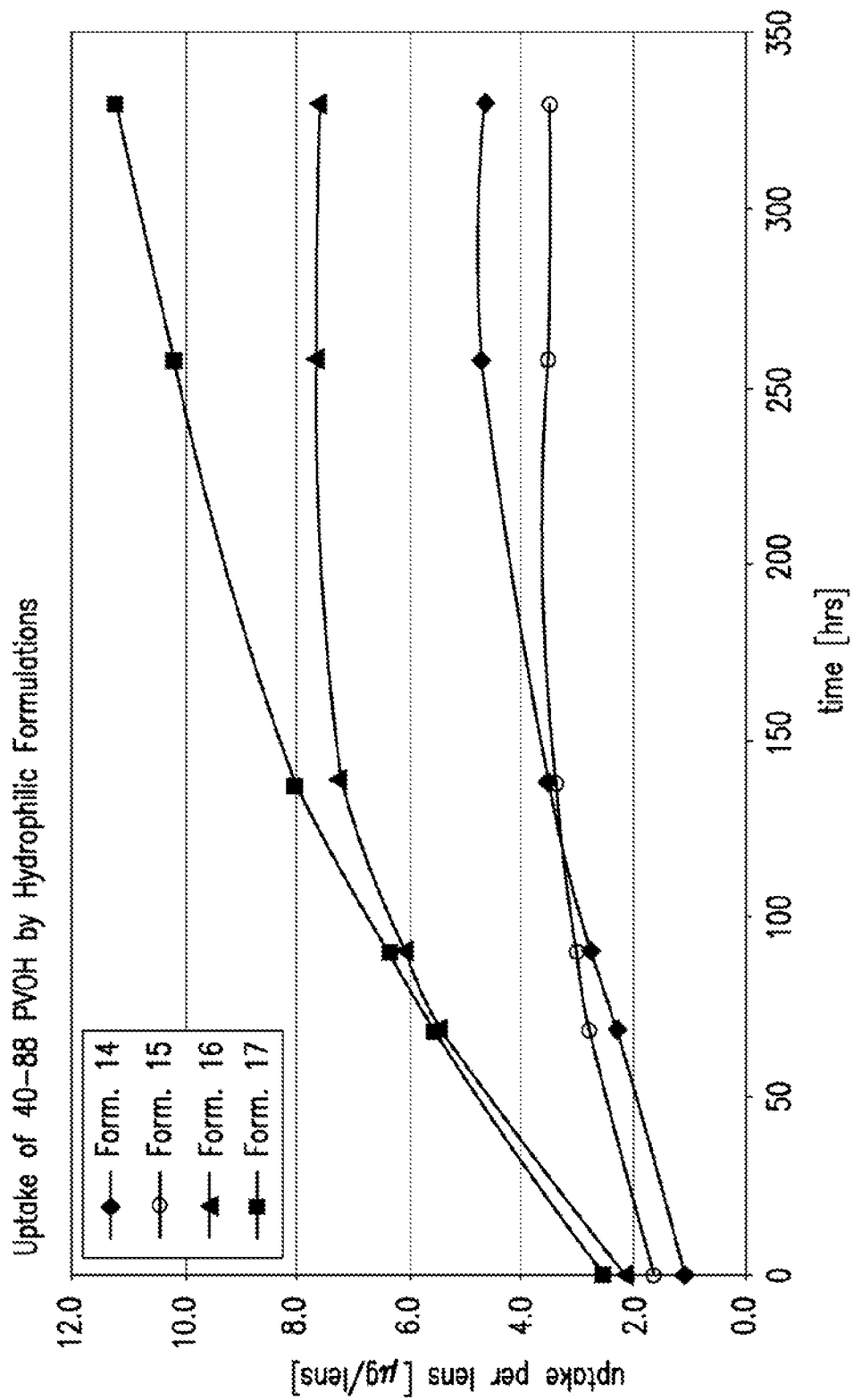
FIG. 7 is a graph demonstrating the rate of uptake of the second form of polyvinyl alcohol by lenses made from a series of hydrophilic formulations containing 0 unit parts to 3 unit parts of the ophthalmically acceptable acid.

The PVOH uptake by lenses of formulations 8 (control) ("■") and 9 ("♦") are plotted in FIG. 3. As shown by the results in FIG. 3, the lenses made using formulation 8 (control), without a polymerizable agent with at least one boronic acid moiety, were found to take up an average of 7.1 μg PVOH/lens during the first day, and 0 μg PVOH/lens after the first day. As no additional PVOH was taken up by the lenses, only the data for days 1 and 2 are included in the graph. The lenses made using formulation 9, containing VPB as the ophthalmically acceptable acid, were found to continue to take up a 1,3 polyol with at least 5 pendant hydroxyl groups, specifically PVOH, from the solution over the 10 days studied. The lenses were found to take up an average of 17.9 μg PVOH/lens over the 10 days.

Example 6

Contact lenses were prepared with polymerizable lens compositions of samples Formulations 8 (control) and 9, such as described in Example 5. For purposes of this study, the PVOH release by lenses of formulations 8 and 9 was evaluated.

Sixteen individually packaged lenses made using formulations 8 and 9 were prepared. The lenses were soaked individually in a 5000 ppm PVOH solution in PBS (the form of PVOH used was MOWIOL® PVOH, 40-88 205K, 88% hydrolyzed). The lenses were soaked for 7 days after autoclaving to fully saturate them with the 1,3 polyol with at least 5 pendant hydroxyl groups, in this experiment a form of PVOH. After soaking for 7 days, the individual lenses were blotted to remove any additional solution, and were transferred to 10 ml of PBS not containing a 1,3 polyol with at least 5 pendant hydroxyl groups, and stored at 35° C. for the duration of the study. At each of the time points, a sample of the PBS was removed from each vial and analyzed using GPC. Any sample remaining after the analysis was returned to the vials and the vials were returned to storage at 35° C. until the next time point. The GPC analysis was conducted using a standard method and calibration standards of 100 ppm, 80.23 ppm, 51.03 ppm, 23.59 ppm, and 10.00 ppm PVOH were used.

The PVOH release by lenses of formulations 8 ("■") and 9 ("♦") are plotted in FIG. 3. As shown in FIG. 3, the lenses made using formulation 9 and 8 were both found to release an average of 5.9 μg PVOH/lens within the first two hours. The formulation 9 lenses released slightly more PVOH over the course of the study, but not a significant amount more. The Formulation 8 control lenses did not release additional PVOH during the later time points. The data from the lens uptake study has been included on this plot to illustrate that the formulation 8 lenses essentially released all of the taken up PVOH during the first two hours of the study (within the margin of error of the study), while, after at least 8 hours, the formulation 9 lenses retained most of the taken up PVOH (an average of 17.9 μg PVOH/lens taken up less an average of 5.9 μg PVOH/lens released after 2 hours left an average of approximately 12 μg PVOH/lens remaining in or on the lenses after 2 hours).

Additionally, it was noted that the lenses made using formulation 9, which contained an ophthalmically acceptable acid, specifically a polymerizable form of boronic acid (VPB) and which were contacted by a solution of a 1,3 polyol with at least 5 pendant hydroxyl groups, were found to be wettable, while the lenses made with formulation 8, which did not contain an ophthalmically acceptable acid but which had been contacted by a solution of a 1,3 polyol with at least 5 pendant hydroxyl groups, were not found to be wettable.

Example 7

A series of contact lenses were prepared with the polymerizable lens compositions, as shown in Table 10, using formulation 1, which was described in Example 2, as the base formulation. The lenses of formulation 1 were contacted with a series of solutions of 1,3 polyols with at least 5 pendant hydroxyl groups, in this experiment a series of PVOH solutions with varied hydrolysis percentages (mole %) at varied concentrations, and the WBUT of the resulting lenses was evaluated. Lenses of formulation 1, as described in Example 2, were prepared and packaged in 1.2 ml PBS containing the indicated type of PVOH at the indicated concentration, autoclaved, and maintained at room temperature for 2 days. The lens packages were then opened and the lenses were transferred to 3.6 ml PVOH-free PBS, and shaken at a speed of 100 rpm and a temperature of 35° C. for the indicated amount of time. At the indicated time points, the water break up time for the lenses was determined along with the static and advancing contact angles (both determined using the Captive Bubble method).

TABLE 10

| PVOH Used | Release Time Point | WBUT (seconds) | Static Contact Angle (degrees) | Advancing Contact Angle (degrees) |
|---|---|---|---|---|
| 0.5% PVOH, 98-99% hydrolyzed | 24 hours | 15 to 20 | 35.6 | 47.4 |
| 0.5% PVOH, 98-99% hydrolyzed | 48 hours | 12 to 15 | 35.3 | 50.1 |
| 0.5% PVOH, 98-99% hydrolyzed | 5 days | 12 to 13 | 36.4 | 49.8 |
| 0.25% PVOH, 98-99% hydrolyzed | 24 hours | 15 to 20 | 35.5 | 72.5 |
| 0.25% PVOH, 98-99% hydrolyzed | 48 hours | 10 to 13 | 38.4 | 62.0 |
| 0.25% PVOH, 98-99% hydrolyzed | 5 days | 15 to 18 | 37.4 | 68.2 |
| 0.5% PVOH, 96% hydrolyzed | 24 hours | 15 to 20 | 38.4 | 60.8 |
| 0.5% PVOH, 96% hydrolyzed | 48 hours | <8 | 35.5 | 60.7 |
| 0.5% PVOH, 96% hydrolyzed | 5 days | 13 to 16 | 36.2 | 68.3 |
| 0.25% PVOH, 96% hydrolyzed | 24 hours | >20 | 38.4 | 63.8 |
| 0.25% PVOH, 96% hydrolyzed | 48 hours | <8 | 38.1 | 68.3 |
| 0.25% PVOH, 96% hydrolyzed | 5 days | 15 to 18 | 37.5 | 70.4 |

Use of all of the PVOH solutions evaluated with these lenses was found to result in lenses that maintained good WBUTs and good static and advancing contact angles for up to 5 days, suggesting the lenses remained ophthalmically wettable for the duration of the study.

Example 8

A series of contact lenses were prepared with the polymerizable lens compositions using formulation 1, containing an ophthalmically acceptable acid, specifically the polymerizable form of boronic acid VPB. The lenses were contacted with solutions comprising a 1,3 polyol with at least 5 pendant hydroxyl groups, specifically PVOH solutions with varied average molecular weights, as shown in Table 11. The PVOH Grade listed in Table 11 includes the degree of hydrolysis (98% or 99%). Lenses of formulation 1, which is described in Example 2, were prepared and packaged in 1.2 ml PBS containing the indicated type PVOH at the indicated concentration, autoclaved, and maintained at room temperature for 3 days. The lens packages were then opened and the lenses were either tested to determine the WBUT or the advancing contact angle (by the Captive Bubble method) of the lenses. Additional lenses were transferred to 3.6 ml of PVOH-free PBS and shaken at a speed of 100 rpm and a temperature of 35° C. for 24 hours, at which time the WBUT and advancing contact angle (by the Captive Bubble method) of the lenses were determined.

(MW ~205 k) at room temperature for 24 hours. The properties of the lenses made using the Table 12 formulations are shown in Table 13.

TABLE 13

| Properties | Formulation ID | |
|---|---|---|
| | 24 | 25 |
| Tensile Strength (MPa) | 0.63 | 0.94 |
| Modulus (MPa) | 0.66 | 0.76 |
| Elongation (%) | 151 | 202 |
| PVOH Uptake by Lenses after 24 hrs.* (μg/lens) | 33.1 | 190.6 |

The lenses made from the formulation containing an ophthalmically acceptable acid (VPB) took up significantly more PVOH from solution after sitting in the PVOH solution for 24 hours.

TABLE 11

| PVOH Source | PVOH Grade | MW | PVOH Soln. Conc. (wt. %) | 1 day soaking in PVOH followed by 0 hrs. soaking in PBS Adv. Contact Angle (degrees) | 3 days soaking in PVOH followed by 0 hrs. soaking in PBS WBUT (seconds) | 3 days soaking in PVOH followed by 0 hrs. soaking in PBS Adv. Contact Angle (degrees) | 3 days soaking in PVOH followed by 24 hrs. soaking in PBS WBUT (seconds) | 3 days soaking in PVOH followed by 24 hrs. soaking in PBS Adv. Contact Angle (degrees) |
|---|---|---|---|---|---|---|---|---|
| MOWIOL | 4-98% | ~27k | 0.50% | 81.8 ± 1.5 | 20, 3 | 79.8 ± 5.6 | 5, 5, 10 | 78.7 |
| MOWIOL | 10-98% | ~61k | 0.50% | 80.8 ± 0.1 | 18, 10, 5 | 74.8 ± 6.2 | 5, 7, 10 | 80.7 |
| MOWIOL | 20-98% | ~125k | 0.50% | 80.6 ± 0.2 | >20, 22, 22 | 66.8 ± 1.1 | 25, 18, 30 | 68.4 ± 6.5 |
| MOWIOL | 28-99% | ~145k | 0.50% | 74.9 ± 1.6 | 20, 23, >20 | 71.1 ± 0.1 | 25, >20, 20 | 71.4 ± 2.6 |
| MOWIOL | 56-98% | ~195k | 0.50% | 82.0 ± 0.4 | >20, >20, >20 | 59.5 ± 7.0 | 20, >20, 20 | 60.3 ± 8.6 |
| Aldrich | 98-99% | 146k-186k | 0.50% | ND | >20, >20, >20 | 57.8 ± 10.1 | 15 to 20 | ND |

The average molecular weight of the form of PVOH was observed to influence the water break up time of the lenses, with the higher molecular weight forms resulting in lenses with longer WBUTs.

Example 9

A series of contact lenses were prepared with silicone-free polymerizable lens compositions as shown in Table 12. Formulations were prepared by combining the ingredients in the indicated unit parts. Silicone-free lens formulations were made with and without the addition of an ophthalmically acceptable acid, specifically a polymerizable form of boronic acid (VPB).

TABLE 12

| | Formulation | |
|---|---|---|
| Ingredient | 25 unit parts (wt) | 25 unit parts (wt) |
| HEMA | 76.85 | 76.85 |
| MPC | 14.53 | 14.53 |
| EGDMA | 0.7 | 0.7 |
| Vazo 64 | 0.46 | 0.46 |
| VB6 | 7.76 | 7.76 |
| VPB | 0 | 3 |

An evaluation of the silicone-free lens formulations was conducted for tensile strength, modulus, elongation, and PVOH uptake. PVOH uptake from blister solutions was determined by GPC after the lenses were placed in 1.2 ml PBS blister solution containing 0.5% MOWIOL® 40-88

Example 10

A series of contact lenses were prepared with the polymerizable lens compositions as shown in Tables 14 and 15. One set of formulations (10 to 13) was more hydrophobic in nature as compared to the other set of formulations (14 to 17) as confirmed by the initial WBUT results for the formulations. The content of the ophthalmically acceptable acid (VPB) in both sets of formulations was varied (0%, 1%, 2% and 3% VPB). The level of uptake of the 1,3 polyol with at least 5 pendant hydroxyl groups (PVOH) over time was evaluated for each of the formulations.

TABLE 14

| | Hydrophobic Formulations | | | |
|---|---|---|---|---|
| | 10 | 11 | 12 | 13 |
| Ingredient | unit parts (wt) | unit parts (wt) | unit parts (wt) | unit parts (wt) |
| SIGMA | 20.0 | 20.0 | 20.0 | 20.0 |
| Silicone C | 25.0 | 25.0 | 25.0 | 25.0 |
| VMA | 30.0 | 30.0 | 30.0 | 30.0 |
| DMA | 20.0 | 20.0 | 20.0 | 20.0 |
| EGMA | 5.0 | 5.0 | 5.0 | 5.0 |
| TEGDVE | 0.6 | 0.6 | 0.6 | 0.6 |
| TEGDMA | 0.5 | 0.5 | 0.5 | 0.5 |
| Vazo 64 | 0.3 | 0.3 | 0.3 | 0.3 |
| VPB | 0 | 1 | 2 | 3 |

TABLE 15

| Ingredient | 14 unit parts (wt) | 15 unit parts (wt) | 16 unit parts (wt) | 17 unit parts (wt) |
|---|---|---|---|---|
| SIGMA | 20.0 | 20.0 | 20.0 | 20.0 |
| Silicone C | 25.0 | 25.0 | 25.0 | 25.0 |
| VMA | 40.0 | 40.0 | 40.0 | 40.0 |
| DMA | 5.0 | 5.0 | 5.0 | 5.0 |
| EGMA | 7.0 | 7.0 | 7.0 | 7.0 |
| TEGDVE | 0.6 | 0.6 | 0.6 | 0.6 |
| TEGDMA | 0.5 | 0.5 | 0.5 | 0.5 |
| Vazo 64 | 0.5 | 0.5 | 0.5 | 0.5 |
| VPB | 0 | 1 | 2 | 3 |

Hydrophilic Formulations (Table 15 header)

The resulting lenses were demolded, delensed, and each lens was packed in an individual 20 ml glass vial. To hydrate the lenses, each vial was filled with 5 ml of PBS and allowed to hydrate for 30 minutes. Following hydration, the vials and lenses received three flush cycles, each cycle consisting of replacing the 5 ml of PBS with 5 ml of fresh PBS after the lens had sat in the PBS for 60 minutes.

PVOH uptake by the lenses was studied by combining 20 lenses of the same formulation, wiping the surface water off each lens, and soaking the 20 lenses in 10 ml of a 200 ppm PVOH solution in PBS. Each lens was added individually to the PVOH solution in order to prevent the lenses from all sticking together. The PVOH solutions used were 200 ppm of MOWIOL® 40-88 PVOH, MW approx. 205,000 Daltons, and 200 ppm of MOWIOL® 20-98 PVOH, MW approx. 146,000 Daltons, as indicated. For the first time point (time 0), the 20 lenses were removed from the PVOH solution immediately after the last lens had been added. The remaining samples were stored at RT until their indicated timepoints. For the remaining samples, at time points of 1 day, 2 days, 3 days, 7 days, 10 days, and 14 days, the lenses were transferred to a fresh sample of PVOH solution, and the old PVOH solution was retained for GPC testing to determine the PVOH solution concentration. The samples of PVOH solution were analyzed by GPC using a Ultrahydrogel linear column (Waters Corporation, Milford, Mass., USA), with a mobile phase of 90% 0.1M $NaNO_3$ in $H_2O$: 10% MeOH at a flow rate of 0.8 ml/min. with an injection volume of 200 μl, a column temperature of 45° C., and a refractive index (RI) detector. Due to overlap between one of the PVOH peaks with a leached linear polymer peak, peak heights were used to quantitate the PVOH rather than peak areas. In addition to PVOH uptake, lens diameter and water break-up time (WBUT) were measured at times 0 and 14 days. The initial (time 0) WBUT was measured in PBS; the day 14 lenses were transferred to PBS and stored in the PBS for 5 days prior to determining the WBUT. The values reported for lens diameter and WBUT in TABLES 16 and 17 are based on a sample size of 5 lenses.

TABLE 16

Hydrophobic Formulations

| | Time 0 10 | Time 0 11 | Time 0 12 | Time 0 13 | 14 Days 10 | 14 Days 11 | 14 Days 12 | 14 Days 13 |
|---|---|---|---|---|---|---|---|---|
| Unit parts VPB | 0 | 1 | 2 | 3 | 0 | 1 | 2 | 3 |
| With 20-98 PVOH | | | | | | | | |
| WBUT (sec) | <8 | 10 to 13 | 13 to 16 | 9 to 12 | 15 to 18 | 12 to 15 | 18 to 20 | 17 to 20 |
| Diameter (mm) | 14.58 | 14.57 | 14.46 | 14.22 | 14.69 | 14.57 | 14.46 | 14.04 |
| PVOH uptake (μg/lens) | 1.5 | 1.9 | 2.8 | 3.4 | 5.7 | 6.1 | 7.5 | 23.4 |
| With 40-88 PVOH | | | | | | | | |
| WBUT (sec) | 12 to 15 | 17 to 20 | 15 to 18 | 13 to 16 | 15 to 18 | 13 to 16 | >20 | 18 to 20 |
| Diameter (mm) | 14.66 | 14.59 | 14.42 | 14.12 | 14.61 | 14.53 | 14.46 | 14.04 |
| PVOH uptake (μg/lens) | 1.3 | 1.9 | 2.6 | 3.6 | 3.9 | 5.7 | 6.4 | 20.1 |

TABLE 17

Hydrophilic Formulations

| | Time 0 14 | Time 0 15 | Time 0 16 | Time 0 17 | 14 Days 14 | 14 Days 15 | 14 Days 16 | 14 Days 17 |
|---|---|---|---|---|---|---|---|---|
| Unit parts VPB | 0 | 1 | 2 | 3 | 0 | 1 | 2 | 3 |
| With 20-98 PVOH | | | | | | | | |
| WBUT (sec) | n/d | n/d | n/d | n/d | 17 to 20 | 12 to 15 | 18 to 20 | 15 to 18 |
| Diameter (mm) | n/d | n/d | n/d | n/d | 15.44 | 15.33 | 15.09 | 14.60 |
| PVOH uptake (μg/lens) | 1.0 | 1.7 | 2.3 | 1.3 | 8.5 | 7.7 | 7.1 | 11.6 |

TABLE 17-continued

| | Hydrophilic Formulations | | | | | | | |
|---|---|---|---|---|---|---|---|---|
| | Time 0 14 | Time 0 15 | Time 0 16 | Time 0 17 | 14 Days 14 | 14 Days 15 | 14 Days 16 | 14 Days 17 |
| With 40-88 PVOH | | | | | | | | |
| WBUT (sec) | 15 to 18 | >20 | >20 | 15 to 18 | 18 to 20 | 18 to 20 | >20 | 18 to 20 |
| Diameter (mm) | 15.29 | 15.14 | 15.06 | 14.71 | 15.53 | 15.33 | 15.10 | 14.66 |
| PVOH uptake (μg/lens) | 1.1 | 1.6 | 2.1 | 2.5 | 4.6 | 3.4 | 7.6 | 11.2 |

The rate of uptake of the two forms of PVOH evaluated (the MOWIOL® 20-98 PVOH and the MOWIOL® 40-88 PVOH) are shown for the hydrophobic formulations (10 to 13) and for the hydrophilic formulations (14 to 17) in FIGS. 4 to 7. With both forms of PVOH, the total amount of PVOH taken up by the lenses after the initial time point was greater for the hydrophobic formulations. While higher levels of VPB content in the formulations was generally observed to result in higher levels of PVOH being taken up by the lenses, the total uptake results were not linearly concentration-dependent for the hydrophobic formulations with either form of PVOH, or for the hydrophilic formulation with the 20-98 PVOH. For the hydrophobic formulation tested with the 40-88 PVOH, the total uptake of PVOH was linearly concentration-dependent based on the VPB concentration present in the formulation. The uptake of PVOH by lenses of formulations containing 2 unit parts or less VPB appeared to reach steady state between approximately 100 and 150 hours, while the formulations containing 3 parts VPB generally required 250 hours or more to reach steady state.

Example 11

A series of contact lenses were prepared with the polymerizable lens compositions as shown in Table 18. In these formulations, different types of ophthalmically acceptable acids, specifically different forms of polymerizable ophthalmically acceptable acids, were used. The ophthalmically acceptable acids used in these formulations include 4-Vinylphenylboronic acid (VPB, Alfa Aesar, Ward Hill, Mass., USA), 3-Vinylphenylboronic acid (3-VPB, Sigma-Aldrich, Atlanta, Ga., USA), 3-methacrylamidophenylboronic acid (MAPBA, Combi-Blocks Inc., San Diego, Calif., USA), and 3-Acrylamidophenylboronic acid (AAPBA, Frontier Scientific Inc., Logan, Utah, USA). The resulting lenses formed from these polymerizable lens compositions were contacted with a 1,3 polyol with at least 5 pendant hydroxyl groups, for this experiment, a solution of 0.5% MOWIOL® 20-98 PVOH. After polymerizing the polymerizable lens compositions comprising an ophthalmically acceptable acid and contacting them with the 1,3 polyol with at least 5 pendant hydroxyl groups, the lenses were washed with 5 ml of PBS.

TABLE 18

| | Formulation | | | |
|---|---|---|---|---|
| Ingredient | 18 unit parts (wt) | 19 unit parts (wt) | 20 unit parts (wt) | 21 unit parts (wt) |
| SiGMA | 20 | 20 | 20 | 20 |
| Silicone C | 25 | 25 | 25 | 25 |
| VMA | 30 | 30 | 30 | 30 |
| DMA | 20 | 20 | 20 | 20 |
| EGMA | 5 | 5 | 5 | 5 |
| TEGDVE | 0.6 | 0.6 | 0.6 | 0.6 |
| TEGDMA | 0.5 | 0.5 | 0.5 | 0.5 |
| VASO 64 | 0.3 | 0.3 | 0.3 | 0.3 |
| VPB | 3 | 0 | 0 | 0 |
| MAPBA | 0 | 3 | 0 | 0 |
| AAPBA | 0 | 0 | 3 | 0 |
| 3-VPB | 0 | 0 | 0 | 3 |

TABLE 19

| | Formulation ID | | | |
|---|---|---|---|---|
| Properties | 18 | 19 | 20 | 21 |
| Tensile Strength (MPa) | 0.689 ± 0.006 | 0.577 ± 0.14 | 0.635 ± 0.047 | 0.746 ± 0.080 |
| Modulus (MPa) | 0.619 ± 0.010 | 0.628 ± 0.010 | 0.766 ± 0.088 | 0.791 ± 0.042 |
| Elongation (%) | 226 ± 20 | 165 ± 37 | 164 ± 24 | 173 ± 17 |
| Diameter (mm) | 13.1 | 13.6 | 13.5 | 13.3 |
| Initial WBUT in PBS before contacting with PVOH solution (seconds) | 0 to 2 | 0 to 2 | 0 to 2 | 0 to 2 |
| WBUT after contacting with PVOH solution (seconds) | >20 | 10 to 15 | >20 | >20 |
| WBUT after contacting with PVOH solution and after washing with 5 ml PBS (seconds) | >20 | 0 to 2 | >20 | >20 |

The MAPBA purchased from Combi-Blocks appeared to be of very low purity as the raw material was a solid chunk of material that was orange-red in color, rather than a white powder as expected. For this reason, it is believed that the Formulation 19 lenses actually contained far less than 3 unit parts of MAPBA, which in turn resulted in the lenses not exhibiting good wettability when contacted with the PVOH solution and not retaining good wettability after being contacted with the PVOH solution and subsequently being washed with the PBS. All of the other lenses made from polymerizable compositions comprising a polymerizable form of an ophthalmic acid, specifically a polymerizable form of boronic acid, exhibited good wettability after being contacted with the 1,3 polyol with at least 5 pendant hydroxyl groups (in this experiment, PVOH), and retained good wettability after subsequently being washed with PBS.

Example 12

A series of contact lenses were prepared with the polymerizable lens compositions as shown in Table 20. The properties of the resulting uncomplexed lenses bodies formed from these polymerizable compositions are shown in Table 21.

TABLE 20

| | Formulation | |
|---|---|---|
| Ingredient | 22 unit parts (wt) | 23 unit parts (wt) |
| Silicone C | 40 | — |
| Silicone A | — | 14 |
| Silicone B | — | 29 |
| HEMA | 3.5 | — |
| NVP | — | 43 |
| VMA | 40 | — |
| DMA | 4 | — |
| EGMA (Ethylene glycol methyl ether methacrylate) | 6 | 7 |
| EGDMA (Ethylene glycol dimethacrylate) | 0.2 | — |
| EHMA (2-Ethylhexyl methacrylate) | — | 7 |
| TEGDMA (Tri(ethylene glycol) dimethacrylate) | — | 0.1 |
| TEGDVE (Tri(ethylene glycol) divinyl ether) | — | 0.4 |
| VASO 64 | 0.5 | 0.3 |
| VPB | 2 | 0 |
| Norbloc | 0.9 | 0.9 |
| RB 247 | 0.01 | 0.01 |

TABLE 21

| | Formulation ID | |
|---|---|---|
| Properties | 22 | 23 |
| Advancing Contact Angle (degrees) by captive bubble | 64.2 ± 3.7 | 48.2 ± 1.5 |
| Modulus (MPa) | 0.76 ± 0.02 | 0.70 ± 0.04 |
| Ionoflux (×$10^{-3}$ mm$^2$/min.) | 2.38 ± 0.10 | 3.67 ± 0.15 |
| Equilibrium Water Content (percent) by gravimetric method | 50.31 ± 0.44 | 48.80 ± 0.52 |
| Elongation (%) | 302 ± 7 | 309 ± 63 |
| Tensile Strength (MPa) | 1.36 ± 0.04 | 0.99 ± 0.27 |

Following demolding and delensing, the uncomplexed lens bodies of formulation 23 were contacted using complexing solutions comprising various polyhydric alcohols comprising 1, 2 diol or 1,3 diol moieties in a TRIS-EDTA buffer solution, as shown in Table 22.

The TRIS-EDTA buffer solution comprised 0.82% wt/wt sodium chloride, 0.023% wt/wt Tris(hydroxymethyl)aminomethane, 0.125% wt/wt Tris(hydroxymethyl)aminomethane hydrochloride, 0.37% wt/wt Ethylenediaminetetraacetic acid sodium salt dehydrate, and 0.005% wt/wt polysorbate 80 in deionized water, pH 7.1 to 7.5, Osmolarity 275±25 mOsM. All buffer components except the deionized water were obtained from Sigma-Aldrich (Atlanta, Ga., USA), and all buffer solution components except the polysorbate 80 were reagent grade materials.

The polyhydric alcohol comprising 1, 2 diol or 1,3 diol moieties used for this example was PVOH. Solutions of 1% MOWIOL® 40-88 PVOH or of 1% MOWIOL® 8-88 PVOH in the TRIS-EDTA buffer were prepared. For one solution with each form of PVOH, the pH of the solution was unadjusted, while for one solution with each form of PVOH the pH was adjusted to pH 10. The lens bodies were first hydrated in de-ionized water, and placed in the TRIS-EDTA and PVOH solutions for 30 minutes, transferred to fresh de-ionized water for 30 minutes, and then again transferred to fresh de-ionized water before being placed in a blister package with the TRIS-EDTA buffer solution (without PVOH), and autoclaved for 20 minutes at 121° C. The advancing contact angle of the hydrated uncomplexed (control) and complexed lens bodies were determined using the captive bubble method after equilibrating the lens bodies in PBS for at least 6 hours.

TABLE 22

| Formulation ID | Lens 1 | Lens 2 | Average | Reduction from uncomplexed | % Reduction |
|---|---|---|---|---|---|
| Form. 23 in DI H$_2$0 (uncomplexed) | 60.3° | 60.1° | 60.2° | | |
| Form. 23 in 1% 40-88 (complexed) | 49.4° | 49.0° | 49.2° | 11.0° | 18.3% |
| Form. 23 in 1% 40-88 pH 10 (complexed) | 54.2° | 50.3° | 52.3° | 7.9° | 13.1% |
| Form. 23 in 1% 8-88 (complexed) | 48.4° | 51.0° | 49.7° | 10.5° | 17.4% |
| Form. 23 in 1% 8-88 pH 10 (complexed) | 49.9° | 47.9° | 48.9° | 11.3° | 18.8% |

Based on the averaged values for the two lenses tested for each complexing solution comprising a TRIS-EDTA buffer system and PVOH, the complexed lens bodies had advancing contact angles ranging from about 13% to about 19% lower than the advancing contact angle of the uncomplexed lens bodies. The complexing solution comprising a TRIS-EDTA buffer system and PVOH did not gel during the course of the study.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of manufacturing a hydrogel contact lens body, comprising:
   providing a lens body comprising at least one form of boronic acid, boronic ester, boronic anhydride or combination thereof; and
   contacting the lens body with a contacting solution comprising at least one form of tris(hydroxymethyl)aminomethane (TRIS), and a form of poly(vinyl alcohol) (PVOH), wherein the at least one form of TRIS is present in the solution at a concentration effective to prevent gelation of the form of PVOH.

2. The method of claim 1, wherein the at least one form of the boronic acid, boronic ester, boronic anhydride or combination thereof is a boronic acid having the structure:

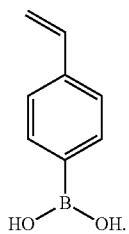

3. The method of claim 1, wherein the hydrogel lens body is a polymerized reaction product of a polymerizable composition, the polymerizable composition comprising at least one hydrophilic monomer, and at least one crosslinking agent; and the polymerized reaction product is a polymer formed of polymerized units of the at least one hydrophilic monomer, and crosslinks formed by the at least one crosslinking agent.

4. The method of claim 1, wherein the at least one form of TRIS comprises a TRIS buffer system comprising at least one form of tris(hydroxymethyl)aminomethane (TRIS), and at least one form of ethylenediaminetetraacetic acid (EDTA).

5. The method of claim 1, wherein the contacting solution further comprises a tonicity adjusting agent.

6. The method of claim 1, wherein the contacting solution has an osmolarity from about 100 mOsm to about 400 mOsm.

7. The method of claim 1, wherein the contacting solution further comprises at least one surfactant.

8. The method of claim 1, wherein the at least one form of TRIS is present in the contacting solution at a concentration effective to lower an effective pKa of boronic acid moieties present on at least a surface of the lens body.

9. The method of claim 1, wherein the step of contacting the lens body with the contacting solution further comprises complexing at least a portion of boronic acid moieties present in the lens body with at least a portion of PVOH moieties present in solution.

10. The method of claim 1, wherein the step of contacting the lens body with the contacting solution comprises soaking the lens body in the contacting solution, rinsing the lens body with the contacting solution, or both soaking and rinsing the lens body.

11. The method of claim 1, wherein the step of contacting the lens body with the contacting solution comprises placing the lens body in a contact lens package with the solution, sealing the package, and sterilizing the package.

12. The method of claim 11, wherein the at least one form of TRIS is present in the solution at a concentration effective to prevent gelation of the form of PVOH over a shelf life of the sterilized package.

13. A method of treating a hydrogel contact lens comprising:
   (i) providing a contact lens comprising at least one form of boronic acid, boronic ester, boronic anhydride or combination thereof;
   (ii) prior to the contact lens being worn by a user, contacting the lens body with a first contacting solution comprising at least one form of tris(hydroxymethyl)aminomethane (TRIS) and a form of poly(vinyl alcohol) (PVOH), wherein the at least one form of TRIS is present in the solution at a concentration effective to prevent gelation of the form of PVOH; and
   (iii) subsequently to the contact lens being worn by the user, contacting the lens body with a second contacting solution comprising at least one form of TRIS.

14. The method of claim 13, wherein the at least one form of TRIS of the first contacting solution is the same as the at least one form of TRIS of the second contacting solution.

15. A hydrogel contact lens product, comprising:
   (i) a lens body comprising at least one form of boronic acid, boronic ester, boronic anhydride or combination thereof;
   (ii) a packaging solution comprising at least one form of tris(hydroxymethyl)aminomethane (TRIS) and a form of poly(vinyl alcohol) (PVOH), wherein the at least one form of TRIS is present in the solution at a concentration effective to prevent gelation of the form of PVOH for a duration of time equivalent to a shelf life of a sterilized contact lens package;
   (iii) a contact lens package base member with a cavity configured to hold the lens body and the packaging solution; and
   (iv) a seal attached to the base member configured to maintain the lens body and the packaging solution in a sterile condition for the duration of time equivalent to the shelf life of the sterilized contact lens package.

16. The hydrogel contact lens product of claim 15, wherein the at least one form of TRIS is present in the packaging solution at a concentration effective to lower an effective pKa of boronic acid moieties present on at least a surface of the lens body.

17. The hydrogel contact lens product of claim 15, wherein at least a portion of boronic acid moieties present on at least a surface of the lens body are complexed with at least a portion of PVOH moieties present in the packaging solution.

18. The method of claim 1, wherein the concentration of TRIS is from about 0.01% to about 10%.

19. The method of claim 13, wherein the concentration of TRIS is from about 0.01% to about 10%.

20. The hydrogel contact lens product of claim 15, wherein the concentration of TRIS is from about 0.01% to about 10%.

* * * * *